United States Patent
Duerfeldt et al.

(10) Patent No.: US 12,038,395 B2
(45) Date of Patent: Jul. 16, 2024

(54) RADIOGRAPHY INSPECTION AND FAIL-SAFE MECHANISM FOR PIPE TRAVERSING ROBOTS

(71) Applicant: ARIX TECHNOLOGIES, INC., Jackson, LA (US)

(72) Inventors: Bryan R. Duerfeldt, Houston, TX (US); Conner S. George, Houston, TX (US); Karl Petter Wehlin, Houston, TX (US); Dianna D. Liu, Jackson, LA (US)

(73) Assignee: ARIX TECHNOLOGIES, INC., Jackson, LA (US)

( * ) Notice: Subject to any disclaimer, the term of this patent is extended or adjusted under 35 U.S.C. 154(b) by 0 days.

(21) Appl. No.: 18/225,430

(22) Filed: Jul. 24, 2023

(65) Prior Publication Data

US 2023/0366837 A1 Nov. 16, 2023

Related U.S. Application Data

(62) Division of application No. 17/887,281, filed on Aug. 12, 2022, now Pat. No. 11,754,514.

(Continued)

(51) Int. Cl.
| | | |
|---|---|---|
| *G01N 23/18* | (2018.01) | |
| *G01N 23/04* | (2018.01) | |
| *G01N 23/083* | (2018.01) | |

(52) U.S. Cl.
CPC ............ *G01N 23/18* (2013.01); *G01N 23/04* (2013.01); *G01N 23/083* (2013.01); *G01N 2223/3303* (2013.01); *G01N 2223/628* (2013.01)

(58) Field of Classification Search
CPC ...... G01N 23/18; G01N 23/04; G01N 23/083; G01N 2223/3303; G01N 2223/628
See application file for complete search history.

(56) References Cited

U.S. PATENT DOCUMENTS

| | | | |
|---|---|---|---|
| 4,531,413 A | 7/1985 | Tsuchita | |
| 4,725,963 A | 2/1988 | Taylor et al. | |

(Continued)

FOREIGN PATENT DOCUMENTS

| | | | |
|---|---|---|---|
| CN | 102691856 A | 9/2012 | |
| CN | 104976485 A | 10/2015 | |

(Continued)

OTHER PUBLICATIONS

Musgrave et al., "Corrosion Under Insulation—CUI Inspection Detection," World Pipelines magazine, Jun. 2019, pp. 95-98, USA, «https://www.mistrasgroup.com/company/knowledge-center/literature/corrosion-under-insulation-cui-inspection-detection/».

(Continued)

*Primary Examiner* — Courtney D Thomas
(74) *Attorney, Agent, or Firm* — Greenberg Traurig, LLP; Todd C. Basile

(57) ABSTRACT

A radiography system for use on a pipe traversing robot, including a mechanism configured to automatically adjust the position(s) of a radiation source and/or an imager thereof based on a diameter of the pipe. Another radiography system including a computer vision system configured to process radiography imagery to define a measured interface between the pipe and insulation surrounding the pipe, and a control system configured to automatically adjust a position(s) of a radiation source and/or an imager thereof based on a location of or non-presence of the measured interface in the radiography imagery. A computer vision system for detecting potential anomalies in a pipe's surface. A fail safe mechanism configured to prevent a robot from falling off a (Continued)

pipe while allowing the robot to traverse obstacles extending from or tangential to the pipe. A robot having one or more fail safe mechanisms configured to be selectably extended and retracted.

20 Claims, 46 Drawing Sheets

Related U.S. Application Data

(60) Provisional application No. 63/232,849, filed on Aug. 13, 2021, provisional application No. 63/232,994, filed on Aug. 13, 2021.

(56) References Cited

U.S. PATENT DOCUMENTS

| | | | |
|---|---|---|---|
| 5,686,668 | A | 11/1997 | McLean |
| 5,698,854 | A | 12/1997 | Gupta |
| 7,210,364 | B2 | 5/2007 | Ghorbel et al. |
| 7,594,448 | B2 | 9/2009 | Jacobson et al. |
| 7,656,997 | B1 | 2/2010 | Anjelly |
| 8,141,442 | B2 | 3/2012 | Roberts |
| 8,759,780 | B2 | 6/2014 | Dobbs |
| 9,366,596 | B2 | 6/2016 | Mekid et al. |
| 9,726,569 | B2 | 8/2017 | Koyanagi |
| 10,465,835 | B2 | 11/2019 | Wehlin et al. |
| 10,914,417 | B2 | 2/2021 | Wehlin et al. |
| 11,154,989 | B2 | 10/2021 | Wehlin et al. |
| 2005/0041775 | A1 | 2/2005 | Batzinger et al. |
| 2008/0012310 | A1 | 1/2008 | Weaver et al. |
| 2008/0167752 | A1 | 7/2008 | Jacobsen |
| 2009/0120215 | A1 | 5/2009 | Jacobsen et al. |
| 2018/0011064 | A1 | 1/2018 | Furr |
| 2018/0284074 | A1 | 10/2018 | Furr |
| 2018/0313715 | A1 | 11/2018 | Cichosz et al. |
| 2019/0079031 | A1 | 3/2019 | Safai et al. |
| 2019/0086020 | A1 | 3/2019 | Wehlin et al. |
| 2019/0120418 | A1 | 4/2019 | Sivacoe |
| 2019/0360976 | A1 | 11/2019 | Frueh |
| 2020/0088339 | A1 | 3/2020 | Wehlin et al. |
| 2020/0094413 | A1 | 3/2020 | Liu et al. |

FOREIGN PATENT DOCUMENTS

| | | | |
|---|---|---|---|
| CN | 204712040 | U | 10/2015 |
| CN | 206357205 | U | 7/2017 |
| EP | 2937622 | A1 | 10/2015 |
| JP | H05139292 | A | 8/1993 |
| JP | H07329841 | A | 12/1995 |
| KR | 20120058872 | A | 6/2012 |
| KR | 20130034257 | A | 4/2013 |
| KR | 101706110 | B1 | 2/2017 |
| WO | WO-2013064838 | A1 * | 5/2013 ............ G01N 23/04 |

OTHER PUBLICATIONS

International Search Report & Written Opinion for PCT Application No. PCT/US2018/051723 dated Nov. 14, 2018, 6 pages.
International Search Report & Written Opinion for PCT Application No. PCT/US2020/052753 dated Feb. 8, 2021, 8 pages.
Blyth et al., "A Reduced Actuation Mecanum Wheel Platform for Pipe Inspection," 2016 IEEE International Conference on Advanced Intelligent Mechatronics, 6 pages.
International Search Report and Written Opinion in corresponding International Patent Application No. PCT/US22/40242 dated Dec. 30, 2022, 14 pages.

* cited by examiner

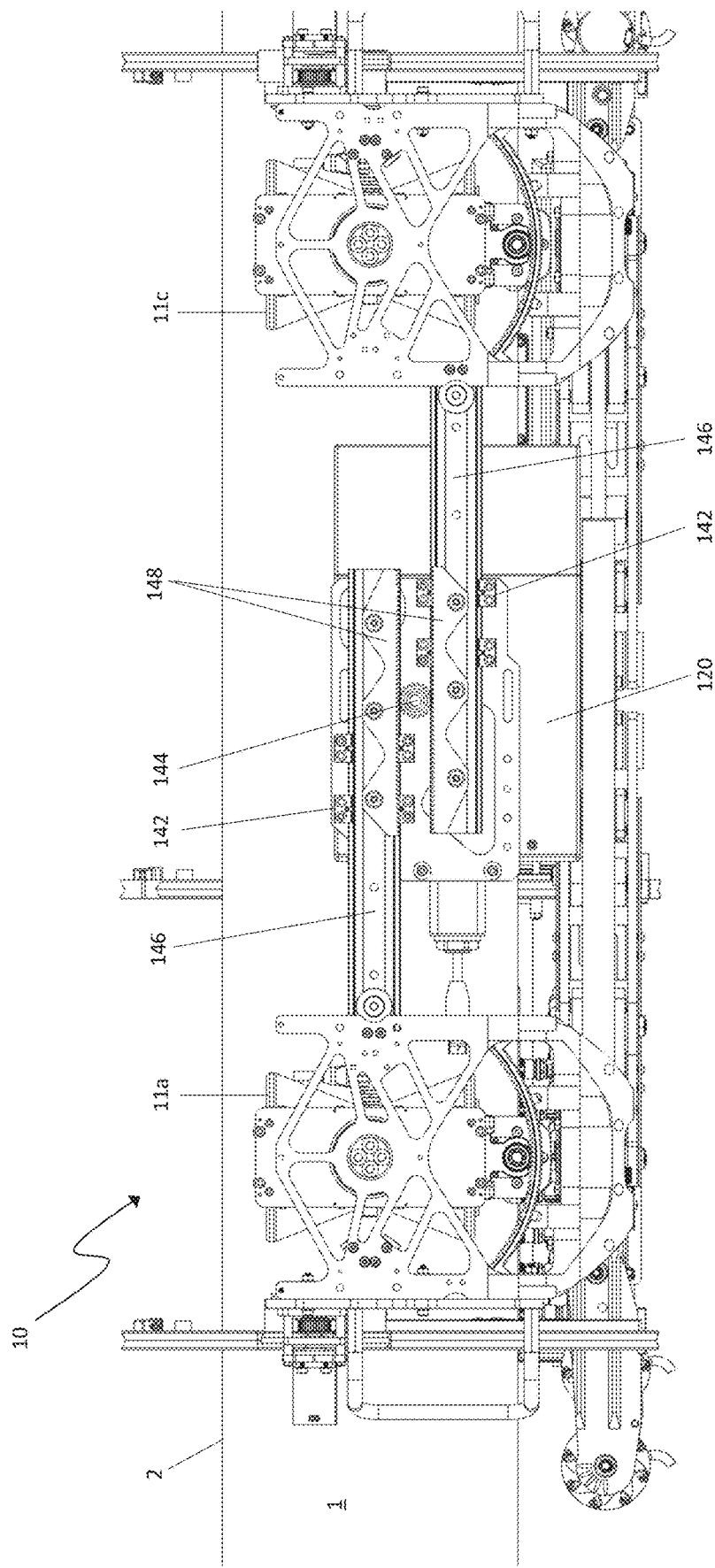

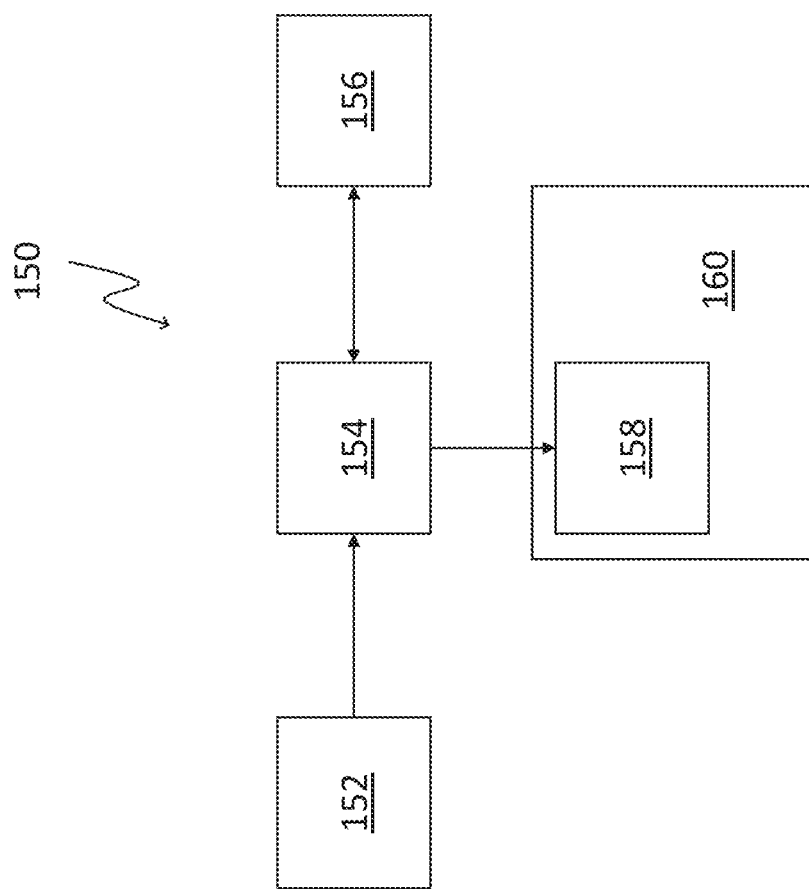

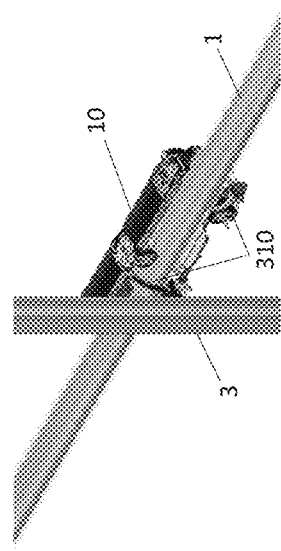
FIG. 16A
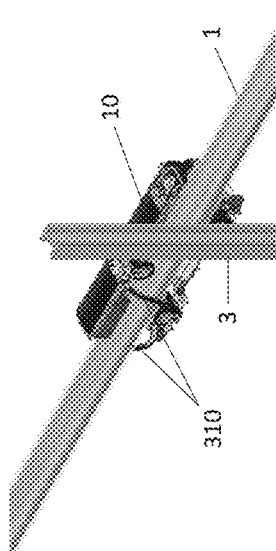
FIG. 16B
FIG. 16C
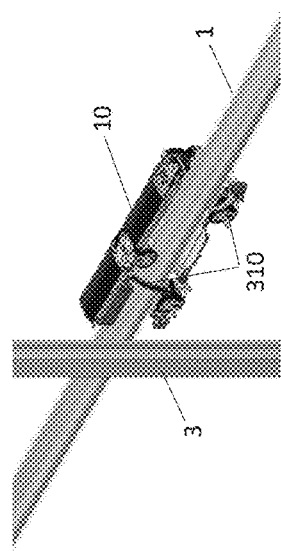
FIG. 16D
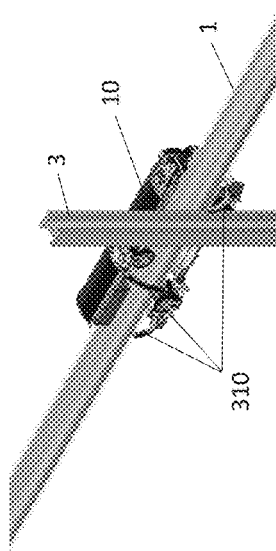
FIG. 16E
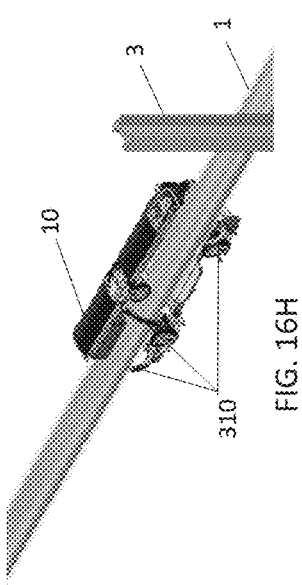
FIG. 16F
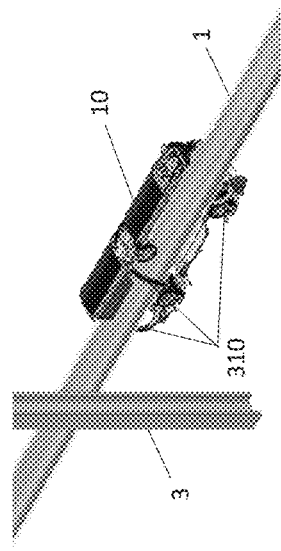
FIG. 16G
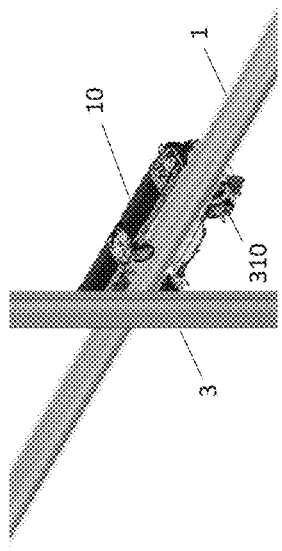
FIG. 16H
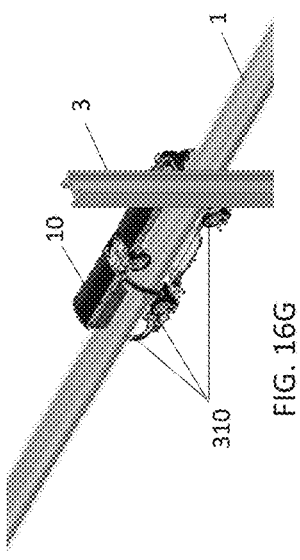

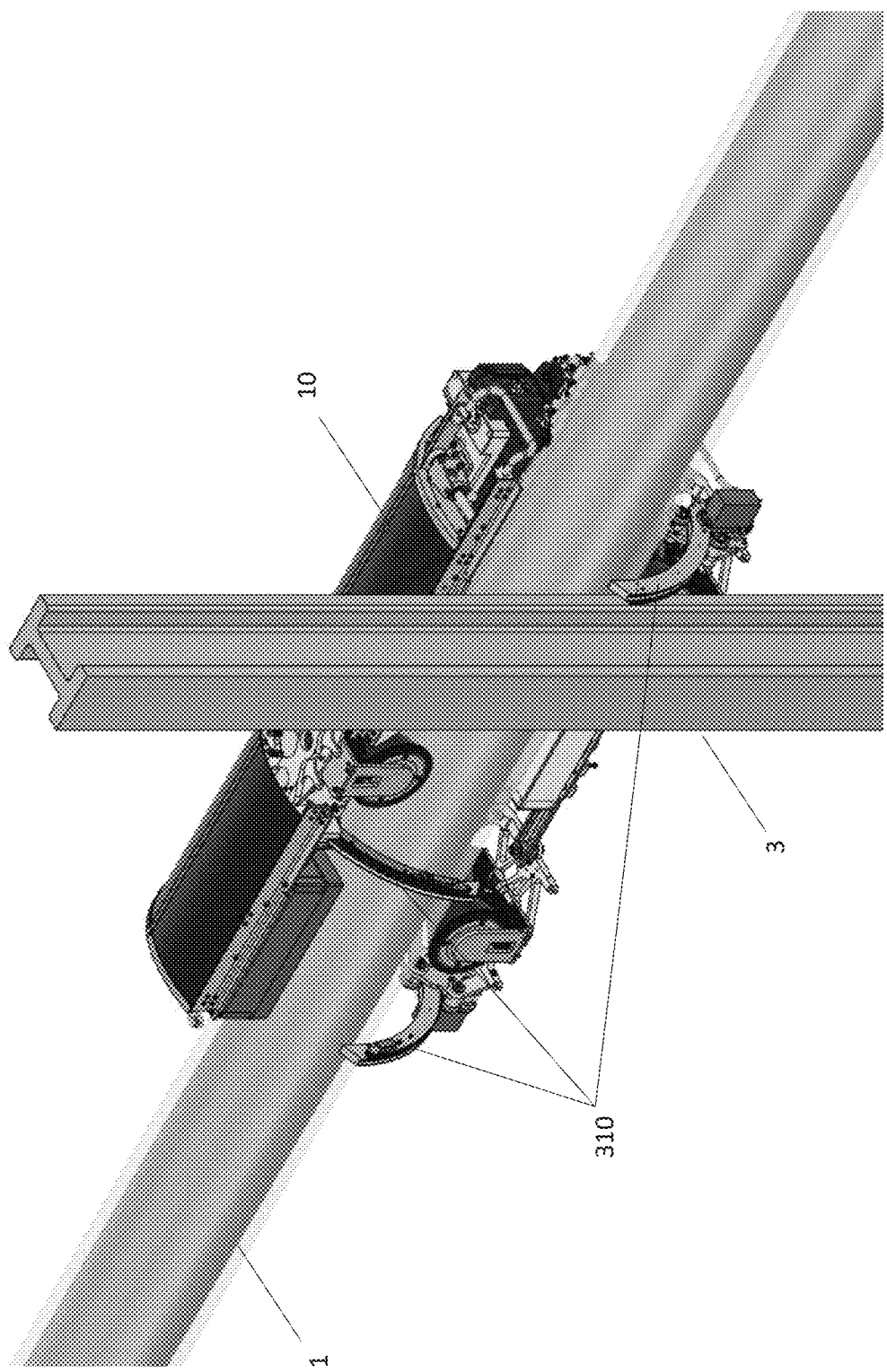

RADIOGRAPHY INSPECTION AND FAIL-SAFE MECHANISM FOR PIPE TRAVERSING ROBOTS

CROSS-REFERENCE TO RELATED APPLICATIONS

This application is a divisional of U.S. patent application Ser. No. 17/887,281, filed Aug. 12, 2022, which claims the benefit of and priority to U.S. Provisional Application No. 63/232,849, filed Aug. 13, 2021, and U.S. Provisional Application No. 63/232,994, filed Aug. 13, 2021, each of which is hereby incorporated herein by reference in its entirety for all purposes.

BACKGROUND

Many existing approaches for inspecting pipes are only suited for use on bare pipes—that is, pipes lacking insulation or other coverings. For example, many sensors require direct contact with the surface of a pipe in order to detect structural issues and other anomalies of interest. Likewise, many approaches rely on the ability to visually inspect the surface of the pipe itself, such as direct visual inspection by a technician on-site or the inspection of imagery captured by a camera. Insulation and other coverings may have to be cut away or removed in order to perform such inspection approaches, which can be time consuming, dangerous (especially when performed at heights), and cost prohibitive. Accordingly, there is a need for a way to inspect insulated pipes without damaging or removing the insulation.

A need remains for pipe traversing robots that are effective in driving on the outside of horizontal and vertical pipes and navigating around and/or over potential obstacles—e.g., obstacles that present a change in the effective diameter of the pipe, a change in the effective curvature of the pipe, and/or obstacles that protrude from the pipe in one or more radial directions. A key challenge for such pipe traversing robots is doing so without falling off the pipe, which can cause significant damage to the robot and surrounding infrastructure, as well as pose a safety hazard for nearby personnel.

These and other needs are advantageously satisfied by the apparatus and systems disclosed herein.

SUMMARY

The summary is a high-level overview of various aspects of the invention and introduces some of the concepts that are further detailed in the Detailed Description section below. This summary is not intended to identify key or essential features of the claimed subject matter, nor is it intended to be used in isolation to determine the scope of the claimed subject matter. The subject matter should be understood by reference to the appropriate portions of the entire specification, any or all drawings, and each claim.

Embodiments of the present disclosure relate to a radiography system for use on a pipe traversing robot. The system includes a radiation source configured to direct a radiation field tangential to an outer surface of a pipe such that a first portion of the radiation field contacts the pipe and a second portion of the radiation field passes by a corresponding periphery of the pipe. The system also includes an imager configured to receive the second portion of the radiation field emitted from the radiation source. The system also includes one or more mechanisms configured to automatically adjust a position of at least one of the radiation source and the imager on the pipe traversing robot based on a diameter of the pipe, such that the radiation source and the imager direct and receive the radiation field in said manners, respectively, when the pipe traversing robot is on the pipe of said diameter.

In some embodiments, at least one of the one or more mechanisms is configured to automatically adjust a lateral position of the radiation source such that the radiation source directs the radiation field tangential to the outer surface of a pipe such that the first portion of the radiation field contacts the pipe and the second portion of the radiation field passes by the corresponding periphery of the pipe.

In some embodiments, the mechanism includes a controller configured to determine, based on a diameter of the pipe, a lateral position of the radiation source suitable for directing the radiation field tangential to the outer surface of a pipe such that a first portion of the radiation field contacts the pipe and a second portion of the radiation field passes by a corresponding periphery of the pipe. The controller is also configured to engage a motor to move the radiation source to the lateral position.

In some embodiments, the mechanism further includes one or more guide rails extending laterally between frame members of the pipe traversing robot and one or more linear bearings slidably coupled to the one or more guide rails and directly or indirectly coupled to radiation source. Engaging the motor causes the radiation source to move laterally in either direction along the one or more guide rails.

In some embodiments, the diameter of the pipe is either (a) a predetermined diameter of the pipe provided to the controller, or (b) a measured diameter of the pipe as determined by one or more sensors onboard the pipe traversing robot.

In some embodiments, at least one of the one or more mechanisms is configured to automatically adjust a lateral position of the imager such that the imager is positioned opposite the radiation source and receives the second portion of the radiation field emitted from the radiation source.

In some embodiments, the mechanism includes a controller configured to determine, based on a diameter of the pipe, a lateral position of the imager suitable for positioning the imager opposite the radiation source to receive the second portion of the radiation field emitted from the radiation source. The controller is also configured to engage a motor to move the imager to the lateral position.

In some embodiments, the diameter of the pipe is either (a) a predetermined diameter of the pipe provided to the controller, or (b) a measured diameter of the pipe as determined by one or more sensors onboard the pipe traversing robot.

In some embodiments, at least one of the one or more mechanisms is configured to automatically adjust a longitudinal position of at least one of radiation source and the imager such that the imager is positioned opposite the radiation source and receives the second portion of the radiation field emitted from the radiation source.

In some embodiments, the mechanism includes a controller configured to determine, based on a diameter of the pipe, a longitudinal position of at least one of the radiation source and the imager suitable for positioning the imager opposite the radiation source to receive the second portion of the radiation field emitted from the radiation source. The controller is also configured to engage a motor or motors to move the radiation source and/or the imager to the lateral position.

In some embodiments, the mechanism includes a pinion coupled to the radiation source or the imager. The mechanism also includes a first rail coupling the pinion to a first component of the pipe traversing robot. The mechanism also includes a second rail coupling the pinion to a second component of the pipe traversing robot. A change in the relative positions of the first component and the second component of the pipe traversing robot based on the diameter of the pipe causes the first rail and the second rail to move by the same distance in opposing directions such that a longitudinal position of the pinion and that of the radiation source or the imager coupled thereto remains unchanged.

Embodiments of the present disclosure also relate to computer vision system for detecting potential anomalies in a surface of a pipe, the system including at least one processor adapted to obtain computer-executable instructions stored on a non-transitory medium that, when executed by the at least one processor, cause the at least one processor to process radiography imagery to define a measured interface in the radiography imagery between the pipe and insulation surrounding the pipe, determine where an expected interface between the pipe and the insulation should be located in the radiography imagery, detect one or more areas in the radiography imagery in which the measured interface falls outside of an anomaly threshold, and identify the one or more areas in the radiography imagery in which the measured interface falls outside of the anomaly threshold as containing potential anomalies.

In some embodiments, the radiation source is configured to direct a radiation field tangential to an outer surface of a pipe such that a first portion of the radiation field contacts the pipe and a second portion of the radiation field passes by a corresponding periphery of the pipe. The imager is positioned opposite the radiation source and configured to receive the second portion of the radiation field emitted from the radiation source.

In some embodiments, the measured interface is defined by finding an area of maximum contrast between portions of the radiography imagery corresponding with the pipe and the insulation.

In some embodiments, the measured interface is defined by identifying where pixels in the radiography imagery are above a brightness threshold.

In some embodiments, the expected interface is identified based on a known positioning, relative to the pipe, of a radiation source and an imager used to capture the radiography imagery, together with a known diameter of the pipe.

In some embodiments, the expected interface is identified by: (i) defining a measured interface along a section of the pipe and (ii) extrapolating, along the length of the pipe, the measured interface defined over the section of the pipe, wherein the measured interface used in the extrapolation follows a straight line for a predetermined distance indicative of the surface being anomaly free along the section of the pipe.

In some embodiments, the expected interface is identified by: (i) defining a measured interface along a section of the pipe, (ii) calculating an average of the measured interface along the section of the pipe, and (iii) extrapolating, along the length of the pipe, the average measured interface defined over the section of the pipe.

In some embodiments, the anomaly threshold is the expected interface.

In some embodiments, the anomaly threshold is offset from expected interface by a predetermined amount.

In some embodiments, the potential anomalies include at least one of wall loss or a corrosion by-product. The wall loss anomaly is identified when the measured interface is closer to a center of the pipe in the radiography imagery than the expected interface. The corrosion by-product anomaly is identified when the measured interface is further from a center of the pipe in the radiography imagery than the expected interface.

In some embodiments, the computer-executable instructions are configured to cause the at least one processor to stitch together individual frames of the radiography imagery, scan the stitched radiography imagery for potential anomalies, and present the stitched radiography imagery, along with an indicator of where potential anomalies were detected, to an operator for visual confirmation of the potential anomaly by the operator.

In some embodiments, the computer-executable instructions are configured to cause the at least one processor to scan individual frames of the radiography imagery for potential anomalies and present the individual frame(s) identified as containing a potential anomaly, along with one or more preceding frames, to an operator for visual confirmation of the potential anomaly by the operator.

In some embodiments, the computer-executable instructions are configured to cause the at least one processor to scan individual frames of the radiography imagery for potential anomalies, only upon detecting a potential anomaly, stitch the individual frame(s) identified as containing a potential anomaly with one or more preceding frames, and present the stitched frames to an operator for visual confirmation of the potential anomaly by the operator.

In some embodiments, the steps are performed as the radiography imagery is being captured so as to enable the detection of a potential anomaly in near- or real-time.

Embodiments of the present disclosure relate to a radiography system for use on a pipe traversing robot. The system including a radiation source configured to direct a radiation field tangential to an outer surface of a pipe such that a first portion of the radiation field contacts the pipe and a second portion of the radiation field passes by a corresponding periphery of the pipe. The system also includes an imager configured to receive the second portion of the radiation field emitted from the radiation source. The system also includes a computer vision system including at least one processor adapted to obtain computer-executable instructions stored on a non-transitory medium that, when executed by the at least one processor, cause the at least one processor to process radiography imagery captured by the imager to define a measured interface in the radiography imagery between the pipe and insulation surrounding the pipe. The system also includes a control system configured to automatically adjust a position of at least one of the radiation source and the imager on the pipe traversing robot, based on a location of or non-presence of the measured interface in the radiography imagery, such that the radiation source and the imager direct and receive the radiation field in said manners, respectively, when the pipe traversing robot is on the pipe.

Embodiments of the present disclosure relate to a fail-safe mechanism configured to prevent a robot from falling off of pipe while allowing the robot to traverse obstacles extending perpendicular from or tangential to the pipe. The fail-safe mechanism includes a curved arm and a guide through which the curved arm is slidably extended and retracted along a path substantially concentric with the pipe. The fail-safe mechanism also includes a motor for selectably powering motion of the curved arm between (i) an extended state in which the curved arm surrounds all or a portion of the circumference of the pipe not surrounded by the robot and (ii) a retracted state in which the curved arm exposes a circumferential gap about the pipe between a distal end of the curved arm and the robot, the circumferential gap being wide enough to allow the obstacle to pass therethrough as the robot traverses the pipe past the obstacle.

In some embodiments, a shape and dimensions of the curved arm complement those of the pipe.

In some embodiments, in the extended state, the dimensions of the circumferential gap are smaller than a diameter of the pipe such that the pipe cannot pass through the circumferential gap.

Embodiments of the present disclosure relate to a robot for traversing a length of a pipe. The robot includes an architecture that only partially surrounds a circumference of the pipe. The robot also includes one or more fail-safe mechanisms. Each fail-safe mechanism includes a curved arm configured to be selectably extended and retracted to (i) enclose at least a portion of the circumference of the pipe suitable to prevent the robot from falling off the pipe, and (ii) expose at least a portion of the circumference of the pipe wide enough to allow the obstacle to pass therethrough as the robot traverses the pipe past the obstacle.

In some embodiments, the architecture has an open portion wide enough for the pipe to pass through.

In some embodiments, the architecture is such that the robot is situated on only one side of the pipe when the robot is attached to the pipe and the one or more fail-safe mechanisms are retracted.

In some embodiments, the robot includes two or more fail-safe mechanisms where at least two of the two or more fail-safe mechanisms are positioned in the same lateral plane as one another.

In some embodiments, the robot includes two or more fail-safe mechanisms where at least two of the two or more fail-safe mechanisms are positioned at different longitudinal positions along a length of the robot.

BRIEF DESCRIPTION OF THE DRAWINGS

Illustrative, non-limiting example embodiments will be more clearly understood from the following detailed description taken in conjunction with the accompanying drawings.

FIG. 6B is another side view of a longitudinal alignment mechanism of the system for capturing radiography imagery, according to embodiments of the present disclosure.

FIG. 6D is a schematic diagram depicting the architecture of a sensing and controls system, according to embodiments of the present disclosure.

FIGS. 16A-16H are a series of perspective views demonstrating the order in which each fail safe mechanism can be selectably extended and retracted to pass a tangential obstacle, while maintaining maximum ability to prevent the robot from coming off the pipe, according to embodiments of the present disclosure.

FIG. 17E is an enlarged view of FIG. 16E, according to embodiments of the present disclosure.

DETAILED DESCRIPTION

Figure 1A:
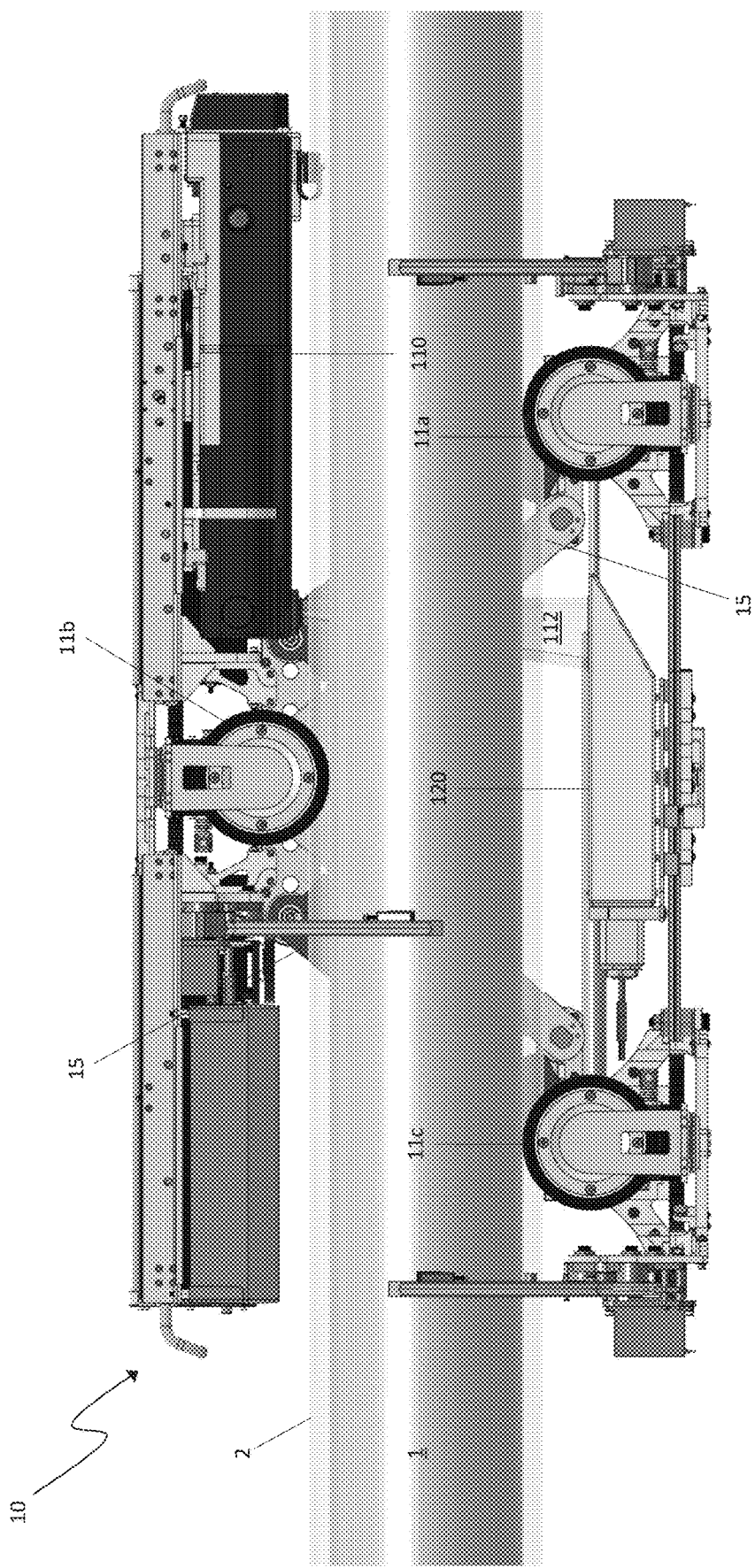
FIG. 1A is a side view of a system for capturing radiography imagery of a pipe, according to embodiments of the present disclosure.

The present disclosure is directed, in one aspect, to systems and methods for capturing radiography imagery via a platform (e.g., robot, vehicle) (collectively, "robot 10" for simplicity, embodiments of which are later described herein) configured to travel along an elongate structure (e.g., a pipeline, I-beam) (collectively, "pipe 1" for simplicity) to detect wall loss (e.g., corrosion, cracks, or other damage), corrosion by-product (e.g., scaling), defects, flaws, or anomalies (collectively, "anomalies" for simplicity) in pipe 1, as described in more detail herein. In another aspect, the present disclosure is directed to a fail-safe mechanism 300 configured to prevent robot 10 or other vehicle from falling off of pipe 1 while also allowing robot 10 to traverse obstacles 3 extending from or proximate pipe 1, as described in more detail herein.

Robot 10

Robot 10 may comprise any robot, pipe crawler, vehicle, or other device configured to traverse pipe 1. In the various embodiments shown, robot 10 includes a three-wheeled robotic apparatus having a clamping mechanism configured to pull the wheels against opposing sides of pipe 1 to secure the robotic apparatus thereto. The clamping mechanism is offset from an engagement plane of the wheels and travels alongside pipe 1. Opposite the clamping mechanism is an open side 12 that allows the robotic apparatus to be mounted onto pipe 1 and which can also be positioned (by reorienting the robot circumferentially on pipe 1) in alignment with obstacle 3 such that obstacle 3 passes through open side 12 unobstructed. Further information regarding the representative embodiment of robot 10 shown herein may be found in U.S. Pat. No. 10,465,835 issued Nov. 5, 2019 entitled "Pipe Traversing Apparatus and Methods" and U.S. Pat. No. 11,154,989 issued Oct. 26, 2021 and entitled "Pipe Traversing Apparatus, Sensing, and Controls," which are both incorporated herein by reference in their entireties for all purposes.

Radiography System 100

The present disclosure, in one aspect, is directed to radiography and, in particular, systems and methods for capturing radiography imagery via a platform (e.g., robot 10) configured to travel along a pipe 1 to detect anomalies in the surface of pipe 1.

Figure 1B:
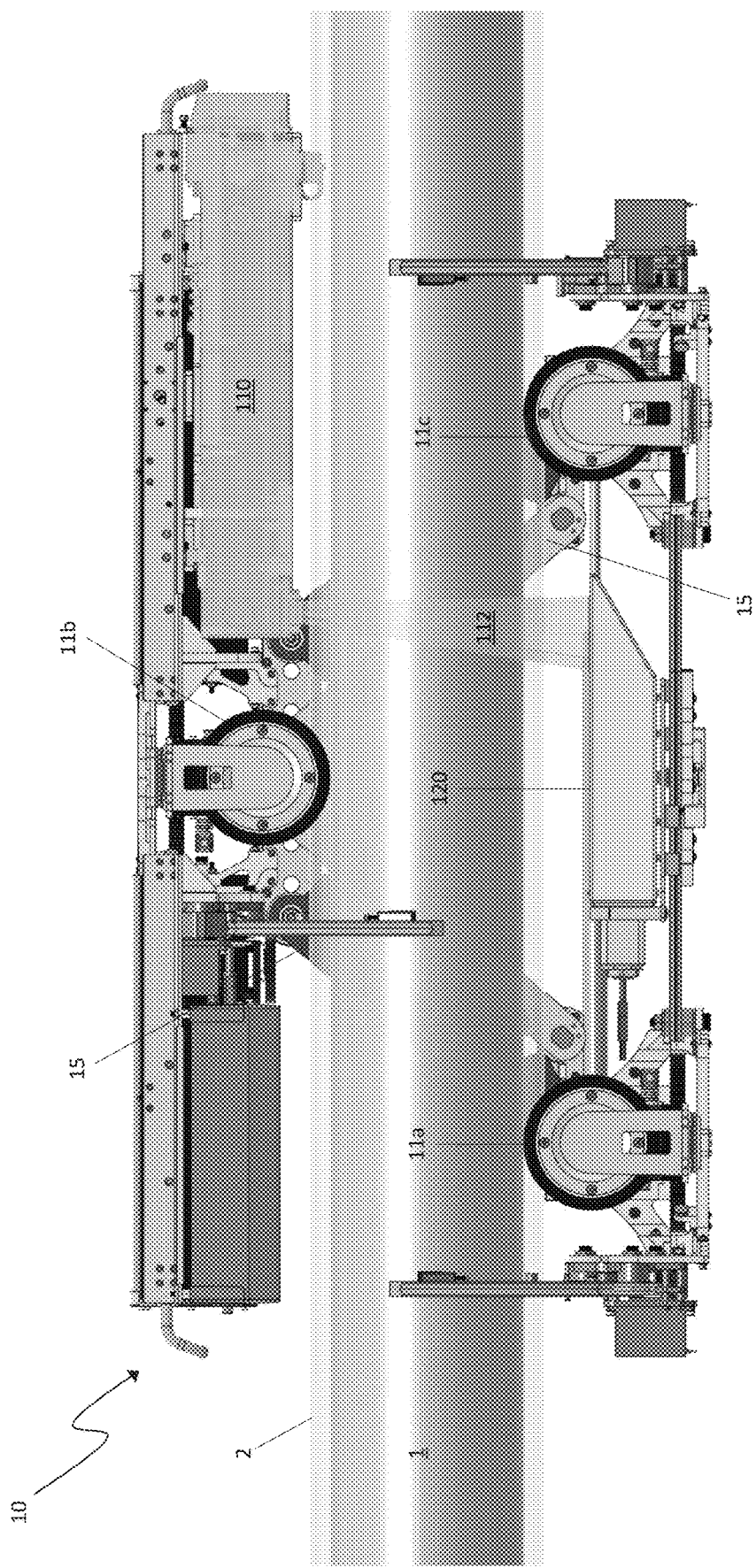
FIG. 1B is another side view of the system for capturing radiography imagery of a pipe, according to embodiments of the present disclosure.
Figure 1C:
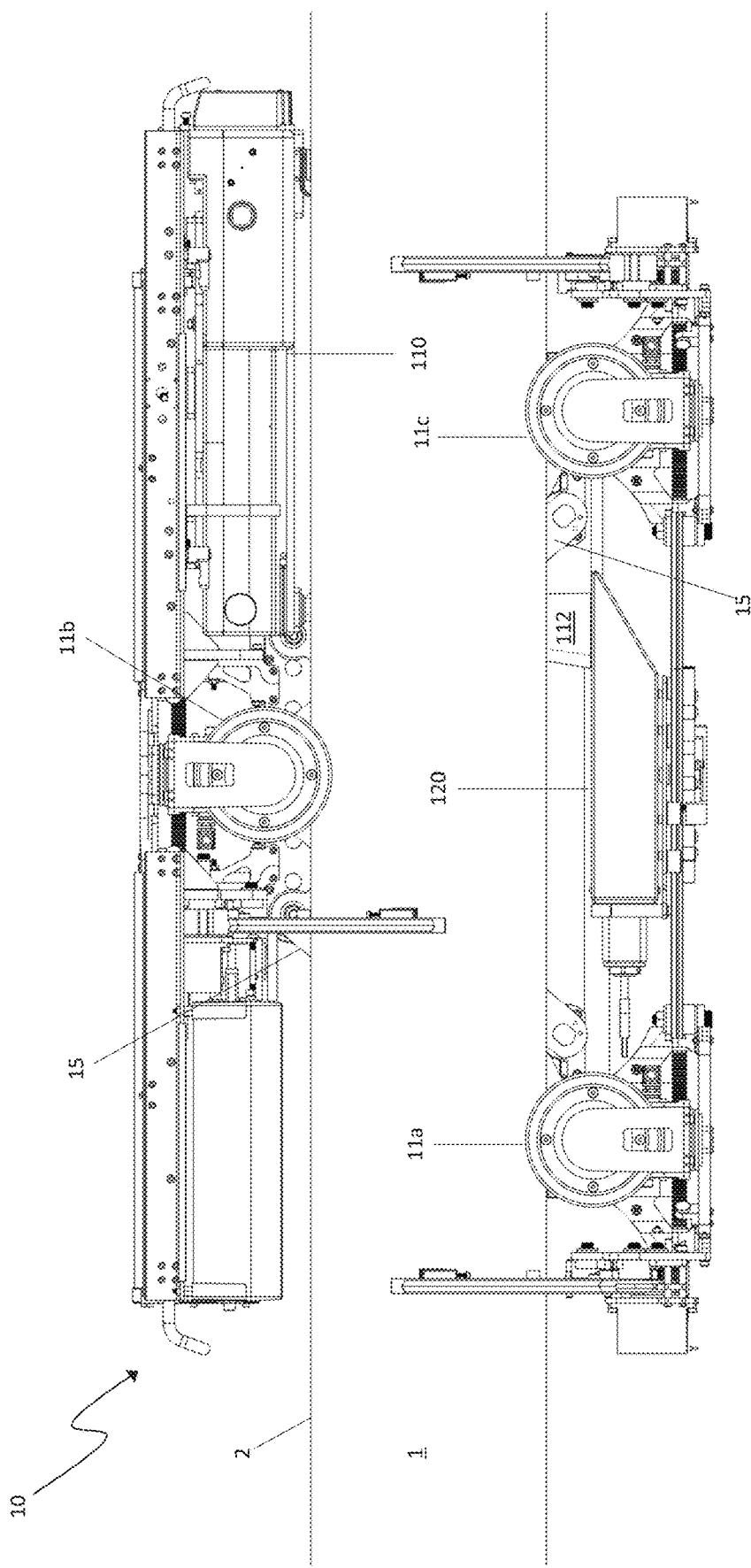
FIG. 1C is another side view of the system for capturing radiography imagery of a pipe, according to embodiments of the present disclosure.
Figure 2A:
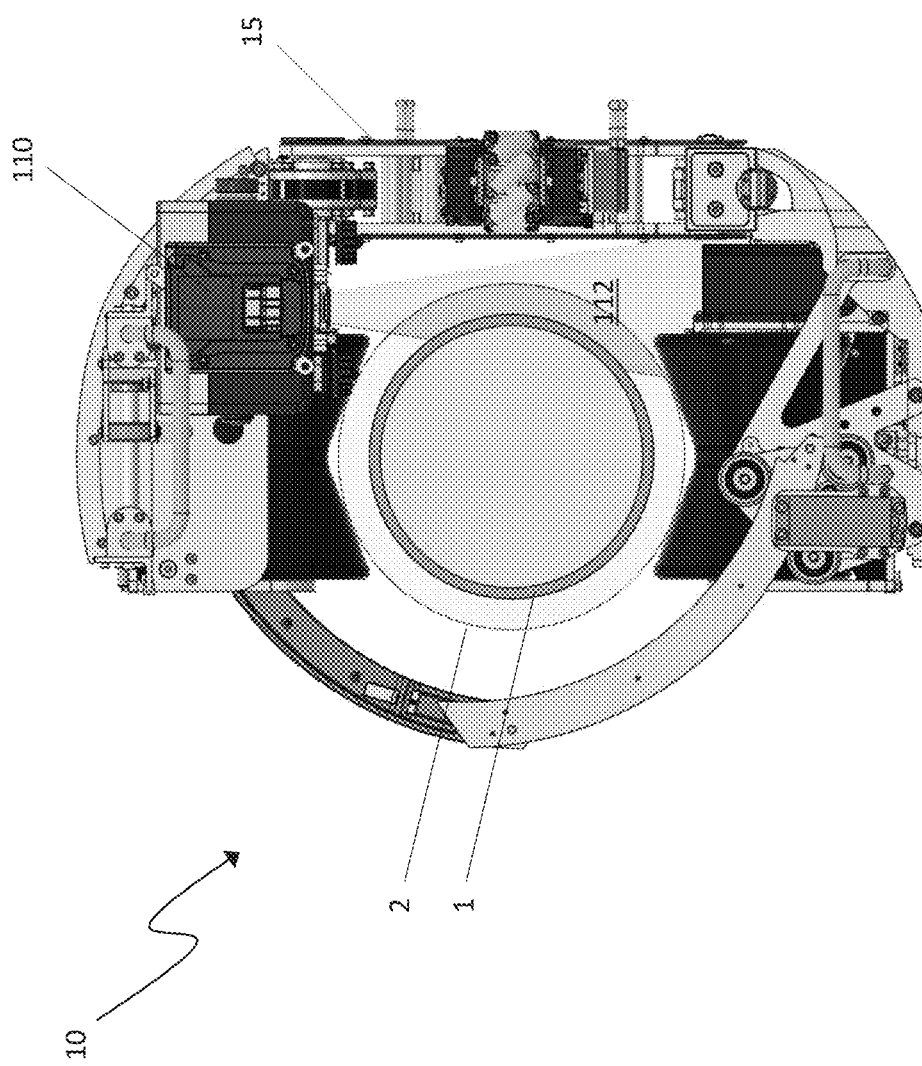
FIG. 2A is a front view of the system for capturing radiography imagery of a pipe, according to embodiments of the present disclosure.
Figure 2B:
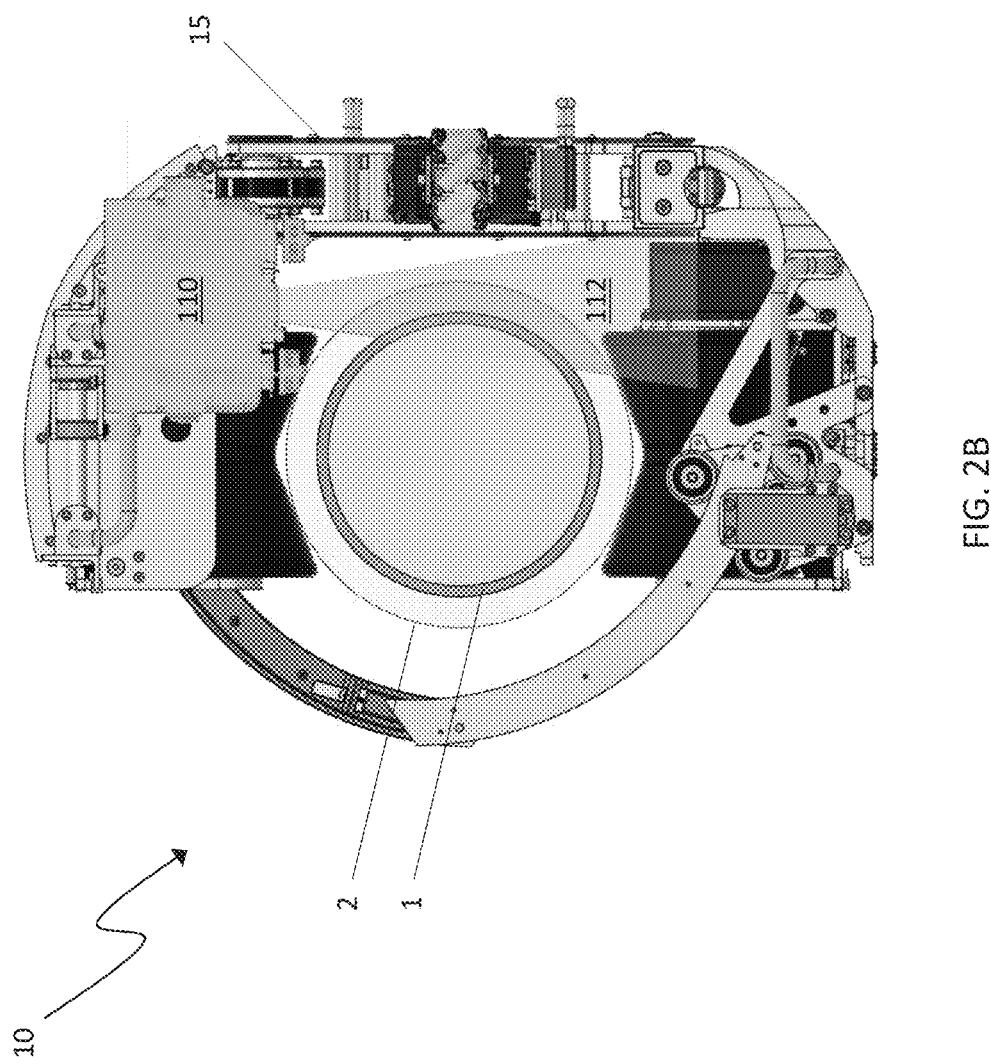
FIG. 2B is another front view of the system for capturing radiography imagery of a pipe, according to embodiments of the present disclosure.
Figure 2C:
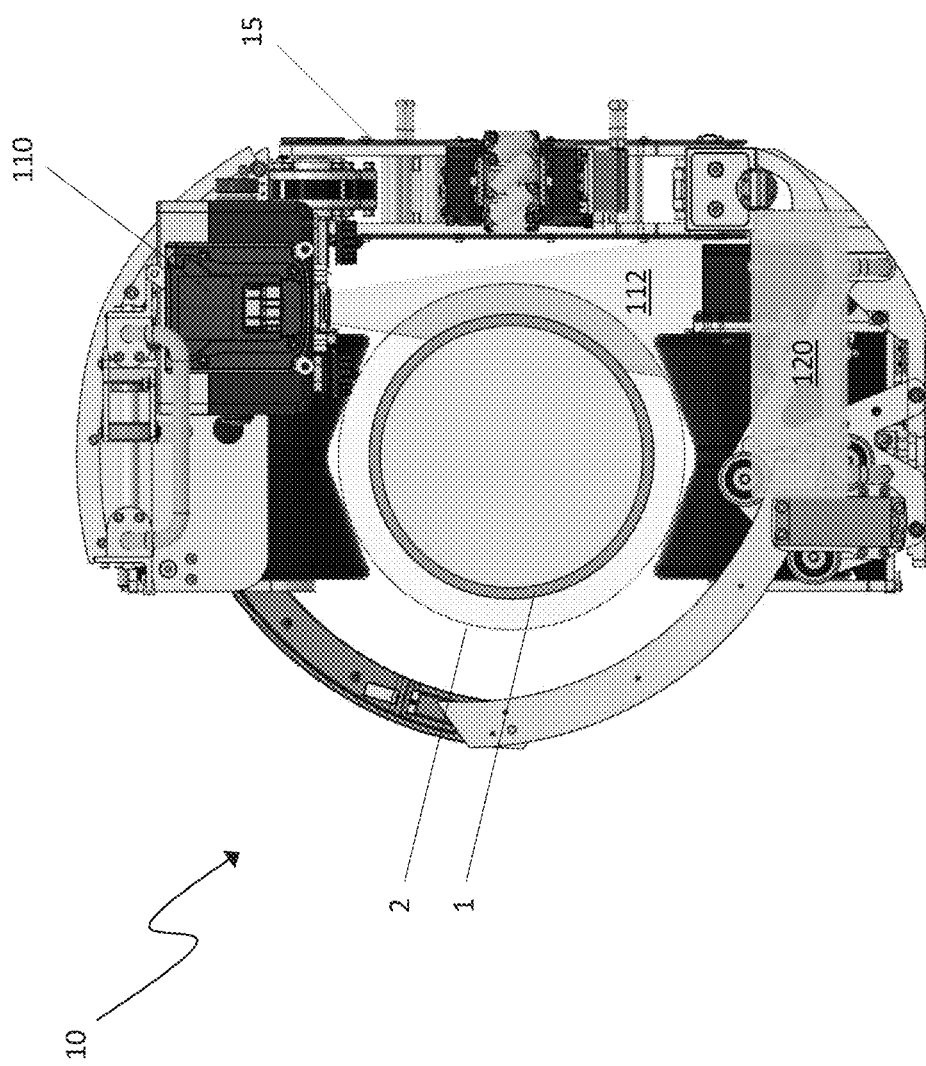
FIG. 2C is another front view of the system for capturing radiography imagery of a pipe, according to embodiments of the present disclosure.
Figure 2D:
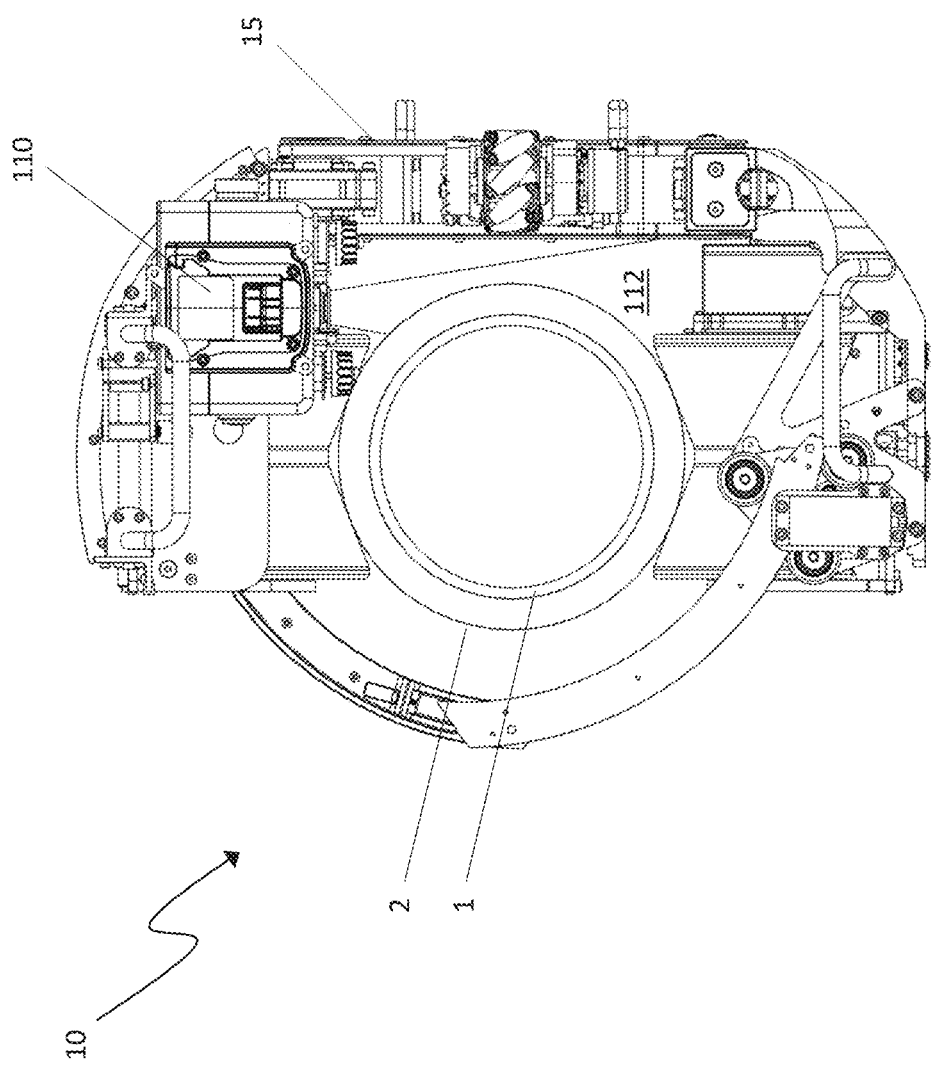
FIG. 2D is another front view of the system for capturing radiography imagery of a pipe, according to embodiments of the present disclosure.
Figure 3A:
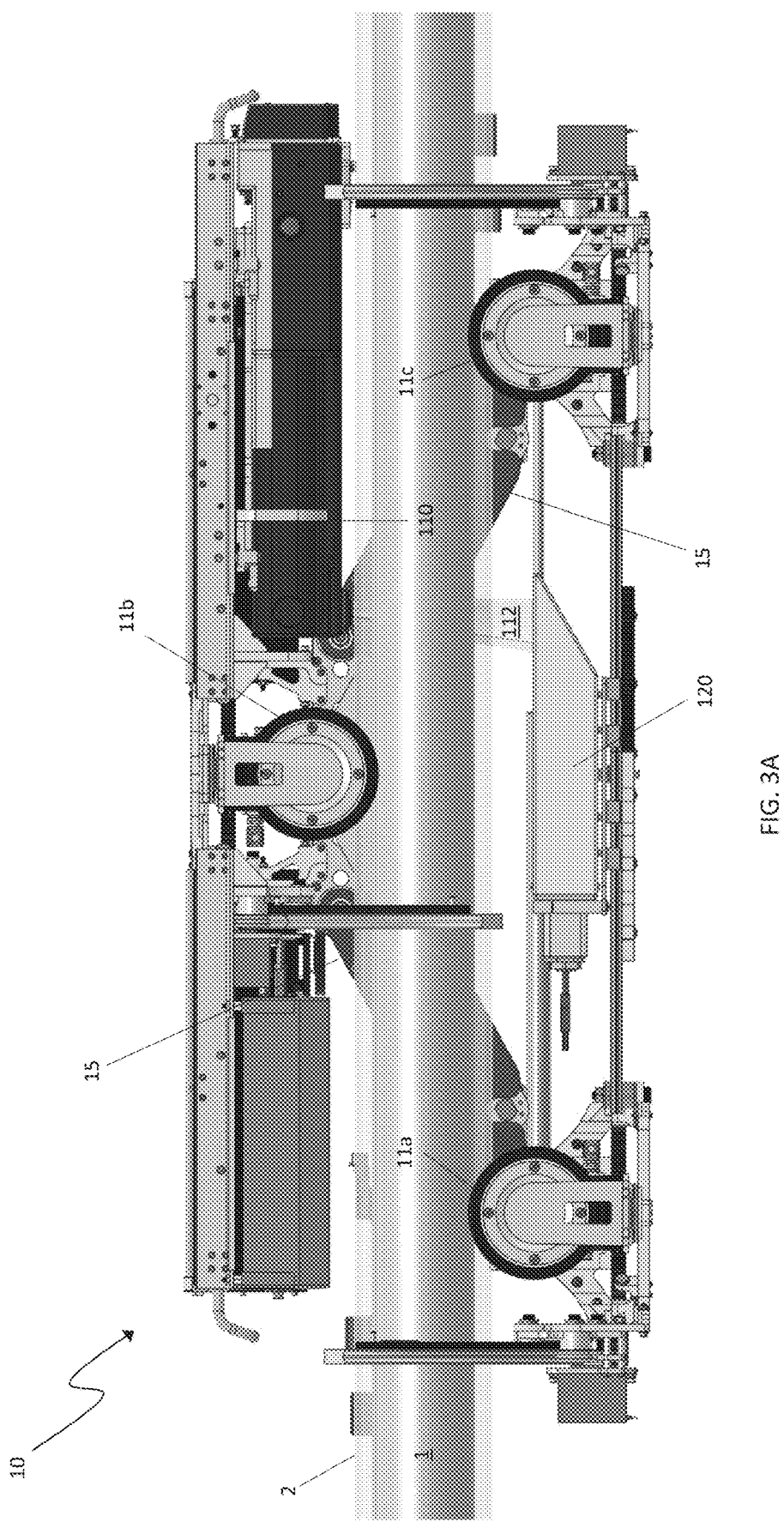
FIG. 3A is another side view of the system for capturing radiography imagery of a pipe with a small diameter pipe, according to embodiments of the present disclosure.
Figure 3B:
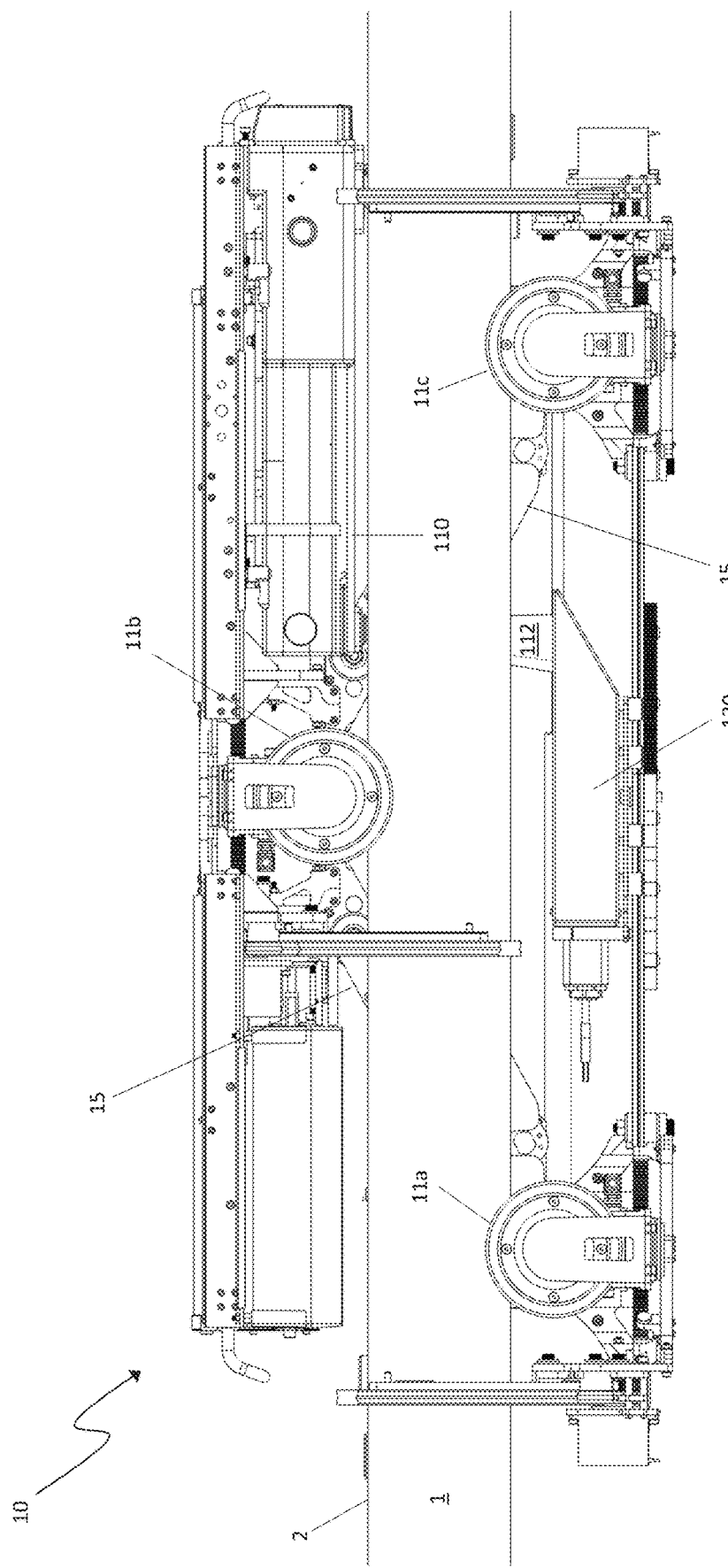
FIG. 3B is another side view of the system for capturing radiography imagery of a pipe with the small diameter pipe, according to embodiments of the present disclosure.

FIG. 1A, FIG. 1B, and FIG. 1C (side views) and FIG. 2A, FIG. 2B, FIG. 2C, and FIG. 2D (front views) illustrate side and front views of a representative system 100 for capturing radiography imagery of a pipe 1, as installed on a representative pipe crawling robot 10. Generally speaking, system 100 may be configured to direct radiation towards pipe 10 such that a first portion of the emitted radiation field 112 overlaps pipe 1 and a second portion of the emitted radiation field 112 passes by a corresponding periphery of pipe 1. Stated otherwise, system 100 may direct radiation field 112 tangential to an outer surface of pipe 1 such that a portion of radiation field 112 overlaps with pipe 1. By directing radiation field 112 towards pipe 1 in this manner, resulting imagery captures a "silhouette"-like view of the outer surface of pipe 1 and thus it is possible to see anomalies on the outer surface of pipe 1 without removing insulation layer 2, as later described in more detail. While radiation field 112 is shown as being cone-shaped in the FIGS. hereof, it should be recognized that the emitted radiation field 112 may be of any shape that results in a first portion of radiation field 112 overlapping pipe 1 and a second portion of the emitted radiation field 112 passing by a corresponding periphery of pipe 1 such that the resulting imagery captures a "silhouette"-like view of the outer surface of pipe 1 and thus it is possible to see anomalies on the outer surface of pipe 1 without removing insulation layer 2.

Embodiments of the present disclosure may utilize relatively low-energy, longer-wavelength radiation as opposed to higher-energy, shorter-wavelength radiation more characteristic of some industrial radiography systems. Generally speaking, while the use of relatively lower-powered, longer-wavelength radiation may limit the ability of system 100 to detect subsurface anomalies due to lack of penetration of the radiation field 112 through the entirety of pipe 1 to imager 120 (later described), such a configuration provides several benefits. In one aspect, system 100 can be smaller and lighter and have lower power requirements compared with more powerful systems. This can be very desirable when used with pipe traversing robots 10 in particular, as lighter weights and less bulky profiles may allow such robots 10 to more easily and efficiently climb vertical pipes 1, navigate around obstacles proximate to pipes 1 (e.g., an I-beam supporting pipe 1), be mounted to and detached from pipes 1 by just one or two persons, all while consuming less energy and thereby boosting operational endurance. Further, many higher-energy, shorter-wavelength systems—in particular, those using natural isotopes—generally require very heavy shielding (e.g., depleted uranium) and are subject to far more stringent regulatory and safety requirements. Still further, performing radiography through pipe 1 requires longer exposure (e.g., several seconds per image) and thus may drag out the inspection process significantly and be less suitable for use in real-or-near-time anomaly detection. Accordingly, in various embodiments, embodiments of the present disclosure may utilize x-ray tubes with an energy range between 40-70 kV.

Generally speaking, system 100 of the present disclosure can be used with any robot 10 that having an architecture that provides a clear path along which to project radiation field 112 to partially overlap with a periphery of pipe 1 as described herein. As such, system 100 may be compatible for installation on a wide variety of pipe traversing robots 10 and not just on the representative embodiment of robot 10 illustrated and described herein. Notwithstanding the foregoing, while the present disclosure does include lateral and longitudinal alignment mechanisms 130, 140 adapted for use with this particular embodiment of robot 10, it should be understood that the present disclosure is not intended to be limited to use with any particular robot 10 or any particular positioning or mounting hardware, so long as the necessary components of system 100 can be positioned relative to pipe 1 in accordance with the principles set forth in the present disclosure.

As shown in FIG. 1A, FIG. 1B, and FIG. 1C and FIG. 2A, FIG. 2B, FIG. 2C, and FIG. 2D, system 100 may generally include a radiation source 110 configured to generate and direct radiation field 112 towards a periphery of pipe 1 and an imager 120 positioned opposite source 110 to receive that portion of radiation field 112 not blocked by the periphery of pipe 1, as later described in more detail herein.

Radiation Source 110

System 100, in various embodiments, may include a radiation source 110 configured to generate and direct radiation field 112 towards a periphery of pipe 1. Radiation source 110, in various embodiments, may include any device suitable for generating radiation capable of penetrating insulation 2 or other pipe coverings and directing that radiation towards the periphery of pipe 1 and imager 120. Due to the positioning of radiation source 110 and imager 120 relative to the periphery of pipe 1, radiation source 110, in various embodiments, need not be capable of (or if capable, need not be configured to) penetrate pipe 1 when inspection only of the outer surface of pipe 1 is desired. In an embodiment, radiation source 110 may comprise an X-ray tube. One of ordinary skill in the art will recognize other suitable radiation sources in accordance with the teachings of the present disclosure.

Figure 4A:
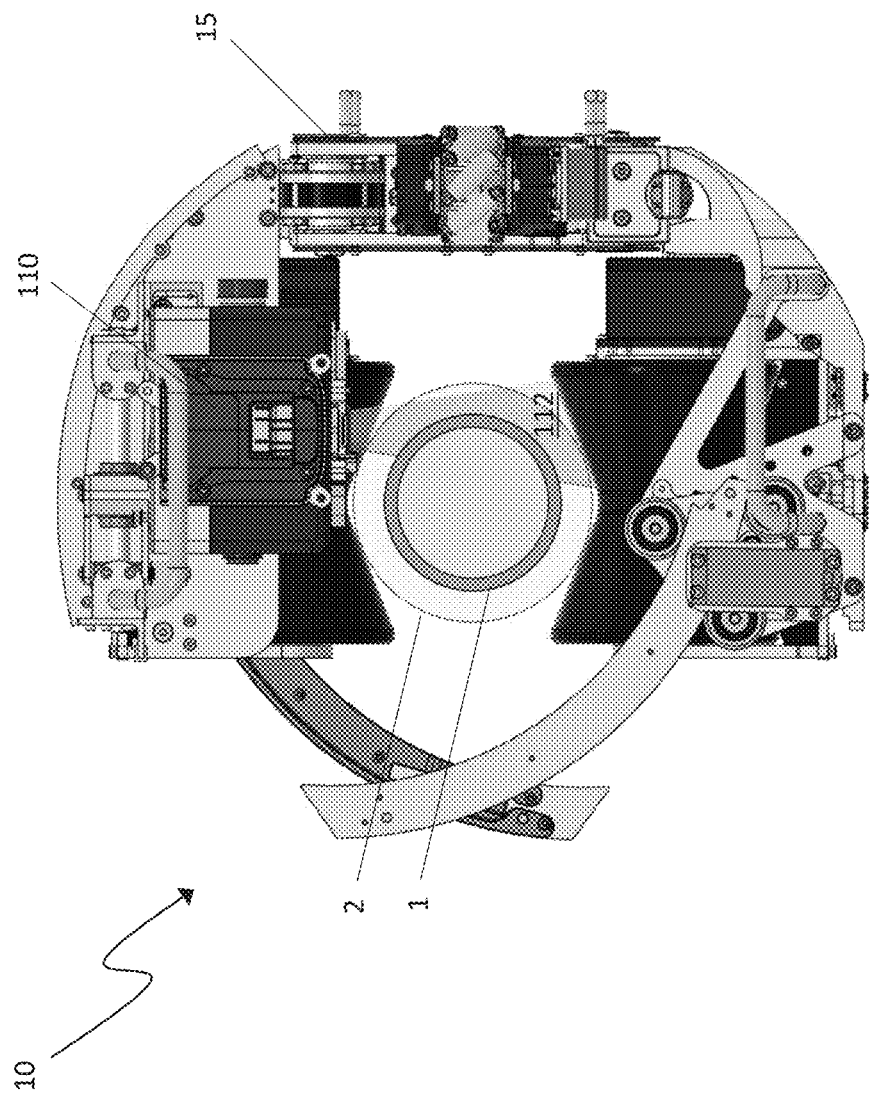
FIG. 4A is a front view of the system for capturing radiography imagery of a pipe with a small diameter pipe, according to embodiments of the present disclosure.
Figure 4B:
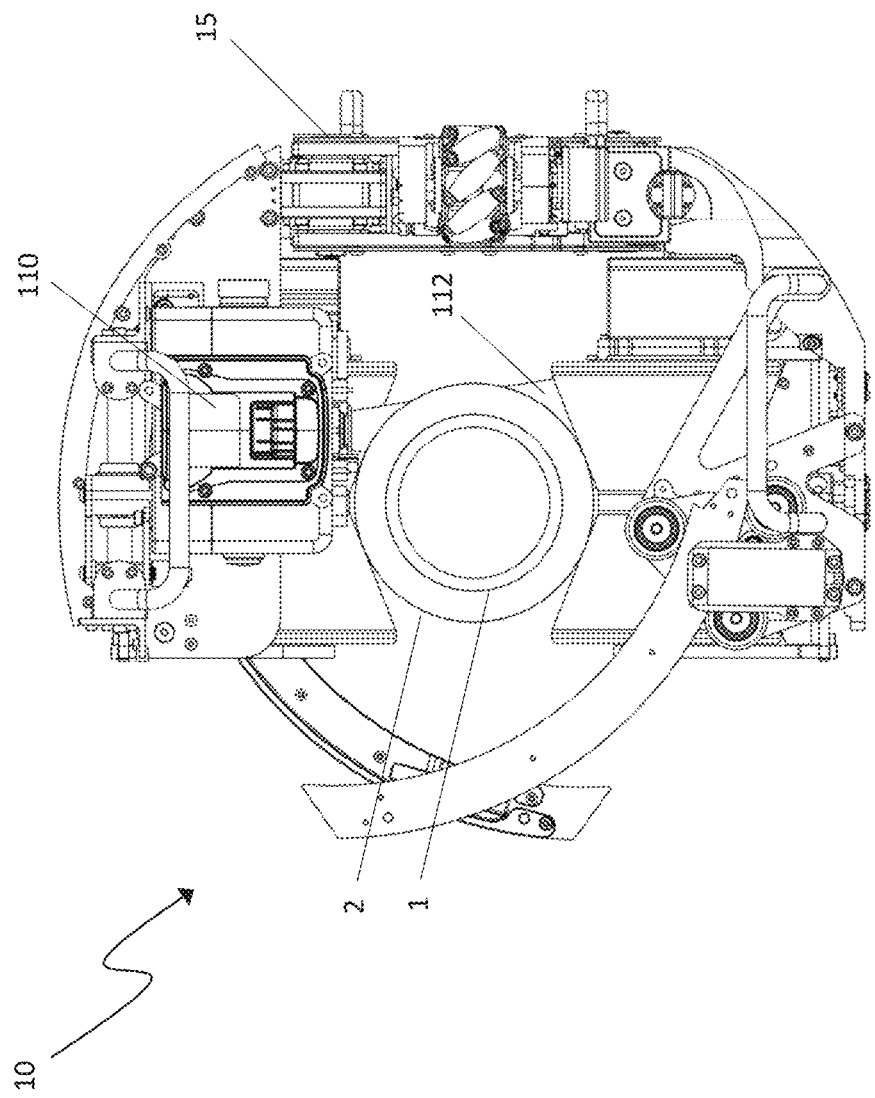
FIG. 4B is another side view of the system for capturing radiography imagery of a pipe with a small diameter pipe, according to embodiments of the present disclosure.
Figure 5A:
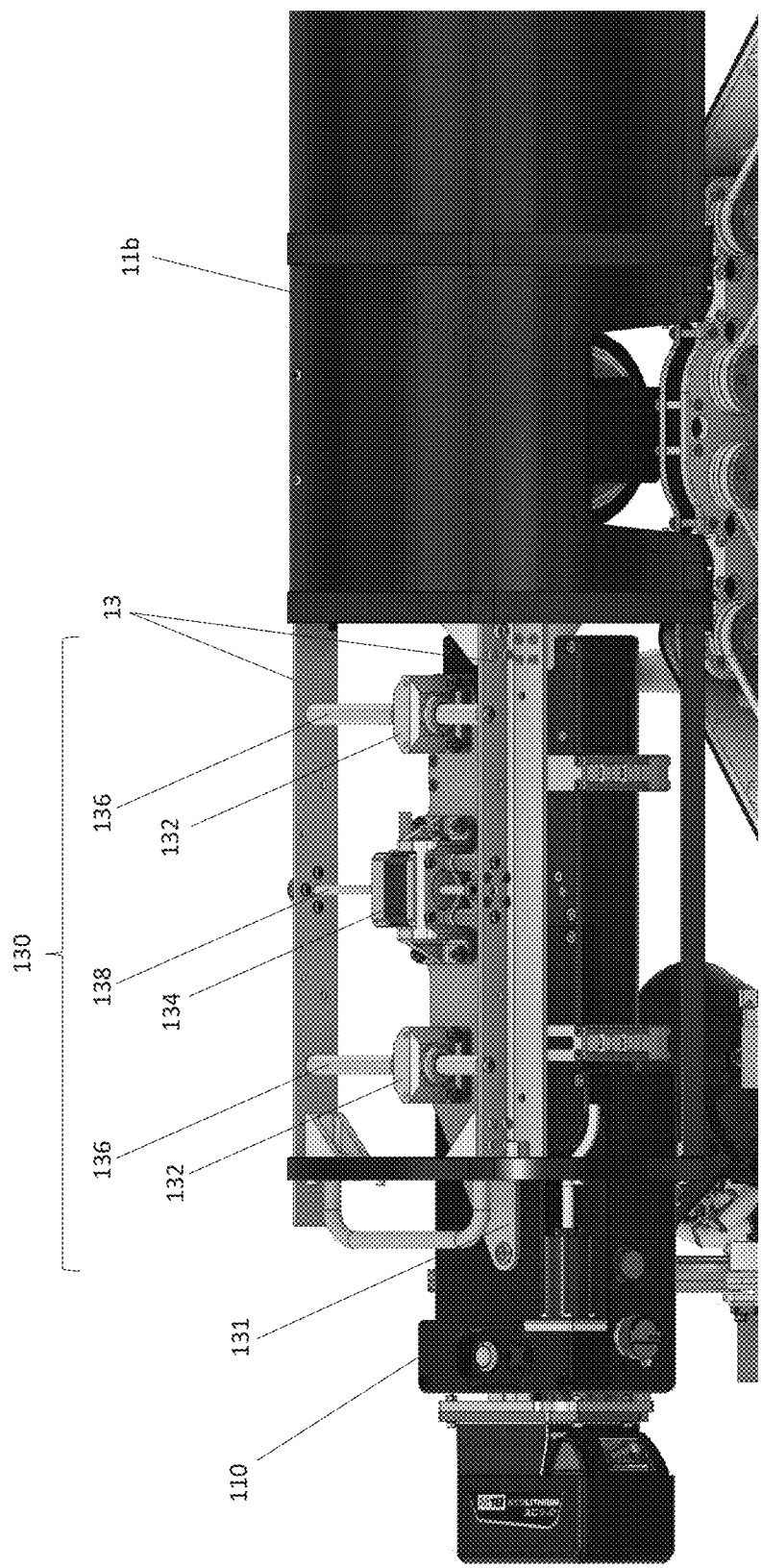
FIG. 5A is a side view of a lateral alignment mechanism of the system for capturing radiography imagery, according to embodiments of the present disclosure.
Figure 5B:
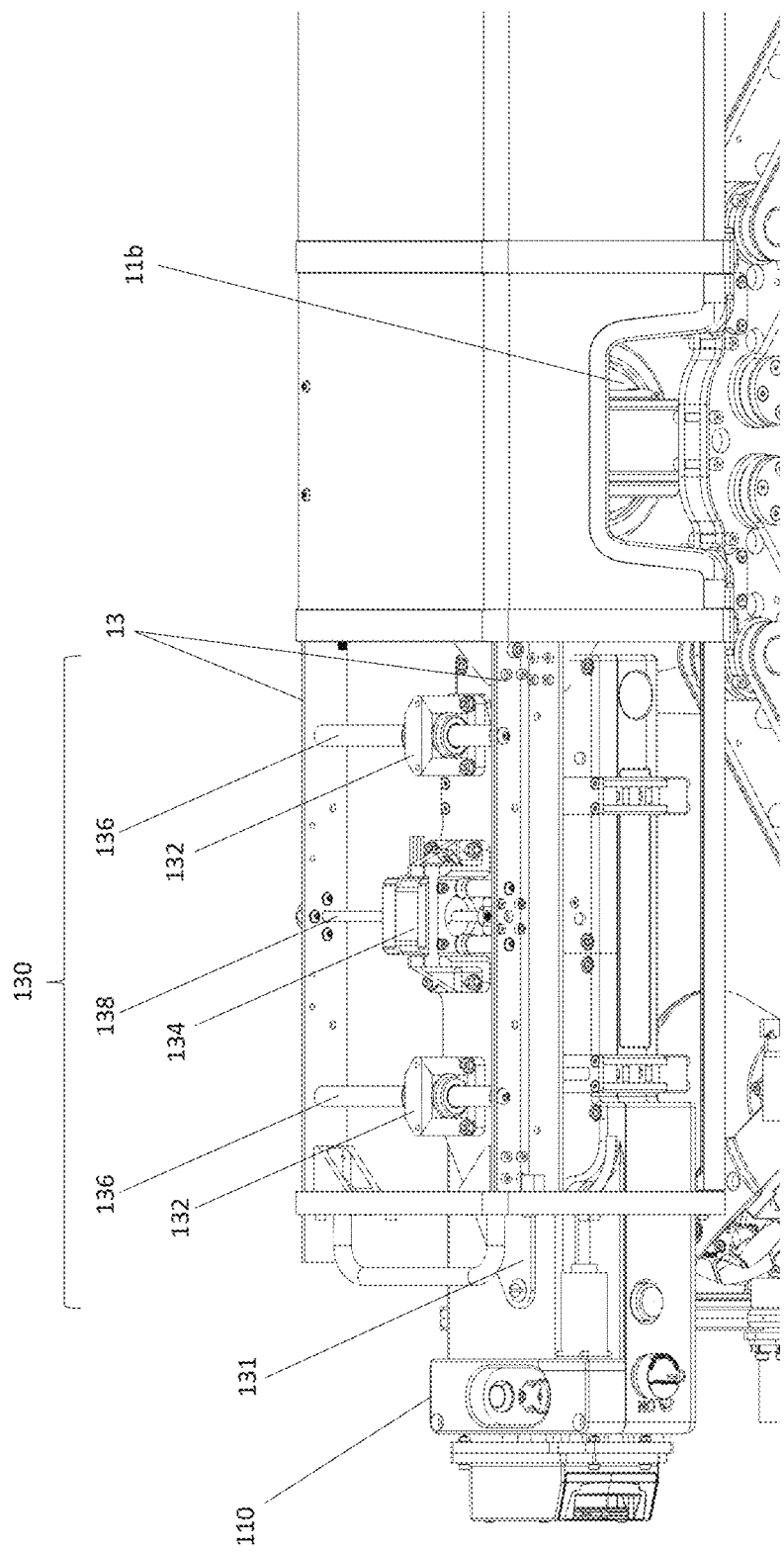
FIG. 5B is another side view of the lateral alignment mechanism of the system for capturing radiography imagery, according to embodiments of the present disclosure.
Figure 5C:
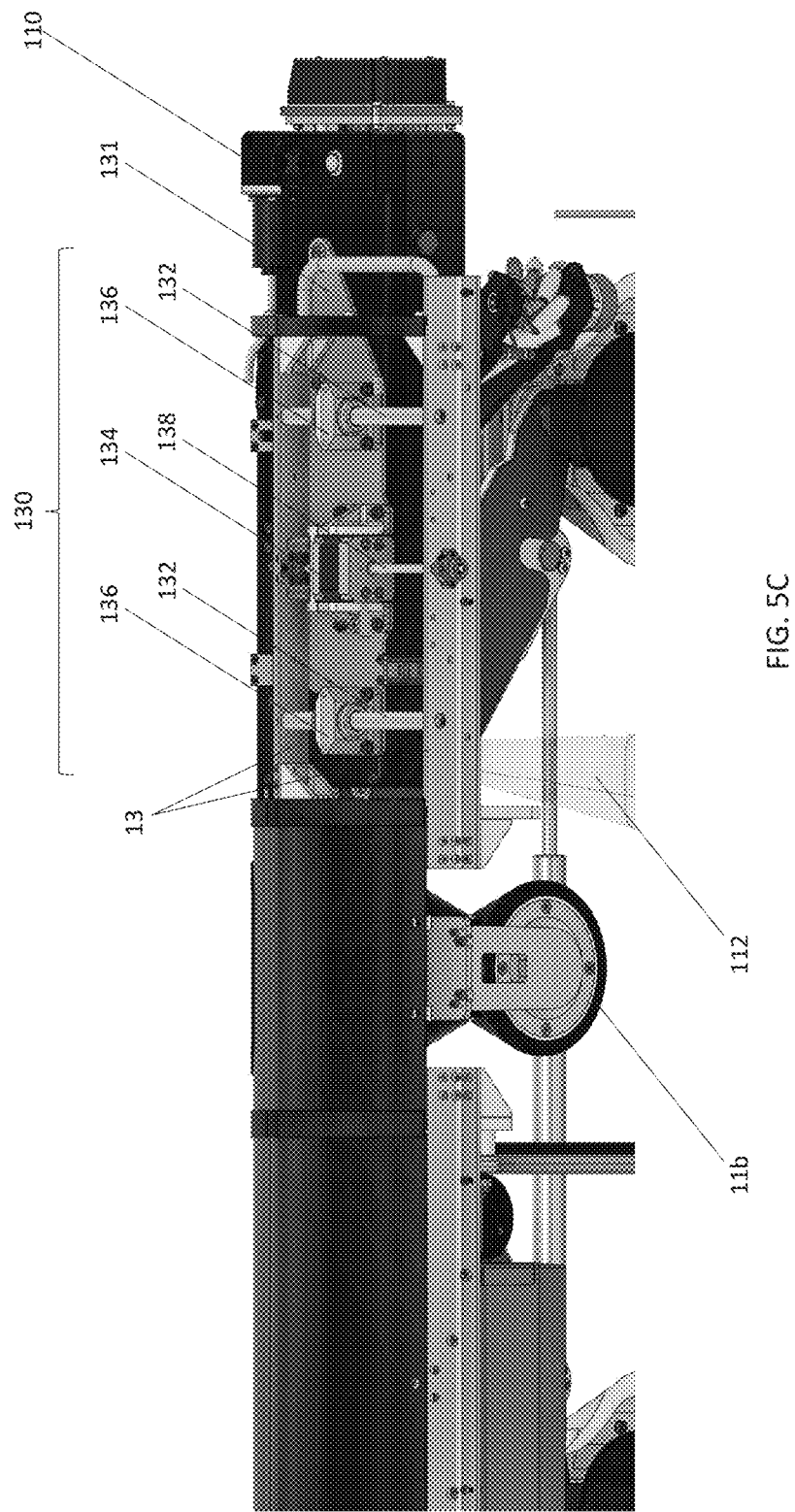
FIG. 5C is another side view of the lateral alignment mechanism of the system for capturing radiography imagery, according to embodiments of the present disclosure.
Figure 5D:
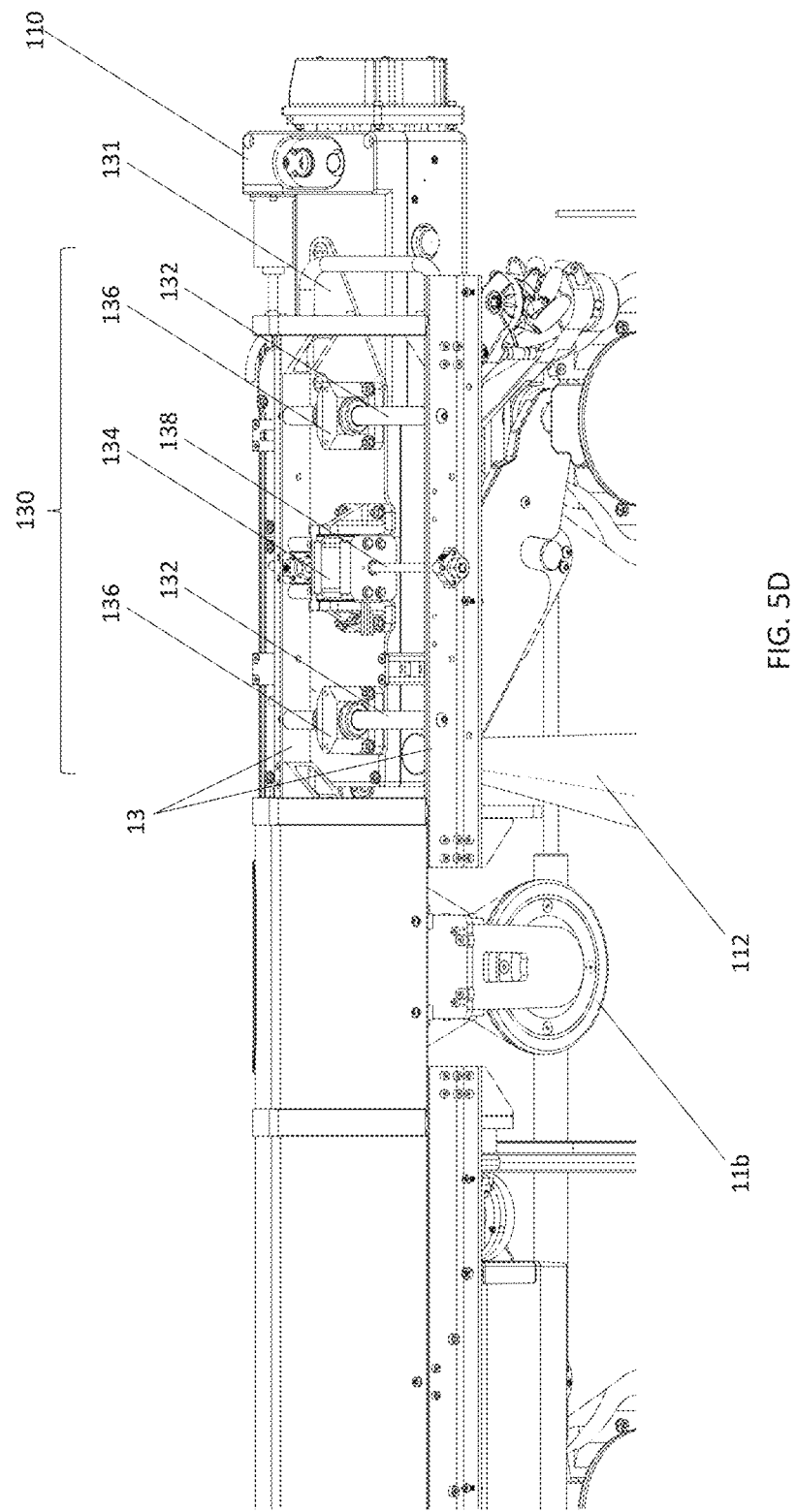
FIG. 5D is another side view of the lateral alignment mechanism of the system for capturing radiography imagery, according to embodiments of the present disclosure.
Figure 5F:
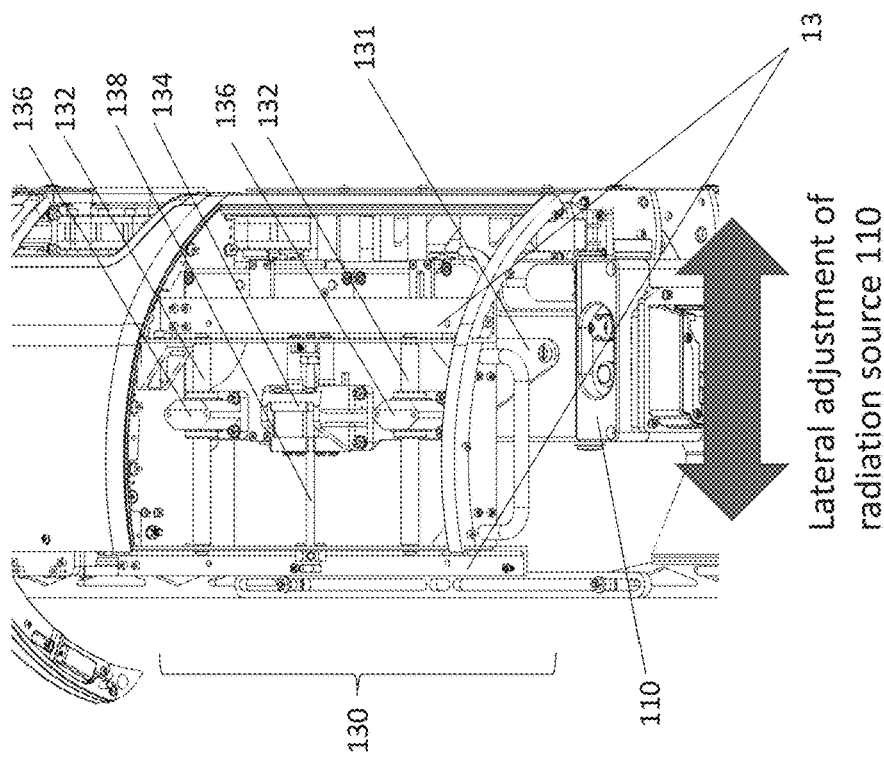
FIG. 5F is another top view of the lateral alignment mechanism of the system for capturing radiography imagery, according to embodiments of the present disclosure.
Figure 5E:
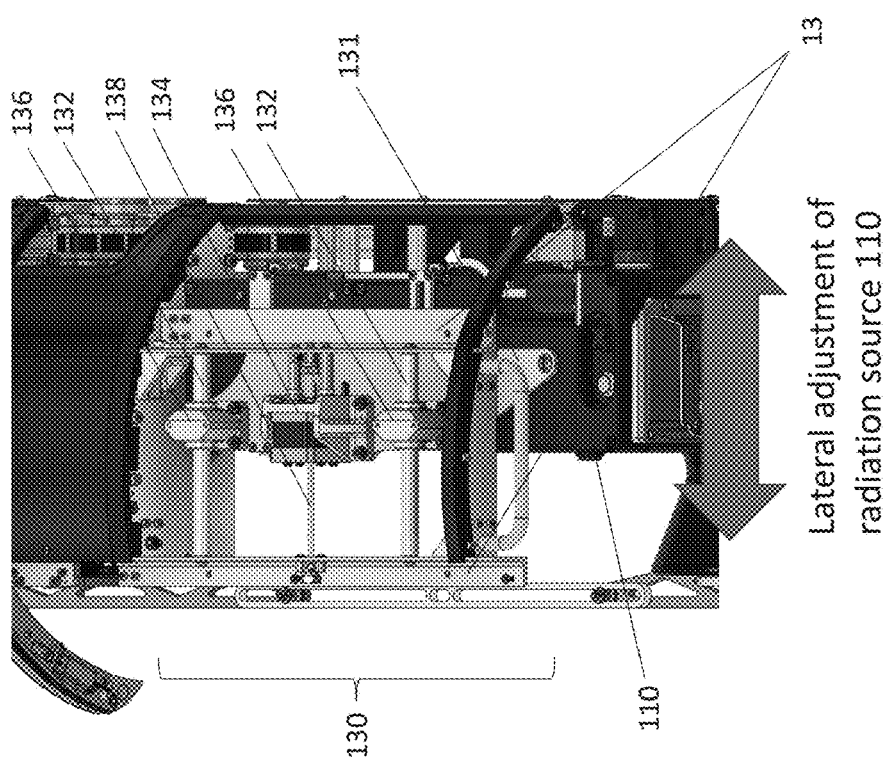
FIG. 5E is a top view of the lateral alignment mechanism of the system for capturing radiography imagery, according to embodiments of the present disclosure.

In the representative embodiment shown, radiation source 110 is mounted off to one side of robot 10 (i.e., laterally offset from a centerline plane shared by wheel assemblies 11) proximate wheel assembly 11a and directed downwards tangent to the side of pipe 1. The position of radiation source 110, in various embodiments, may be laterally adjustable to account for various pipe diameters. That is, radiation source 110 may be positioned closer to the centerline plane of robot 10 (i.e., smaller lateral offset) when used with smaller diameter pipes 1, but positioned farther away from the centerline plane of robot 10 (i.e., greater lateral offset) when used with larger diameter pipes 1, in each case such that radiation field 112 remains tangential to the periphery of pipe 1. For example, FIG. 4A and FIG. 4B show robot 10 on a small diameter pipe 1, with radiation source 110 positioned further inboard than in FIG. 2A, FIG. 2B, FIG. 2C, and FIG. 2D, which illustrates robot 10 on a large diameter pipe 1, with radiation source 110 positioned further outboard.

Imager 120

System 100, in various embodiments, may further include an imager 120 (e.g., detector plate) configured to receive and detect that portion of radiation field 112 not blocked by the periphery of pipe 1. To that end, imager 120, in various embodiments, may be positioned directly opposite of and facing radiation source 110. In the representative embodiment shown, imager 120 is mounted between wheel assembly 11a and wheel assembly 11c opposite radiation source 110, and offset from the centerline plane of robot 10. In an embodiment, the lateral position of imager 120 may be adjustable like that of radiation source 110 so as to keep imager 120 aligned with radiation source 110. Such a configuration may be advantageous when there is little clearance between pipe 1 and surrounding structures, as imager 120 can be positioned to stick out laterally only as far as needed to capture imagery along the periphery of pipe 1. In another embodiment, imager 120 may be wide enough such that its lateral position need not be adjusted to remain opposite radiation source 110.

Lateral Alignment Mechanism 130

The lateral position(s) of radiation source 110 and/or imager 120 may be adjusted in a variety of ways to maintain alignment with one another and tangential alignment of radiation field 112 with the periphery of pipe 1. In various embodiments, system 100 may comprise a lateral alignment mechanism 130 suitable for this purpose.

In various embodiments, lateral alignment mechanism 130 may include one or more shafts, rails, or other structures extending laterally from robot 10 on which radiation source 110 and or imager 120 are slidably coupled, for example, using linear bearings. In the representative embodiment shown in FIG. 5A, FIG. 5B, FIG. 5C, FIG. 5D, FIG. 5E, and FIG. 5F, lateral alignment mechanism 130 includes a mounting plate 131 that is slidably coupled to two guide rails 136 extending laterally between frame members of robot 100 by two linear bearings 132. Mounting plate 131 may be configured to couple to radiation source 110 (e.g., using screws, as shown) and thereby suspend radiation source 110 below guide rails 136. As configured, radiation source 110 can be moved laterally in either direction as linear bearings 132 slide along guide rails 136. In various embodiments, such as that shown here, lateral alignment mechanism may further include a motorized mechanism configured to move radiation source 110 laterally in either direction along guide rails 136. In the embodiment shown, the motorized mechanism includes a static lead screw 138 extending between the frame members and motor 134 configured to drive rotation of a nut about lead screw 138. As configured, driving rotation of the nut with motor 134 causes motor 134 to move laterally in either direction depending on the direction of rotation. By coupling motor 134 to mounting plate 131, radiation source 110 moves laterally along guide rails 136 as motor 134 moves laterally along static lead screw 138. In this manner, motor 134 can be actuated to control the lateral position of radiation source 110 relative to robot 100 and thereby maintain tangential alignment of radiation field 112 with the periphery of pipe 1. In various embodiments, mounting plate 131 may be optional; that is, linear bearings 132 and motor 134 may indirectly couple (e.g, via mounting plate 131) or directly couple (e.g., attach directly) to radiation source 110. It should be further recognized that, in various embodiments, any suitable number of pairs of linear bearing 132 and guide rails 136 (e.g., one or more) may be used to support the suspension and movement of radiation source 110 relative to robot 10.

In an embodiment, imager 120 may be wide enough such that its lateral position need not be adjusted to remain opposite radiation source 110, and thus only the lateral position of radiation source 110 may be adjustable. In another embodiment, the lateral positions of both radiation source 110 and imager 120 may be separately adjustable. In yet another embodiment, the lateral positions of both radiation source 110 and imager 120 may be physically and/or electronically coupled such that both move together.

Lateral position adjustments, in various embodiments could be manual. For example, an operator may loosen and tighten a clamp, or remove and insert a pin, of lateral alignment mechanism 130 to allow radiation source and/or imager 120 to be repositioned and locked in place, respectively. Likewise, in another example, an operator may manually operate a motor (e.g., via remote control) of lateral alignment mechanism 130 to reposition radiation source 110 and/or imager 120.

Additionally or alternatively, lateral position adjustments, in various embodiments, could be automated. For example, lateral alignment mechanism 130 may be configured with a control system 150 to automatically adjust the lateral position(s) of radiation source 110 and/or imager 120, as later described in more detail.

It should be recognized that, while lateral adjustment mechanism 130 is primarily described herein in connection with adjusting the lateral position of radiation source 110, a similar lateral adjustment mechanism 130 may additionally or alternatively be employed to adjust the lateral position of imager 120 to maintain alignment of the imager with the radiation source such that the imager receives the second portion of the radiation field emitted from the radiation source.

Longitudinal Alignment Mechanism 140

While the relative longitudinal alignment of imager 120 and radiation source 110 may remain fixed when installed on many robots 10, the components of some robots may morph or change position relative to one another depending on the diameter of pipe 1 or other factors. If either or both of imager 120 and radiation source 110 is mounted to such components, imager 120 and radiation source 110 may not be properly aligned in a longitudinal direction to capture imagery for inspecting the outer surface of pipe 1. For example, in the embodiment of robot 10 shown, wheel assemblies 11a, 11b, 11c are mounted to a clamping mechanism 15 that allows wheel assembly 11a and wheel assembly 11c to pivot about wheel assembly 11b to accommodate different pipe diameters. Were imager 120 fixedly mounted between wheel assemblies 11a, 11c, these wheel assemblies 11a, 11c would be rigidly connected to one another and unable to pivot as needed. Likewise, were imager 120 mounted to only wheel assembly 11a or to wheel assembly 11c, these wheel assemblies 11a, 11c may be able to pivot however imager 120 would move longitudinally with movement of the wheel assembly 11a or 11c to which it is attached, thereby taking imager 120 out of longitudinal alignment with radiation source 110 mounted to wheel assembly 11b.

Figure 6A:
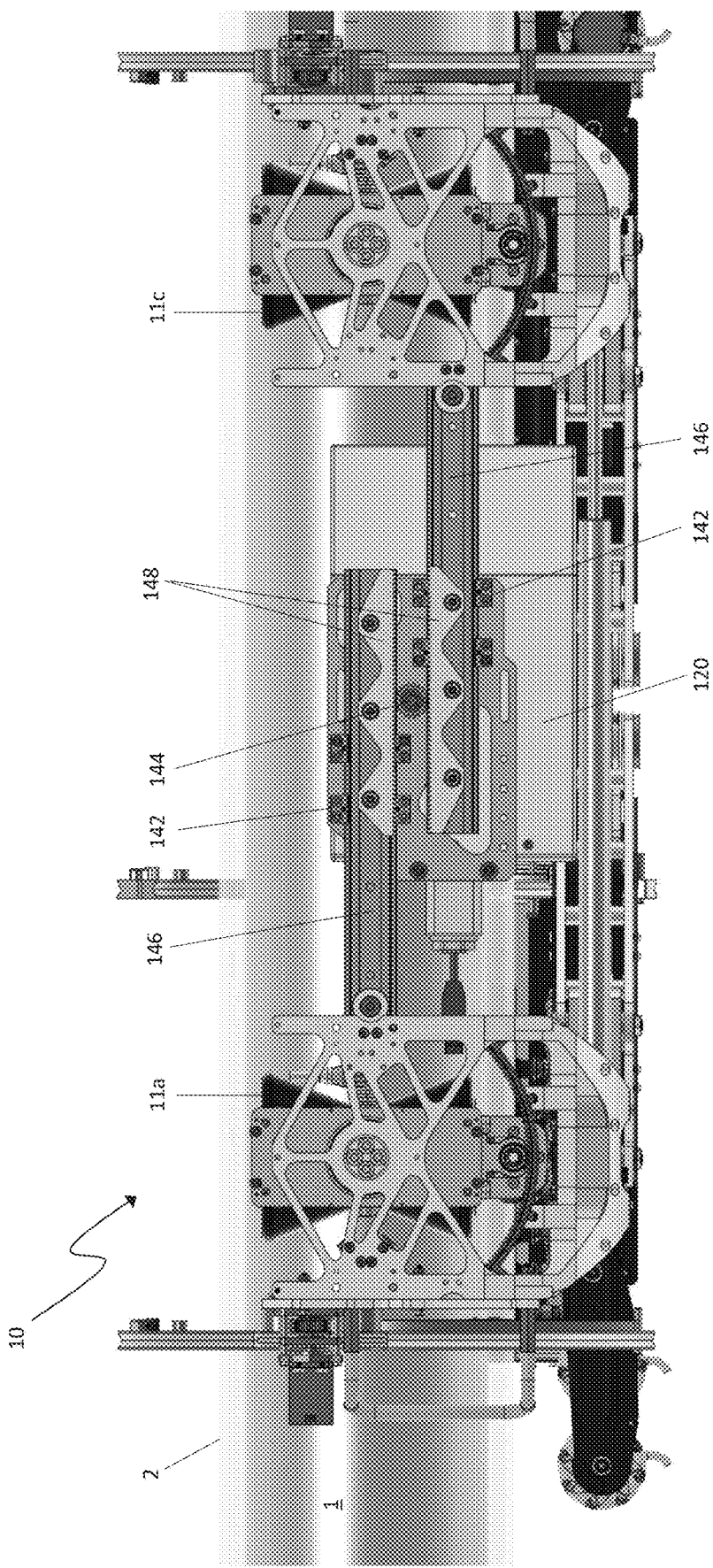
FIG. 6A is a side view of a longitudinal alignment mechanism of the system for capturing radiography imagery, according to embodiments of the present disclosure.
Figure 6C:
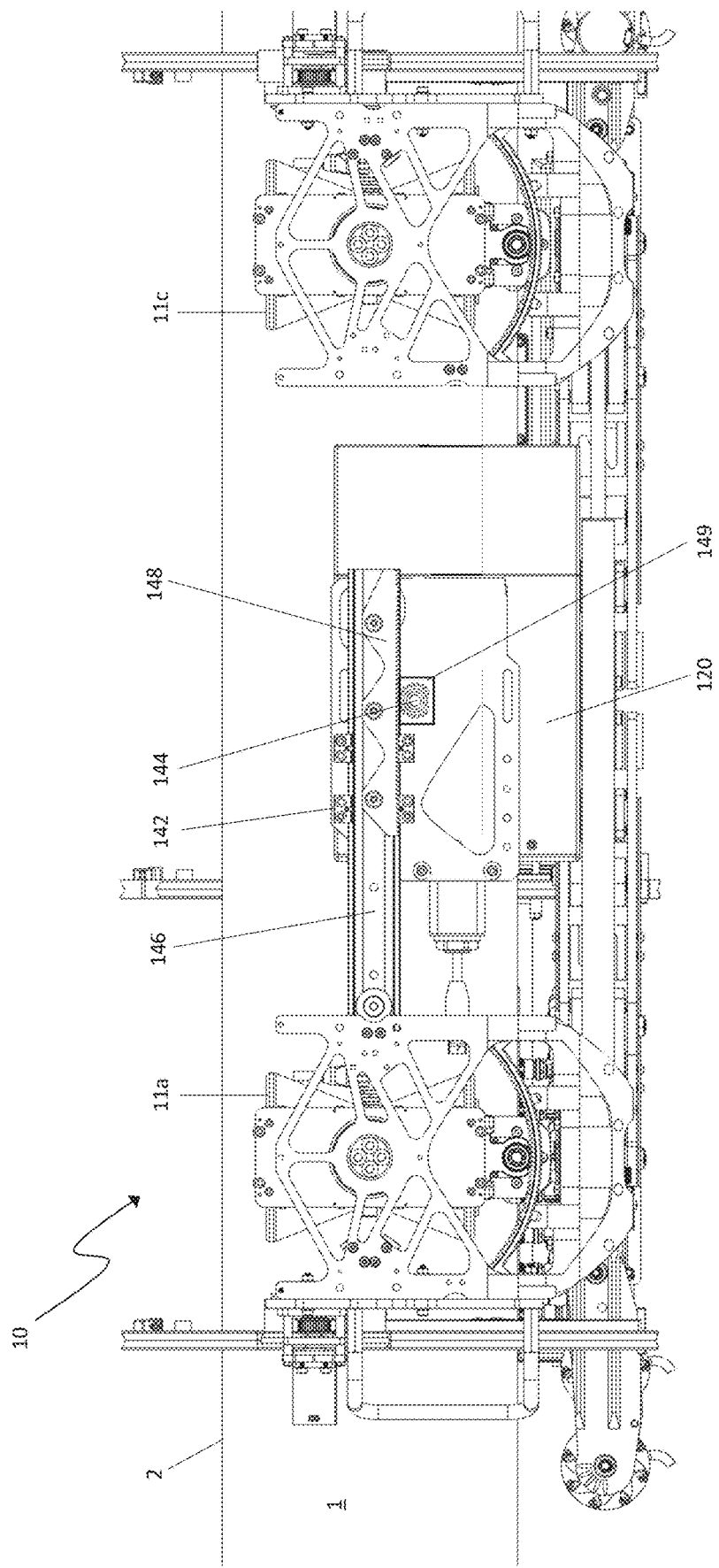
FIG. 6C is another side view of a longitudinal alignment mechanism of the system for capturing radiography imagery, according to embodiments of the present disclosure.

To address this issue, system 100, in various embodiments, may optionally include a longitudinal alignment mechanism 140 configured to ensure longitudinal alignment of imager 120 with radiation source 110, regardless of whether robot 10 is on a larger diameter pipe (as shown in FIG. 1A, FIG. 1B, FIG. 1C and FIG. 2A, FIG. 2B, FIG. 2C, and FIG. 2D) or on a smaller diameter pipe (as shown in FIG. 3A, FIG. 3B, FIG. 3B and FIG. 4A, 4B) Longitudinal alignment mechanism 140, in various embodiments, may include a double rack and pinion mechanism, as best seen in FIGS. 6A and 6B. In the embodiment shown, mechanism 140 includes two rigidly-mounted linear bearings 142 and a pinion 144 that is free to rotate. Two rails 146 are mounted to wheel assemblies 11a and 11c, respectively, and each rail 146 can slide along linear bearings 142. Each rail 146 also has a gear rack 148 that engages with pinion 144. Since rails 146 are coupled to each other through gear racks 148 and pinion 144, each can only move by the same linear distance in opposite directions relative to imager 120. As a result, imager 120 stays centered between wheel assembly 11a and wheel assembly 11c while permitting wheel assemblies 11a, 11c to pivot relative to wheel assembly 11b. There are other mechanisms that a person having ordinary skill in the art would recognize as alternatives for keeping one component centered between two linearly moving mounting points and as such, the present disclosure is not intended to be limited to only the particular embodiment shown. Alternative mechanisms include linear rails with equal springs pushing/pulling from each wheel assembly 11a, 11c, mounting imager 120 to the center pin of a scissor mechanism, or using a linear actuator to actively control the distance from one of wheel assemblies 11a, 11c. FIG. 6C illustrates yet another embodiment of longitudinal alignment mechanism 140 utilizing a single rail 146 and a motorized rack and pinion mechanism. As shown, a linear bearing 142 is rigidly mounted to wheel assembly 11a and a rail 146 can slide along linear bearing 142. Rail 146 has a gear rack 148 that engages with pinion 144. A motor 149 drives rotation of pinion 144 which, in turn, causes rail 146 to slide along linear bearing 142, moving imager 120 with it and thereby adjusting a longitudinal position of imager 120. In various embodiments, the operation of motor 149 may be controlled by processor 154 of control system 150, which may be programmed to determine an appropriate distance and direction in which to move imager 120 for the purposes described herein based on the diameter of the pipe 1, as later described in more detail in the discussion of control system 150.

In principle the position of imager 120 and radiation source 110 could be inversed, but the aforementioned configuration is ideal for the form factor of the particular radiation source 110 and imager 120 used in the representative embodiment of system 100 shown herein. Further, radiation source 110 and imager 120 could also be mounted at other orientations with respect to robot 10, as long as they are directly opposing each other and pipe 1 is properly aligned between them. In the representative embodiment of robot 10 shown herein, it should be noted that radiation source 110 and imager 120 are not mounted along the open side of robot 10 (i.e., the side opposite clamping mechanism 15) to enable robot 10 to pass obstacles as further described herein and in the incorporated patents and patent applications. This leaves the current mounting position as the ideal choice. Still further, it should be recognized that longitudinal alignment mechanism 140 may be adapted for use in ensuring radiation source 110 and adapter 120 remain in lateral alignment when installed on embodiments of robot 10 in which components to which each is mounted move laterally relative to one another during operation.

Longitudinal position adjustments, in various embodiments, could be manual. For example, an operator may loosen and tighten a clamp, or remove and insert a pin, of longitudinal alignment mechanism 140 to allow radiation source and/or imager 120 to be repositioned and locked in place, respectively. Likewise, in another example, an operator may manually operate a motor (e.g., via remote control) of longitudinal alignment mechanism 140 to reposition radiation source 110 and/or imager 120.

Additionally or alternatively, longitudinal position adjustments, in various embodiments, could be automated. For example, longitudinal alignment mechanism 140 may be configured with a control system 150 to automatically adjust the longitudinal position(s) of radiation source 110 and/or imager 120, as later described in more detail.

Control System 150

FIG. 6D depicts the architecture of a representative sensing and controls system 150 for use in automatically adjusting the position of at least one of the radiation source 110 and the imager 120 based on the diameter of pipe 1 via lateral alignment mechanism 130 and longitudinal alignment mechanism 140 (collectively, along with any other mechanisms configured to adjust a position of radiation source 110 and/or imager 120 to achieve the desired alignment(s) thereof, mechanisms 160) in various embodiments of the present disclosure.

As used herein, the term "automatically adjust" and derivatives thereof means to cause radiation source 110 and/or imager 120 to move to a desired position without guidance from an operator, wherein the desired position is based on a diameter of pipe 1. In some respects, automatic adjustments may be electronically controlled and implemented by control system 150, using pipe diameter as an input to certain control algorithms designed to effect the desired positioning, as further described in more detail in this section. Control system 150 would be considered a part of electronically-controlled embodiments of mechanism 160 in such cases. In other respects, automatic adjustments may be implemented by way of the mechanical design of mechanism 160 only (i.e., without control system 150) in response to some physical trigger that can be related to the diameter of pipe 1, such as the movement of robot 10 as previously described in the context of the embodiment of longitudinal alignment mechanism 140 shown in FIG. 6A and FIG. 6B. Whether implemented electronically or mechanically, such adjustments in the positioning of radiation source 110 and/or imager 120 by way of a mechanism 160 is considered to be "automatic" because either control system 150 or the mechanical design of mechanism 160 implements the position adjustments based on pipe diameter without further guidance from an operator. In other words, the operator need not use a joystick or other operator interface to steer radiation source 110 and imager 120 into their desired positions; the control algorithms or the mechanical design of mechanism 160 handles it without the need for guidance from the operator.

Control system 150, in various embodiments, may generally include sensor(s) 152, a processor(s) 154, memory(s) 156, and actuator(s) or motor(s) 158 (such actuator(s) and motor(s) being referred as motor(s) 158 for simplicity), as later described in more detail. While described as separate components, one of ordinary skill in the art will recognize sensor(s) 152, processor(s) 154, and memory(s) 156, motor(s) 158 or any combination of all or some of these components, may be provided as subcomponents of computer hardware having corresponding functionalities. For example, memory(s) 156 and processor(s) 154 may be provided in combination in the form of a microcontroller, along with input/output peripherals for connecting to sensor(s) 152, actuator(s)/motors(s) 158, and the like. In various embodiments, references to various sensing and robotic controls methodologies throughout the present disclosure may be enabled using control system 150.

It should be further recognized that control system 150 may optionally include one or more human-machine interfaces (not shown), such as a handheld remote and a laptop computer, to provide input to control system 150 (e.g., send instructions to processor 154) and/or to receive and monitor real-time output from sensors 152. Representative inputs include, without limitation, joystick controls and button-presses on a handheld remote and text input on a laptop. Representative output includes, without limitation, information collected by sensors 152 (whether or not preprocessed by processor 154), live video feed from an onboard camera(s), and text-based outputs from onboard sensors 152 relaying information to the operator.

Automatic position adjustments, in various embodiments, may be based at least in part on the diameter of pipe 1. In some embodiments, the pipe diameter may be predetermined—that is, it may either be programmed into control system 150 of lateral alignment mechanism 130 (or robot 10) or otherwise provided thereto by an operator. In other embodiments, the diameter of pipe 1 may be determined using one or more onboard and/or offboard sensors 152.

Sensors 152, in various embodiments, may include any one or combination of the various sensors 1010 described in U.S. Pat. Nos. 10,465,835 and 11,154,989 (previously incorporated herein by reference). Even though such sensors 1010 may have been described in the context of measuring the diameter of an uninsulated pipe, it should be recognized that such sensors 1010 may be adapted for use on an insulated pipe (and/or control system 150 be adapted for use with sensors 1010) in a manner suitable for determining the diameter of pipe 1 underneath of insulation 2. For example, in an embodiment, sensors 1010 may remain configured to measure the outermost diameter of the pipe (i.e., that of insulation 2) and processor 154 may be configured estimate the diameter of pipe 1 by subtracting a known or estimated thickness of insulation 2. The known or estimated thickness of insulation 2 could be provided by an operator or otherwise looked up by processor 154 in a database, such as one stored on memory 156. It should be recognized that in many real world cases it is not necessary to determine the precise diameter of pipe 1 in order to position radiation source 110 and imager 120 in positions suitable for meeting the goals previously described herein; it is possible to be "close enough" in determining the desired positioning and still capture suitable radiography imagery. In another embodiment, sensors 1010 can be adapted to measure the diameter of pipe 1 through insulation 2. For example, embodiments of distance sensor 210 utilizing technologies do not contact the surface of pipe 10, such as time-of-flight technologies (e.g., optical distance sensors such as laser rangefinders; ultrasonic proximity sensors), capacitive displacements sensors, and the like, could be configured to use light or sound waves in wavelengths capable of passing through insulation 2 and reflecting back off metal material of pipe 1.

Additionally or alternatively, various sensors 152 could be configured to measure the position or movement of certain components of robot 10 or mechanism 160 since, in many cases, that movement can be indicative of pipe diameter. For example, in an embodiment, an encoder or other sensor 152 could be configured to measure rotation of pinion 144 in the embodiment of FIG. 6A and FIG. 6B as a proxy for measuring pipe diameter, since the rotation of pinion 144 is driven by the positioning of wheel assemblies 11a, 11c as they pivot about wheel assembly 11b to accommodate various pipe diameters. Likewise, any number of sensors 152 could be configured to measure the linear travel of linear bearings 142 as a proxy for measuring pipe diameter since travel of linear bearings 142 may be driven by the positioning of wheel assemblies 11a, 11c as they pivot about wheel assembly 11b to accommodate various pipe diameters. As later described in more detail, in various embodiments, computer vision system 200 can also function as a sensor 152 (together with radiation source 110 and imager 120 to capture the imagery processed thereby) that provides information from which the diameter of pipe 1 can be determined.

Memory(s) 156, in various embodiments, may include any hardware suitable for storing computer-readable instructions relevant to executing the various sensing and controls methodologies presented herein, such as volatile and/or non-volatile memory units. For example, memory 156 may contain instructions for processing information provided by sensor(s) 152, along with known information stored in memory 156 regarding the geometry of robotic apparatus 100, in accordance with the associated mathematical models to calculate the diameter of pipe 10. Memory(s) 156, in various embodiments, may additionally or alternatively store computer-readable instructions relevant to calculating the direction and distance by which adjustment mechanism(s) 160 need to move radiation source 110 and/or imager 120 to have the relative positionings described herein. Memory(s) 156, in various embodiments, may additionally or alternatively store computer-readable instructions relevant to the operation of motor 158 (e.g., for how long, at what speed) to adjust the position(s) of radiation source 110 and/or imager 120 to have the relative positionings described herein.

Processor 154, in various embodiments, may include any hardware suitable for executing the computer-readable instructions stored in memory 156 to perform the various sensing and controls methodologies presented herein. Processor 154, for example, may in various embodiments process information provided by relevant sensors 152 to determine the diameter of pipe 1 and/or the current positioning of radiation source 110 and/or imager 120. In embodiments involving robotic controls, processor 154 may also use such information to, in turn, control motion of adjustment mechanisms 160 using motor(s) 158 and its components in accordance with control laws provided in the instructions stored on the memory. For example, in an embodiment, processor 154 could calculate the corresponding diameter of pipe 1 based on measurements from sensor 152 and, in turn, automatically calculate the desired positioning and adjust the lateral or longitudinal position(s) of radiation source 110 and/or imager 120. In another embodiment, processor 154 could simply be programmed to adjust the lateral position(s) of radiation source 110 and/or imager 120 by a predetermined factor that already relates sensor measurements to pipe diameter for the given geometry of robot 10. As configured, processor 154 may function as a controller. It should be recognized that references herein to a controller may refer to embodiments of processor 154 that are configured in this way.

Computer Vision System 200 for Detecting Anomalies in Radiography Imagery

Figure 7A:
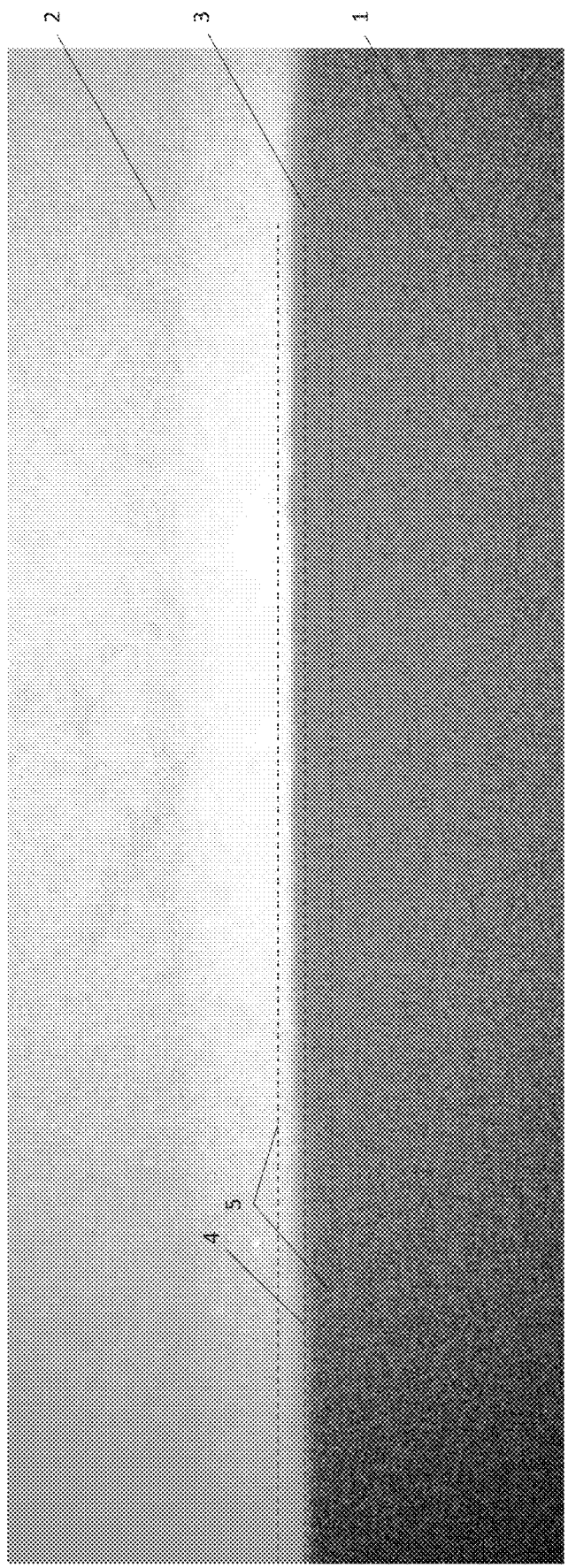
FIG. 7A is a radiographic image captured by the system for capturing radiography imagery, according to embodiments of the present disclosure.
Figure 7B:
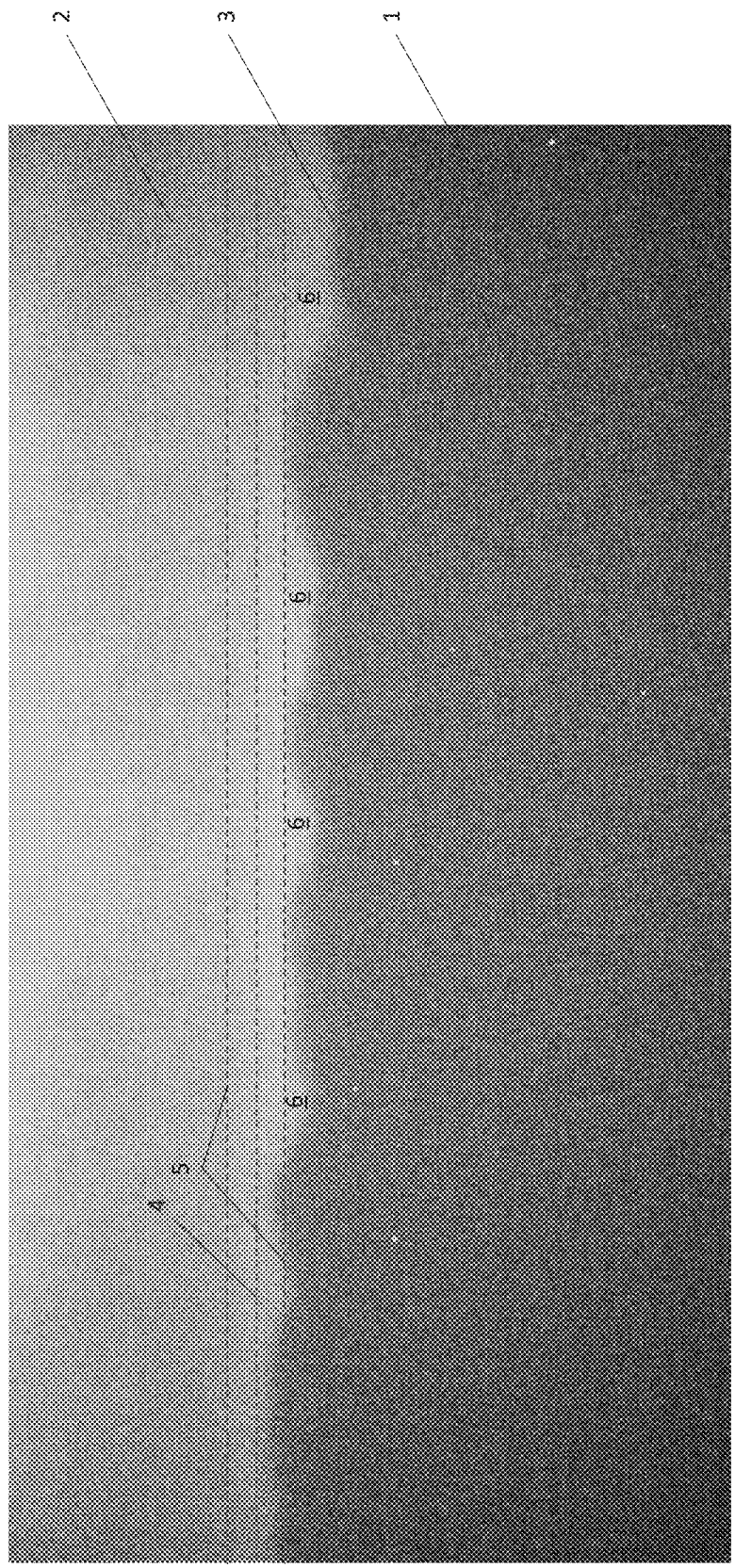
FIG. 7B is another radiographic image captured by the system for capturing radiography imagery, according to embodiments of the present disclosure.
Figure 7C:
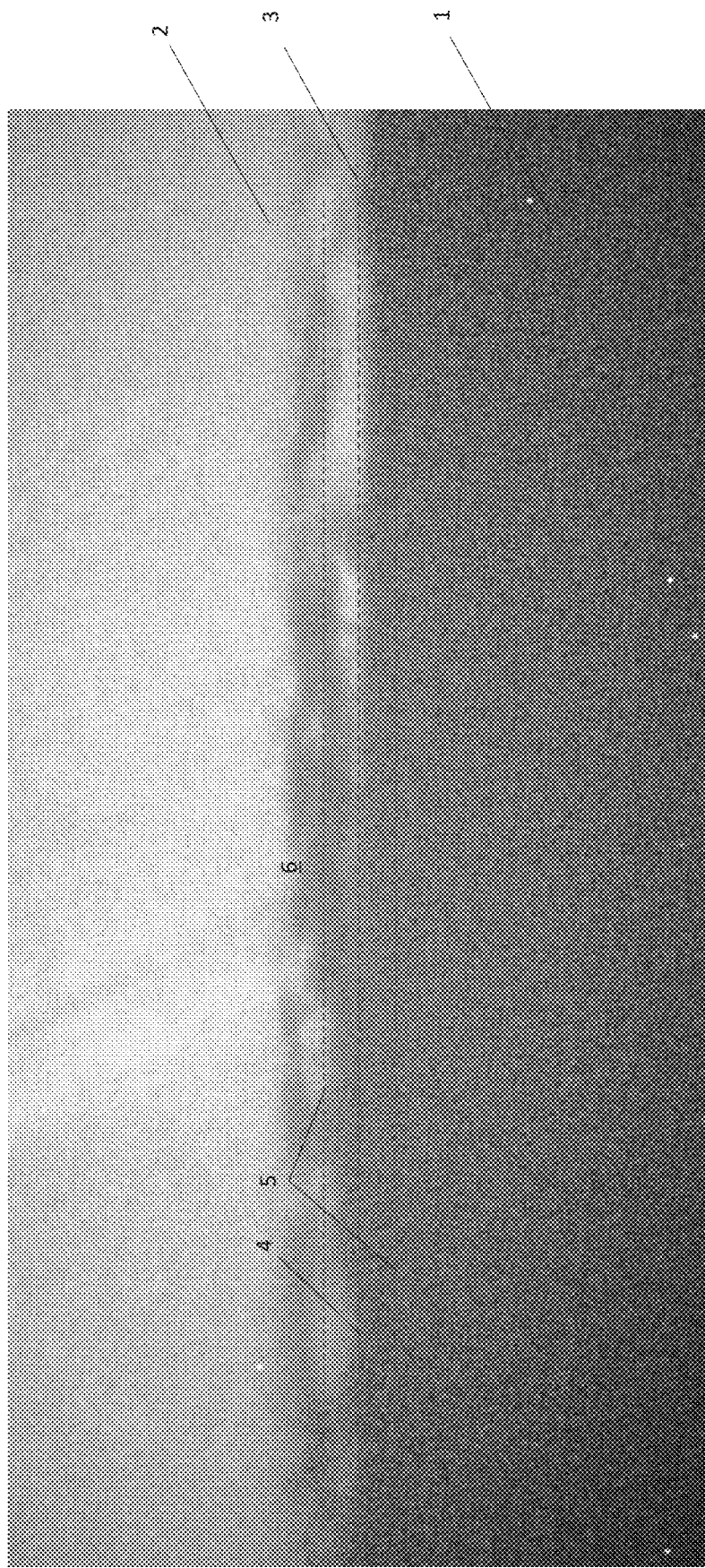
FIG. 7C is another radiographic image captured by the system for capturing radiography imagery, according to embodiments of the present disclosure.

FIG. 7A, FIG. 7B, and FIG. 7C show representative radiography imagery captured by system 100. In each image, the top portion (light gray) is insulation 2 and the bottom portion (dark gray) is pipe 1. FIG. 7A illustrates a pipe 1 having an outer surface free of anomalies, FIG. 7B illustrates a pipe 1 having a corroded outer surface, and FIG. 7C illustrates a pipe 1 with corrosion by-product, such as scaling.

Figure 8:
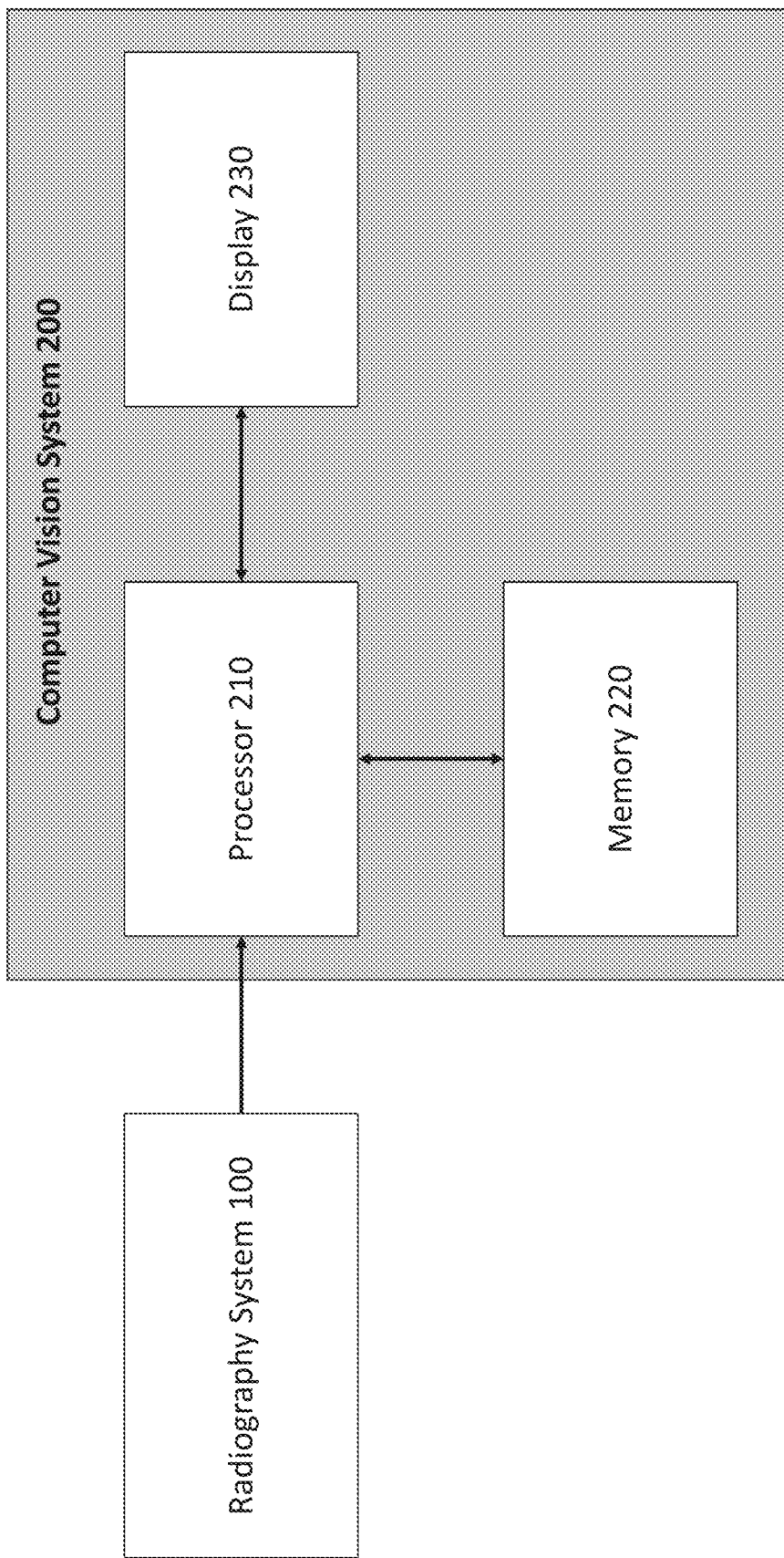
FIG. 8 is schematic diagram of a computer vision system, according to embodiments of the present disclosure.

FIG. 8 is a schematic depiction of a computer vision system 200 of the present disclosure configured to automatically detect anomalies in radiography imagery captured by system 100. Computer vision system 200, in various embodiments, may generally include at least one processor 210 and at least one memory 220, the processor being adapted to obtain computer-executable instructions stored on memory 220 that, when executed by processor 210, cause processor 210 to perform the methods for identifying anomalies in radiography imagery as further described herein. In some embodiments, processor 210 may communicate with a display 230 for displaying radiography imagery and related information, as later described in more detail.

Figure 9:
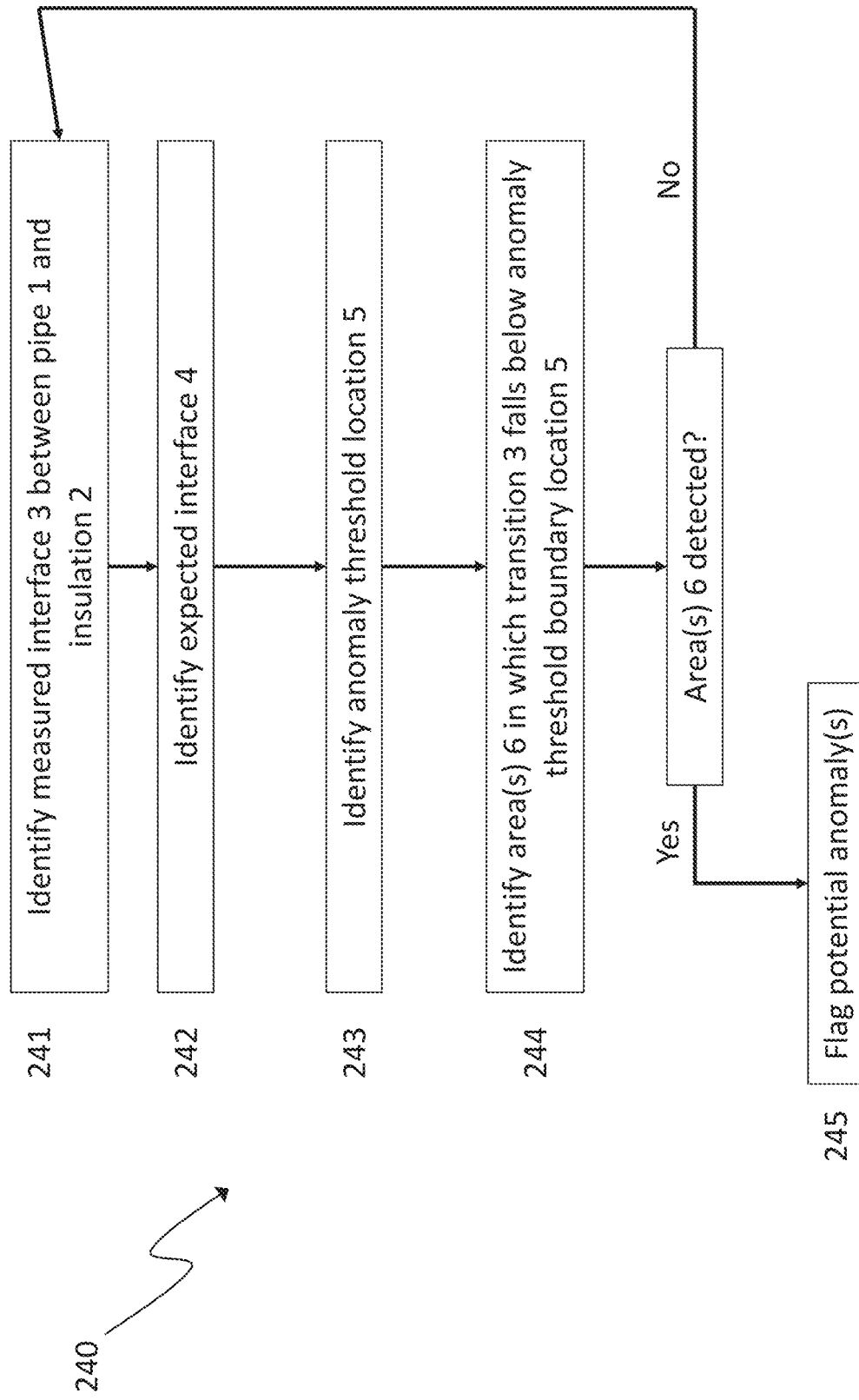
FIG. 9 is a flow diagram depicting a process utilized by the computer vision system for automatically detecting anomalies in radiography imagery captured by the system for capturing radiography imagery, according to embodiments of the present disclosure.

FIG. 9 illustrates a representative process 240 utilized by computer vision system 200 for automatically detecting anomalies in radiography imagery captured by system 100. In an initial step 241, processor 210 may process radiography imagery from system 100 to define a measured interface 3 between pipe 1 and insulation 2. As shown in FIG. 7A, FIG. 7B, and FIG. 7C, pipe 1 tends to appear dark gray or black in the imagery, since radiation from radiation field 112 is unable to pass through pipe 1. Conversely, insulation 2 tends to appear lighter in color (e.g., light gray) since radiation from radiation field 112 is able to pass through insulation 2. The measured interface 3 can be detected by finding the point/area of maximum contrast or by identifying where the pixels are above a certain brightness threshold. One having ordinary skill in the art will recognize various other imaging processing techniques suitable for identifying the measured interface 3 in color between pipe 1 and insulation 2 in the imagery.

Referring now to step 242, processor 210, in various embodiments, may identify where expected interface 4, i.e., the outer surface of an anomaly-free pipe 1, should be in the imagery. The expected interface 4 can be calculated based on the known positioning of radiation source 110, and imager 120 relative to pipe 1, together with the known diameter of pipe 1. The geometry of the source imager and pipe can accurately predict where the expected interface 4 should show in the image. Alternatively, the expected interface 4 can be extrapolated from a section of pipe 1 that has a measured interface 3 that follows a straight line for a minimum distance and can thereby be deduced to be anomaly-free. The anomaly-free area can either be identified by an operator or by processor 210 calculating the variation from a straight line of best fit to determine potential anomaly-free areas. The expected interface 4 can then be extrapolated to other parts of the pipe in the same image or to parts of the pipe in other images. In yet another embodiment, the expected interface 4 can be identified by calculating an average of the measured interface 3 defined along a section of pipe 1 and extrapolating, along the length of the pipe, the average measured interface defined over the section of pipe 1. Processor 210, in an embodiment, may optionally overlay the image with a line indicating the location of expected interface 4 for display to an operator or other person, whether during the inspection or afterwards.

Referring now to step 243, processor 210, in various embodiments, may optionally identify an anomaly threshold(s) 5 used to determine whether a potential anomaly is present. Threshold(s) 5, in some embodiments, may be the same as expected interface 4 while, in other embodiments, threshold 5 may be offset from expected interface 4 by a predetermined amount to account for (i) any errors in identifying the location of expected interface 4, and/or (ii) any particular tolerances designed to filter out false-positives or nominal anomalies of little concern from a maintenance standpoint. Processor 210, in an embodiment, may optionally overlay the image with a line indicating the location of anomaly threshold(s) 5 for display to an operator or other person, whether during the inspection or afterwards. A threshold 5 could be used to detect cavities or lack of pipe material, as identified by the measured interface being closer to the center of the pipe compared than the expected interface. A different threshold 5 could also be used to detect protrusions or corrosion by-product (e.g., scaling), as identified by the measured interface being further from the center of the pipe compared to the expected interface. Either or both types of threshold 5 can be used in an inspection, depending on what type of anomaly or damage mechanism the user is inspecting for.

Referring now to step 244 and FIG. 7B and FIG. 7C, processor 210, in various embodiments, may identify one or more areas 6 in which the measured interface 3 falls outside anomaly threshold(s) 5. In the image shown in FIG. 7B, there are four such locations below the lower threshold 5, as labeled, and in the image shown in FIG. 7C, there are many such locations above the upper threshold 5 (set for by-product), as shown. When one or more areas 6 are identified, processor 245 may flag the image as potentially showing an anomaly, as well as the location along pipe 1 in which the image was captured (and thus the location of the potential anomaly). As later described in more detail, in various embodiments, processor 210 may be configured to immediately notify the operator of robot 10 of the potential anomaly for further review and inspection, or instead later notify the operator or other person reviewing the inspection imagery of the potential anomaly and its location for further review.

Figure 10:
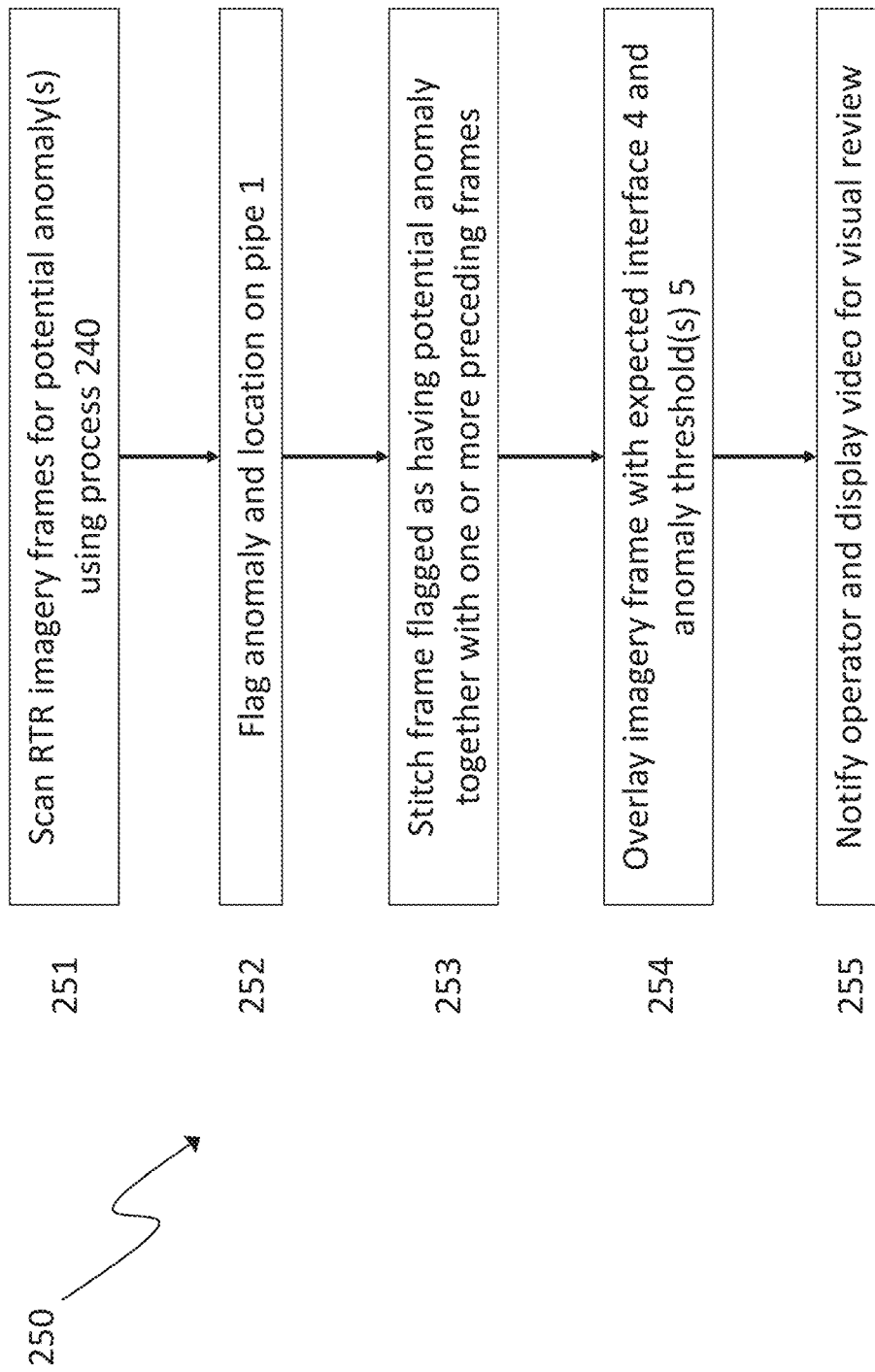
FIG. 10 is a flow diagram depicting a process utilized by the computer vision system for assisting an operator or data analyst in detecting anomalies in during the inspection, according to embodiments of the present disclosure.

FIG. 10 illustrates a representative process 250 utilized by computer vision system 200 for assisting an operator or data analyst in detecting anomalies in during the inspection.

Process 250, in various embodiments, may be configured to detect a potential anomaly in real-time—that is, while robot 10 is still positioned at the detected location or shortly thereafter. Such capability may allow an operator to perform additional inspection at the site (e.g., scan pipe 1 at different circumferential locations at the site to determine how widespread the anomaly may be at the site) prior to continuing on with the normal inspection. Such capability may also allow the operator to modify the planned inspection path to be followed by robot 10 on pipe 1 should, for example, he or she notice that anomalies on this particular pipe 1 tend to be located at a particular circumferential position—e.g., on the bottom side of pipe 1. In such a situation, the operator may choose to adjust the inspection path from, for example, a helical path to a path that follows the bottom of pipe 1.

Process 250, in various embodiments, may be configured to detect a potential anomaly in near-real-time—that is, after robot 10 has moved on from the detected location of the potential anomaly but within some reasonable time period such that the operator or a data analyst can be notified prior to completing the inspection and leaving the worksite. Such capability may provide similar benefits as those described above for real-time detection, albeit with some delay. Still, the benefits of being able to perform further inspection of sites flagged as having potential anomalies without having to later revisit the worksite can be quite valuable, as this capability may save operators the time and cost of a subsequent visit to confirm the presence (and perhaps the extent of) actual anomalies.

To detect potential anomalies in real-time or near-real-time, it may be beneficial or necessary to utilize image processing techniques that are relatively lean in terms of computing time and power required, while still flagging potential anomalies within an acceptable level of reliability (e.g., not too many false positives or false negatives). This is especially important when the image processing occurs on-premises (e.g., onboard robot 10 or at a portable command station located at the worksite) as available computing power may be limited. Likewise, in situations where the image processing occurs remotely, as available bandwidth for transmitting imagery captured by system 100 may be limited, thereby causing data jams and associated delays. In the representative process 250 shown, this is accomplished by quickly processing individual image frames for potential anomalies and, only upon detecting a potential anomaly, then stitching a limited number of frames together for visual review by an operator or data analyst. By foregoing stitching and other video processing techniques while on-site and instead performing them later when off-site, processor 210 can detect potential anomalies more quickly and efficiently, thereby affording the operator or data analyst the benefits described above.

In initial steps 251 and 252, processor 210 may be configured to scan individual image frames for potential anomalies using the aforementioned process 240. To the extent it would help speed up the process, processor may forego overlaying each image frame with expected interface 4 and threshold 5 and instead reserve these steps for only those certain frames that are stitched together for review by the operator or data analyst when a potential anomaly is detected.

Referring to step 253, processor 210 may be configured to stitch the image frame flagged as having a potential anomaly together with one or more preceding frames. By stitching the image frame together with prior frames, an operator or data analyst can see images for presumably anomaly-free sections of pipe 1 leading up to the location of the potential anomaly, thereby giving the operator or data analyst a frame of reference for judging whether the image frame indeed shows an anomaly. The stitched images can be presented to the operator or data analyst as a short video clip, or they can be parsed through by the operator or data analyst frame-by-frame as desired. In some embodiments, as noted in optional step 254, processor 210 may be configured to overlay each of the stitched frames (or the resulting video) with expected interface 4 and anomaly boundary 5 to further assist the operator or data analyst in evaluating the imagery for an anomaly. This feature could be toggled on or off as desired.

It should be noted that, in various embodiments, visual confirmation by an operator or data analyst is not always necessary. Likewise, in various embodiments, robot 10 may be configured to automatically perform a closer inspection of the site at which a potential anomaly was detected, rather than an operator having to control robot 10 in doing so. Still further, in various embodiments, computer vision system 200 may be configured to not only detect areas 6 present below threshold 5, but also characterize such area (or groupings thereof) as particular types of anomalies. For example, a blurred interface may indicate corrosion and pitting, while a wavy interface may indicate surface corrosion. Darker regions that are partially separated from pipe 1 may indicate scaling. Brightness variations within insulation 2 may indicate presence of moisture (water) in the insulation 2, which is often a predecessor to corrosion under insulation 2. Likewise, computer vision system 200 may be configured to characterize a severity of detected anomalies. Using the distances between the source 110, the imager 120, and pipe 1 a conversion from digital pixels to physical distances in the images can be calculated. This enables the user to set thresholds based on physical distance measurements and anomalies such as cavities and protrusions can be quantified. However, this type of geometrical analysis requires precise control of the aforementioned distances and is made practically possible by the use of robot 10 as a vehicle for radiography system 100. If a radiography system is carried by a human operator the distances typically vary and are unknown.

As previously noted, computer vision system 200, in various embodiments, can also function as a sensor 152 (together with radiation source 110 and imager 120 to capture the imagery processed thereby) configured to provide information from which the diameter of pipe 1 can be determined. For example, in some embodiments, processor 154 may be configured to calculate pipe radius by summing (i) the relative distance between the measured interface 3 and some predetermined reference point in the imagery that corresponds with a reference point on imager 120, and (ii) the relative distance between the reference point on imager 120 and a portion of robot 10 that typically aligns with the centerline of pipe 1 when robot 10 is installed on pipe 1. In other words, a proxy can be established for the centerline of pipe 1 based on the known geometry of robot 10, and the positions of measured interface 3 and imager 120 can be related to one another and then related back to the proxy centerline to determine pipe diameter. It should be recognized that the position of imager 120 on robot 10 can be tracked by processor 154 in any number of apparent ways, such as by tracking historical movement of lateral adjustment mechanism 140 relative to a predetermined starting position. Likewise, the location of measured interface 3 in the imagery relative to some predetermined point on imager 120 can be determined through apparent geometrical calculations based on the relative positionings of radiation source 110 and imager 120 to one another at the time the imagery yielding the measured interface 3 was captured.

Additionally or alternatively, in various embodiments, computer vision system 200 could function as a sensor 152 to help position radiation source 110 and imager 120 in desired locations via a closed loop controls approach. Here, control system 150 may not necessary need information concerning the diameter of pipe 1, but rather would be configured to iteratively reposition radiation source 110 and/or imager 120 until measured interface 3 is positioned in a desirable location within the radiography imagery, such as in the middle. For example, if the measured interface 3 is too high up in the radiography imagery such that only pipe 1 is visible in the radiography imagery, control system 150 may cause mechanism 160 to move the radiation source 110 and/or the imager 120 further away from the center of pipe 1. Conversely, if the measured interface 3 is too low in the radiography imagery such that pipe 1 is not visible in the radiography imagery (but rather free space and possibly insulation 2 is visible), control system 150 may cause mechanism 160 to move the radiation source 110 and/or the imager 120 closer to the center of pipe 1. These detections and movements could continue in an iterative, closed loop fashion until controller 150 determines from feedback from computer vision system 200 that radiation source 110 and imager 120 are positioned as desired for the inspection. Desirable in this context may mean in any location that enables computer vision system 200 to identify the various interfaces and features in the radiography imagery as necessary to reliably identify anomalies on pipe 1. This may include positioning radiation source 110 and imager 120 such that each of the pipe 1, the insulation 2, and some free space outside of the insulation 2 is visible in the imagery, so that an operator feels confident the radiography system 100 is properly configured to perform the inspection.

Fail Safe Mechanism 300

The present disclosure, in another aspect, is further directed to fail-safe mechanisms and, in particular, a mechanism 300 configured to prevent robot 10 or other vehicle from falling off of pipe 1 while also allowing robot 10 to traverse obstacles 3 extending from or proximate pipe 1.

Figure 11:
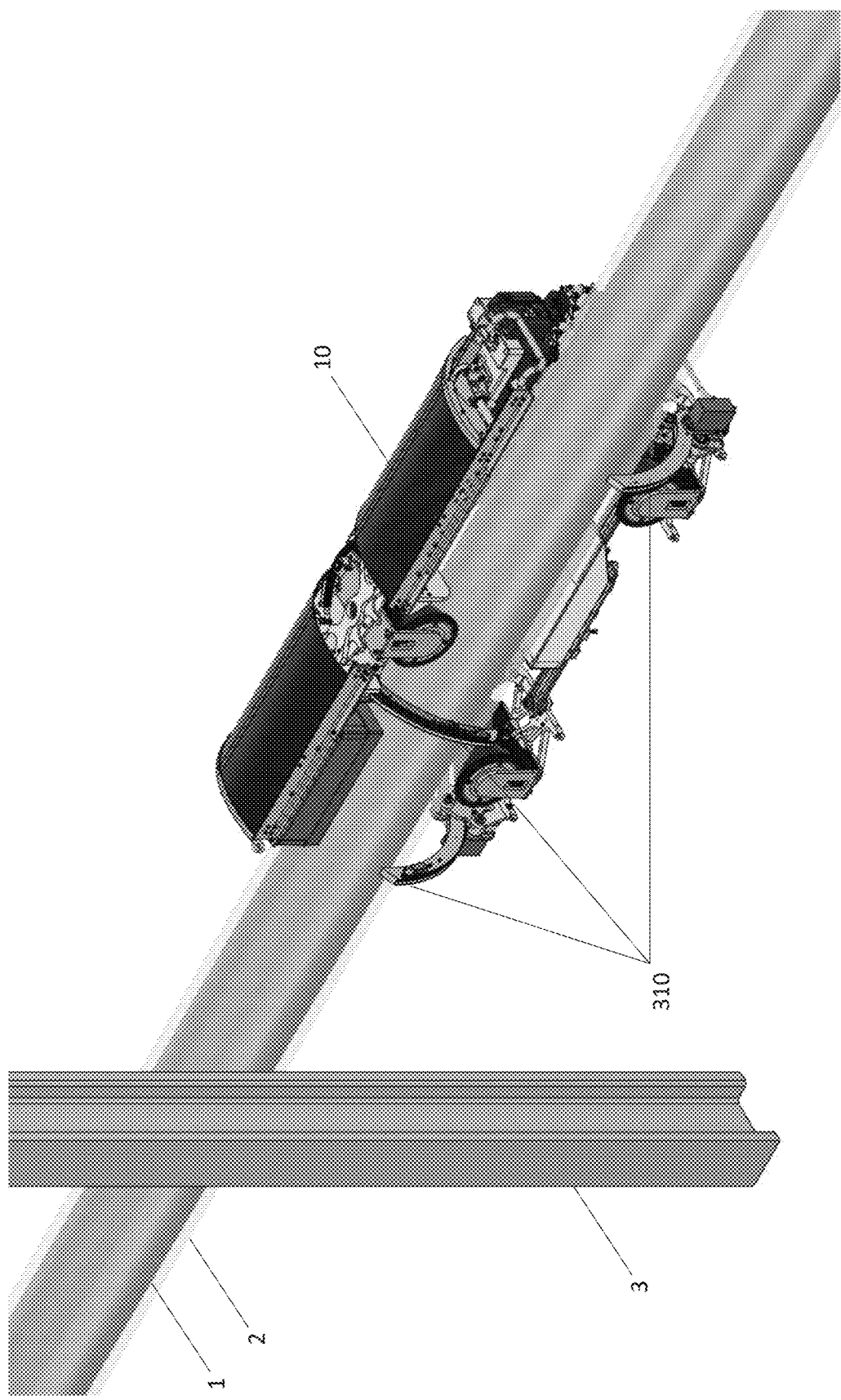
FIG. 11 is a perspective view of a fail safe mechanism, according to embodiments of the present disclosure.
Figure 12A:
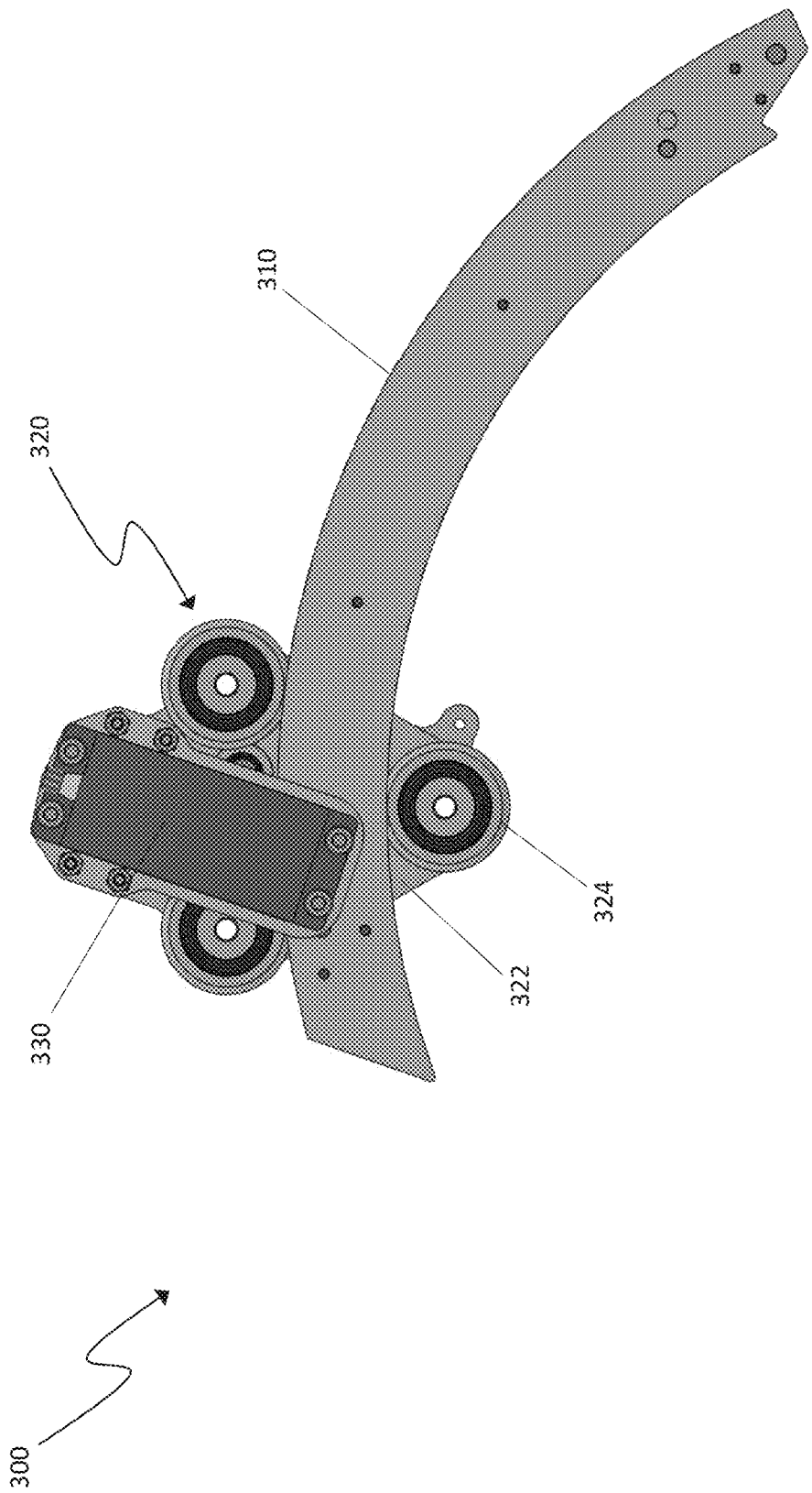
FIG. 12A is a side view of a fail safe mechanism with curved arms, according to embodiments of the present disclosure.
Figure 12B:
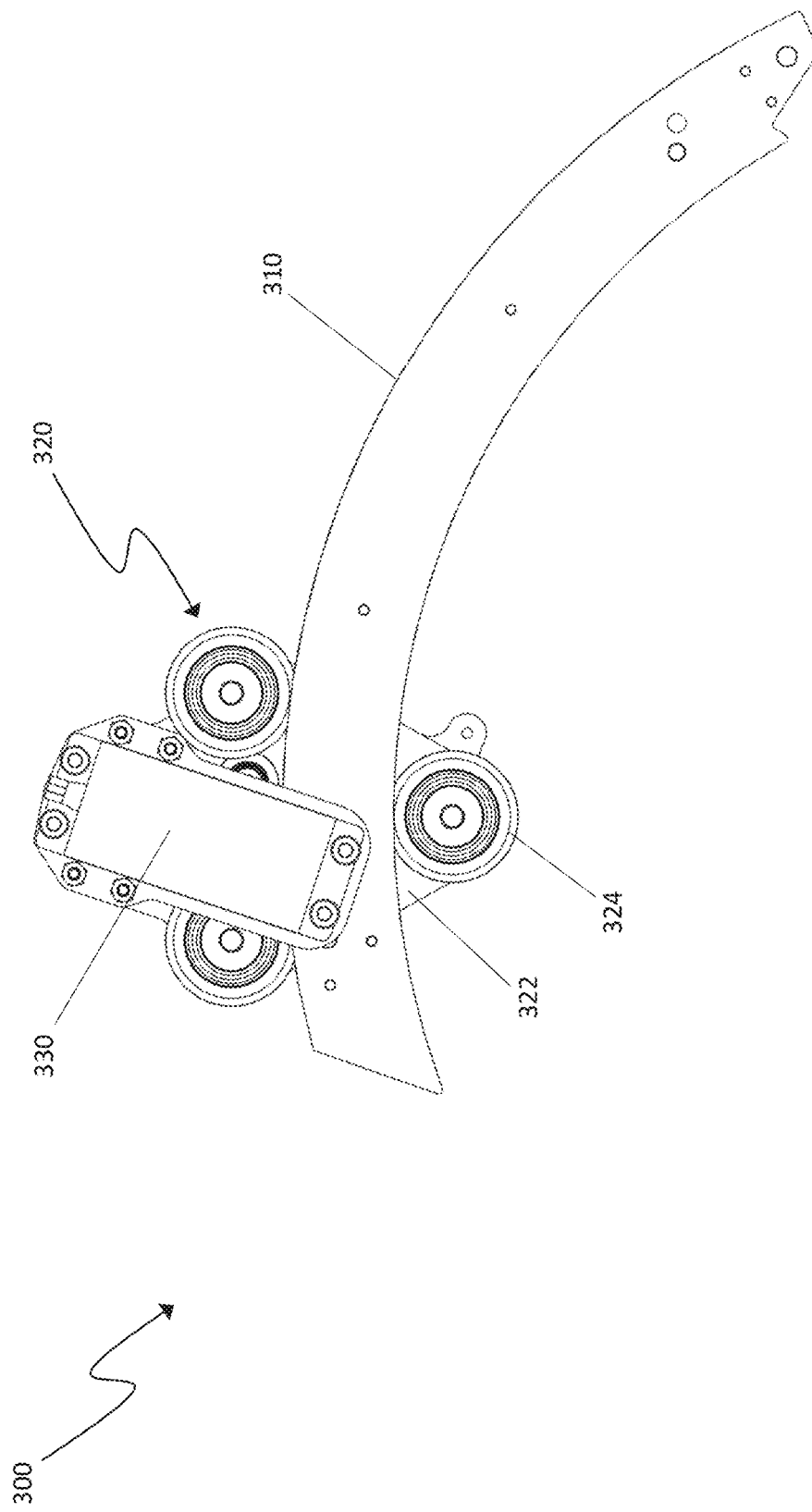
FIG. 12B is another side view of the fail safe mechanism with curved arms, according to embodiments of the present disclosure.

Referring to FIG. 11, mechanism 300, in various embodiments, may be configured to prevent robot 10 from falling off of pipe 1 while allowing robot 10 to traverse perpendicular obstacles 3 (e.g., T-junctions and pipe hangers). Additionally, or alternatively, mechanism 300, in various embodiments, may be configured to prevent robot 10 from falling off of pipe 1 while allowing robot 10 to traverse obstacles 3 situated tangential to pipe 1. A common, non-limiting example of a tangential obstacle 3 is an I-beam on which pipe 1 is resting on or is supported. One of ordinary skill in the art will recognize other obstacles 3—whether perpendicular, tangential, or otherwise—capable of being traversed by robots 10 equipped with mechanism 300 in accordance with embodiments of the present disclosure.

Generally speaking, mechanism 300 of the present disclosure can be used with any robot 10 that (i) that largely surrounds pipe 1, but has an open portion 12 wide enough for pipe 1 to pass through, or (ii) is largely situated on only one side of pipe 1 (e.g., on top of a horizontally-oriented pipe 1). Regardless of the configuration of robot 10, mechanism 300, in various embodiments, may be generally configured to extend from and largely envelop a circumference of pipe 1 (and any insulation 2 that may be present on pipe 1). That is, in some embodiments, mechanism 300 may cause robot 10 to fully surround a circumference of pipe 1, which in other embodiments, mechanism 300 may cause robot 10 to surround at least that portion of the circumference of pipe 1 suitable to prevent pipe 1 from passing through any circumferential gaps. For example, for small diameter pipes 10, mechanism 300 may cause robot 10 to fully surround the circumference of pipe 1 when fully extended, but for larger diameter pipes 10, mechanism 300 may cause robot 10 to only surround two-thirds or three-quarters of the circumference of pipe 1 when fully extended, thereby leaving a gap between either (i) the distal end of mechanism 300 and the body (or other component) of robot 10, or (ii) the distal ends of mechanism 300 having two opposing arms 310 (later described). In such a case though, the dimensions of the gap are smaller than the diameter of pipe 1 and thus pipe 1 cannot pass through the gap. As configured, mechanism 300 may prevent robot 10 from falling off of pipe 1.

Referring now to FIG. 12A and FIG. 12B, FIG. 13A and FIG. 13B, FIG. 14A and FIG. 14B, and FIG. 15A and FIG. 15B, each mechanism 300, in various embodiments, may generally include one or more curved arms 310, a guide(s) 320 through which curved arm(s) 310 are extended and retracted, and a motor 330 for powering motion of curved arm 310 between an extended state and a retracted state, as later disclosed in more detail herein.

Curved Arm(s) 310

Mechanism 300, in various embodiments, may include one or more curved arms 310 configured to be selectably (i) extended to surround all or a portion of the circumference of pipe 1 to prevent robot 10 from falling off of pipe 1 should it slip off, and (ii) retracted as needed when traversing an obstacle 3 to allow robot 10 to pass by unobstructed. When the curved arms 310 are retracted one side of the robot 10 is completely unobstructed. This allows the robot 10 to reorient itself to align this open side 12 with obstacles 3, such as tangential beams, and drive past them without any collisions.

In various embodiments, a shape and dimensions of curved arm(s) 310 may be selected to complement that of pipe 1. For example, in embodiments in which pipe 1 is in fact a cylindrical pipe, arm(s) 310 may be arced and have a radius of curvature similar to that of pipe 1. As later described in more detail, it should be noted that the radii of curvature of each arm 310 may be slightly different when arms 310 are situated in the same axial plane so that arms 310 can move in concentric arcs about pipe 1 without interfering with each other. As another example, in embodiments in which pipe 1 is an I-beam or other structure with a square or rectangular lateral cross-section, arm(s) 310 may bend or curve wide enough to sufficiently wrap around the sides and opposing side of the structure, or may instead comprise straight sections complementing that of the sides and opposing surface of the structure (e.g., straight sections configured to run parallel to the sides of the structure that ultimately bend ninety degrees to run parallel with the opposing side of the structure). As an alternative design, arms 310 could be straight and move linearly in approximately the same direction that the curved arms extend and retract. In this alternative design, increased simplicity is exchanged for decreased coverage of arms 310 over the open side 12 and/or having the arms 310 protrude outside the envelope of the robot 10.

It should be recognized that the term "curved" as used with curved arm(s) 310, and the term "complements" as used to describe the shape and dimensions of curved arm(s) 310 relative to that of the surface of pipe 1, do not necessarily require any particular curved shape such as an arc, but rather envisions any configuration (whether smoothly curved, bent at any lengthwise location(s), or otherwise shaped) that allows arm(s) 310 to sufficiently envelop a suitable portion of the circumference of pipe 1 such that pipe 1 cannot pass through any gaps in mechanism 300 or gaps between mechanism 300 and robot 10. In other words, when curved arms 310 are extended they close around the circumference of pipe 1. This prevents the robot 10 from sliding off the pipe 1 in case there is loss of traction or other malfunction. Further, when the shape and dimensions of curved arm(s) 310 complement those of pipe 1, fail-safe mechanism 300 may "hug" pipe 1 in such a manner that one or more wheels 101 remain engaged with the surface of pipe 1 following a slip, thereby allowing robot 10 to potentially recover and continue traversing pipe 1 without the need for an operator to manually reset robot 10 on pipe 1. Still further, when the shape and dimensions of curved arm(s) 310 complement those of pipe 1, the outer profile of fail-safe mechanism 300 remains tight to the outer surface of pipe 1 such that the clearance needed for robot 10 to traverse nearby pipes and other obstacles situated close to the surface of pipe 1 is minimized. In one such embodiment, the outer profile of fail-safe mechanism about pipe 1 does not exceed that of any other component of robot 10, including wheels 101.

Figure 13A:
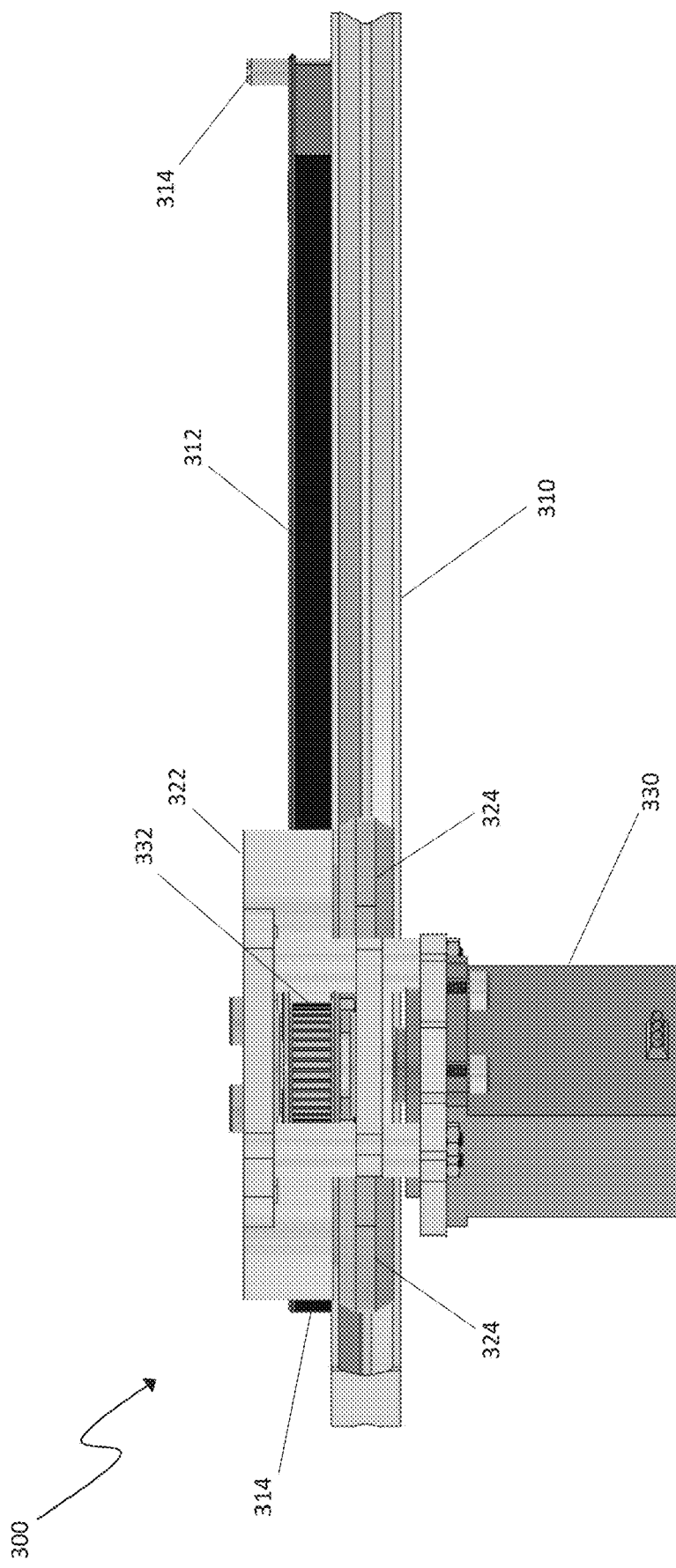
FIG. 13A is a top view of a fail safe mechanism, according to embodiments of the present disclosure.
Figure 13B:
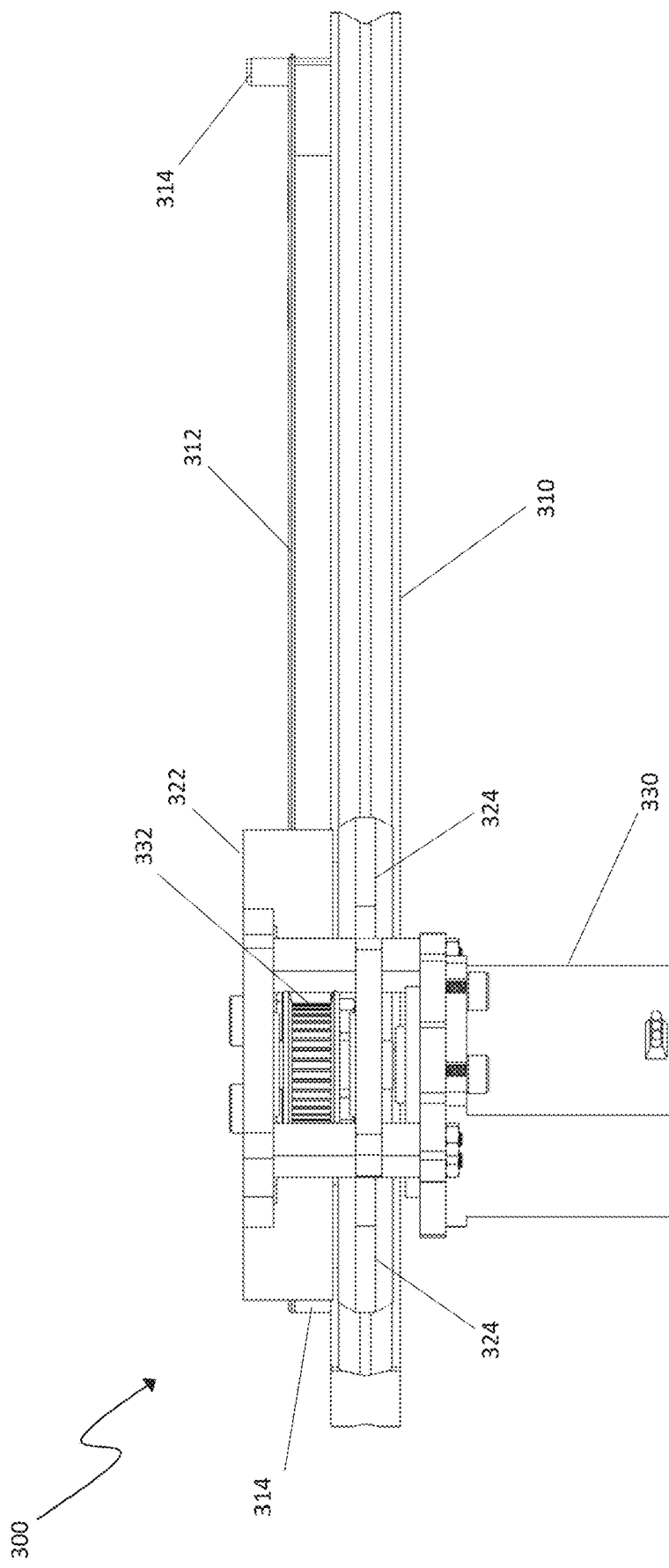
FIG. 13B is another top view of the fail safe mechanism, according to embodiments of the present disclosure.
Figure 14A:
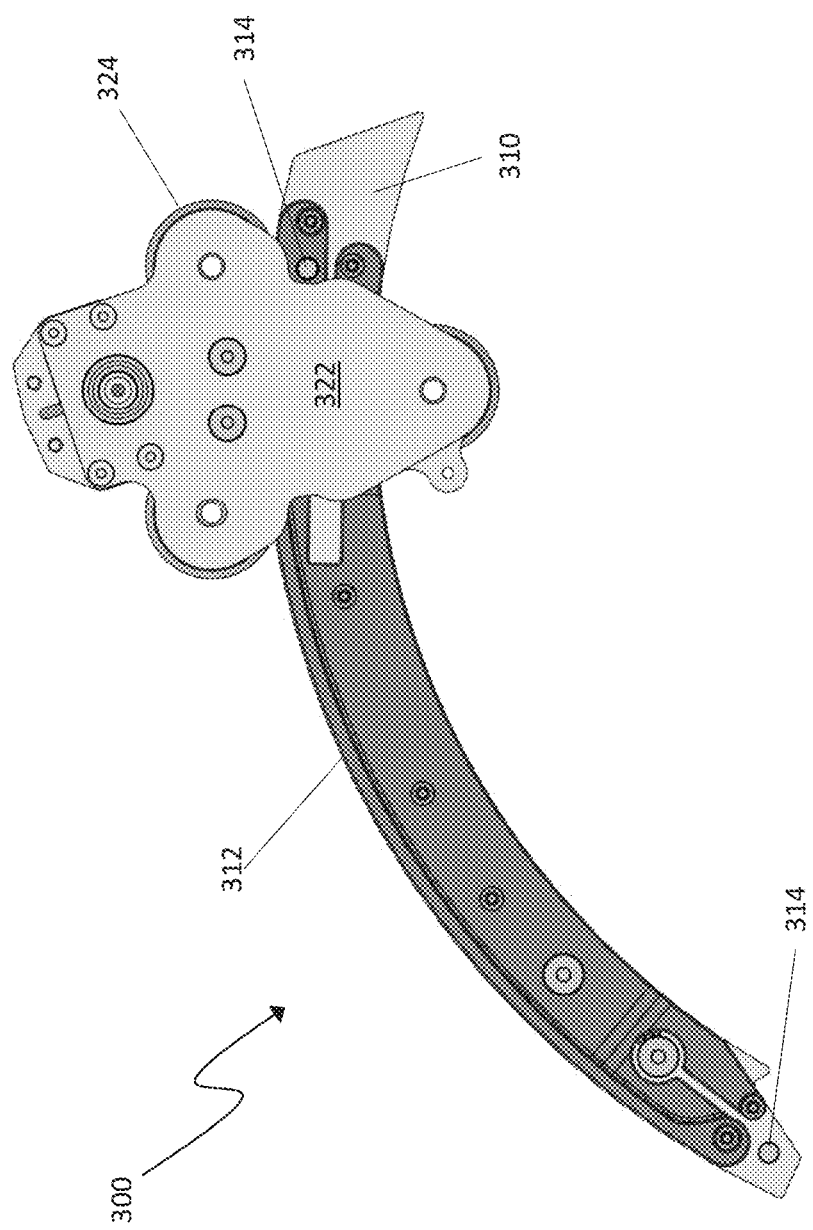
FIG. 14A is a side view of a fail safe mechanism with curved arms, according to embodiments of the present disclosure.
Figure 14B:
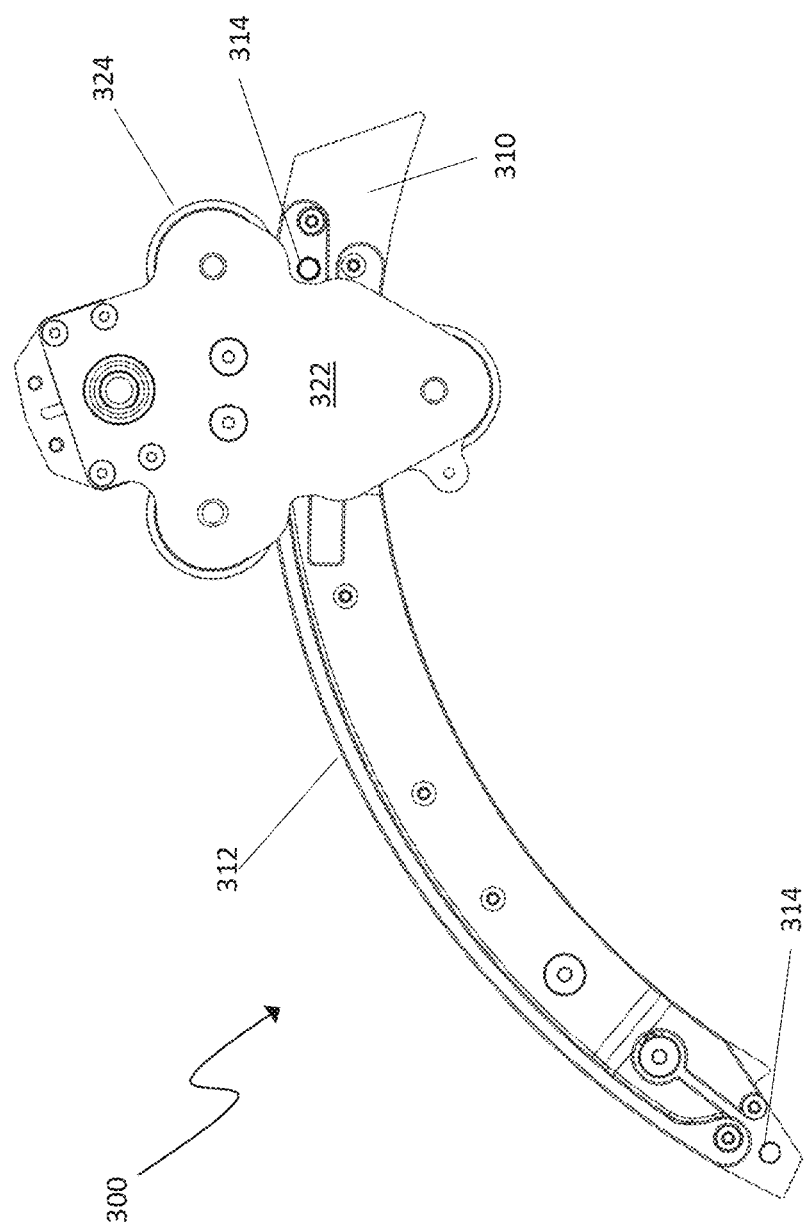
FIG. 14B is another side view of a fail safe mechanism with curved arms, according to embodiments of the present disclosure.
Figure 15A:
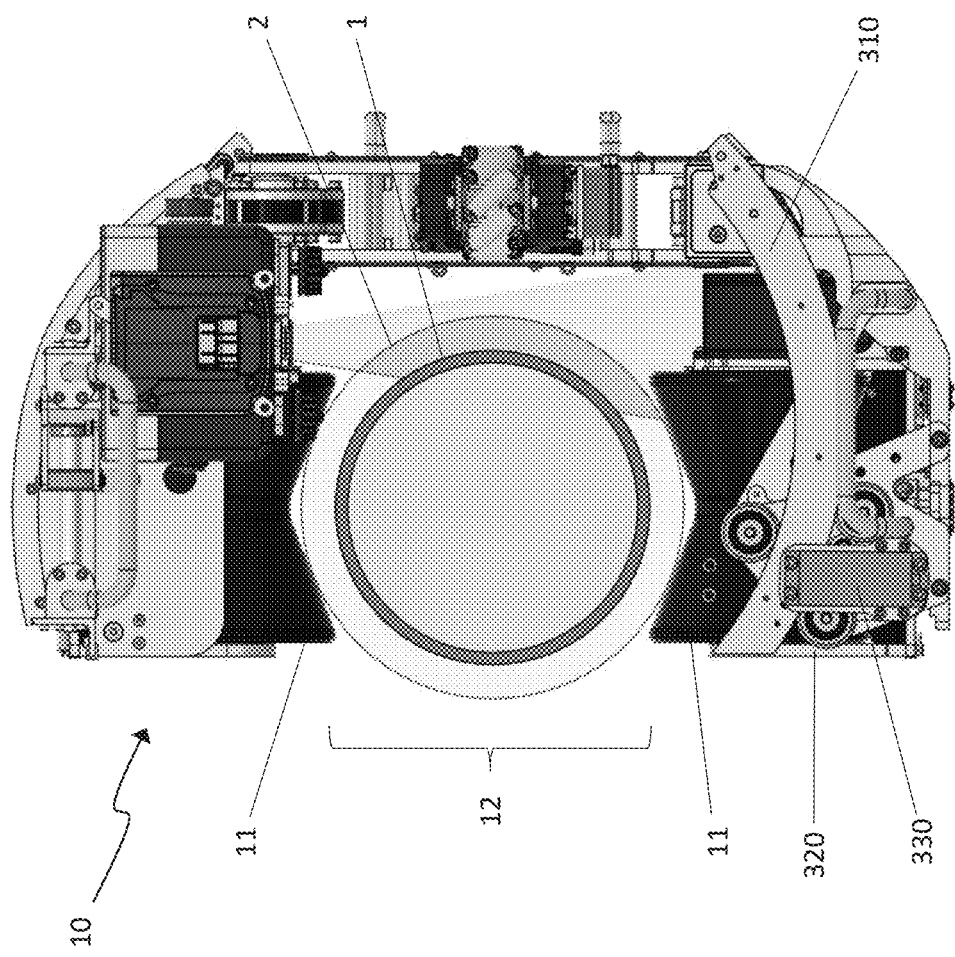
FIG. 15A is a top view of a system for capturing radiography imagery of a pipe, according to embodiments of the present disclosure.
Figure 15B:
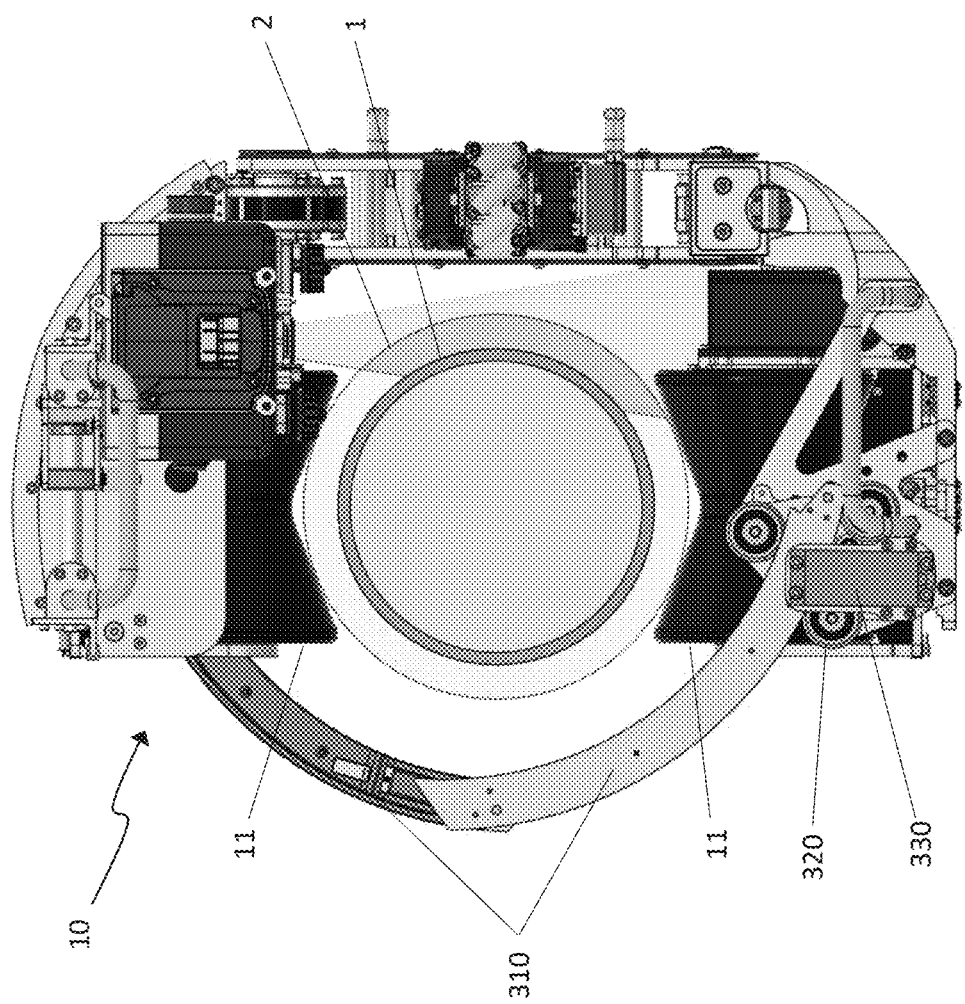
FIG. 15B is a top view of a system for capturing radiography imagery of a pipe, according to embodiments of the present disclosure.
Figure 17A:
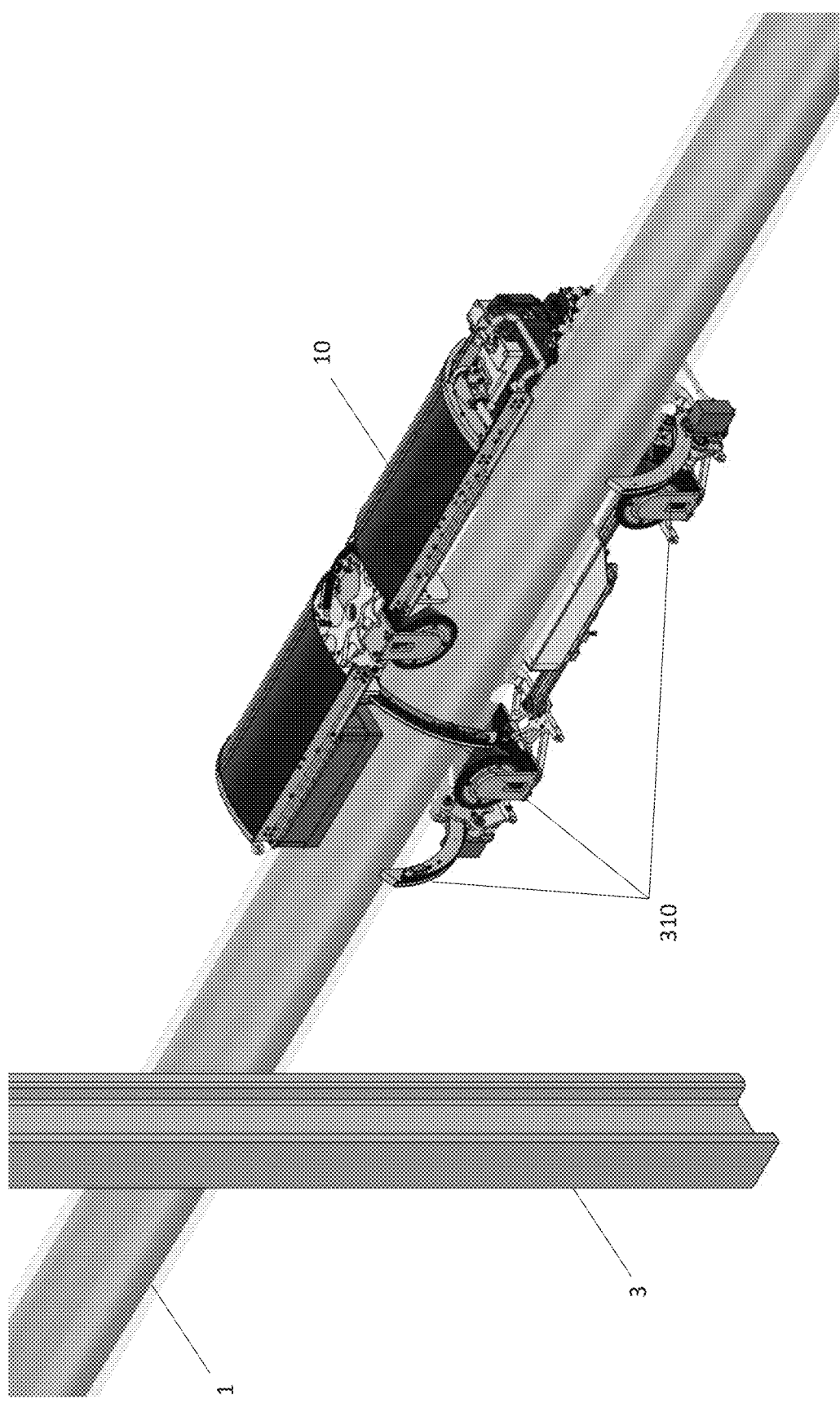
FIG. 17A is an enlarged view of FIG. 16A, according to embodiments of the present disclosure.
Figure 17B:
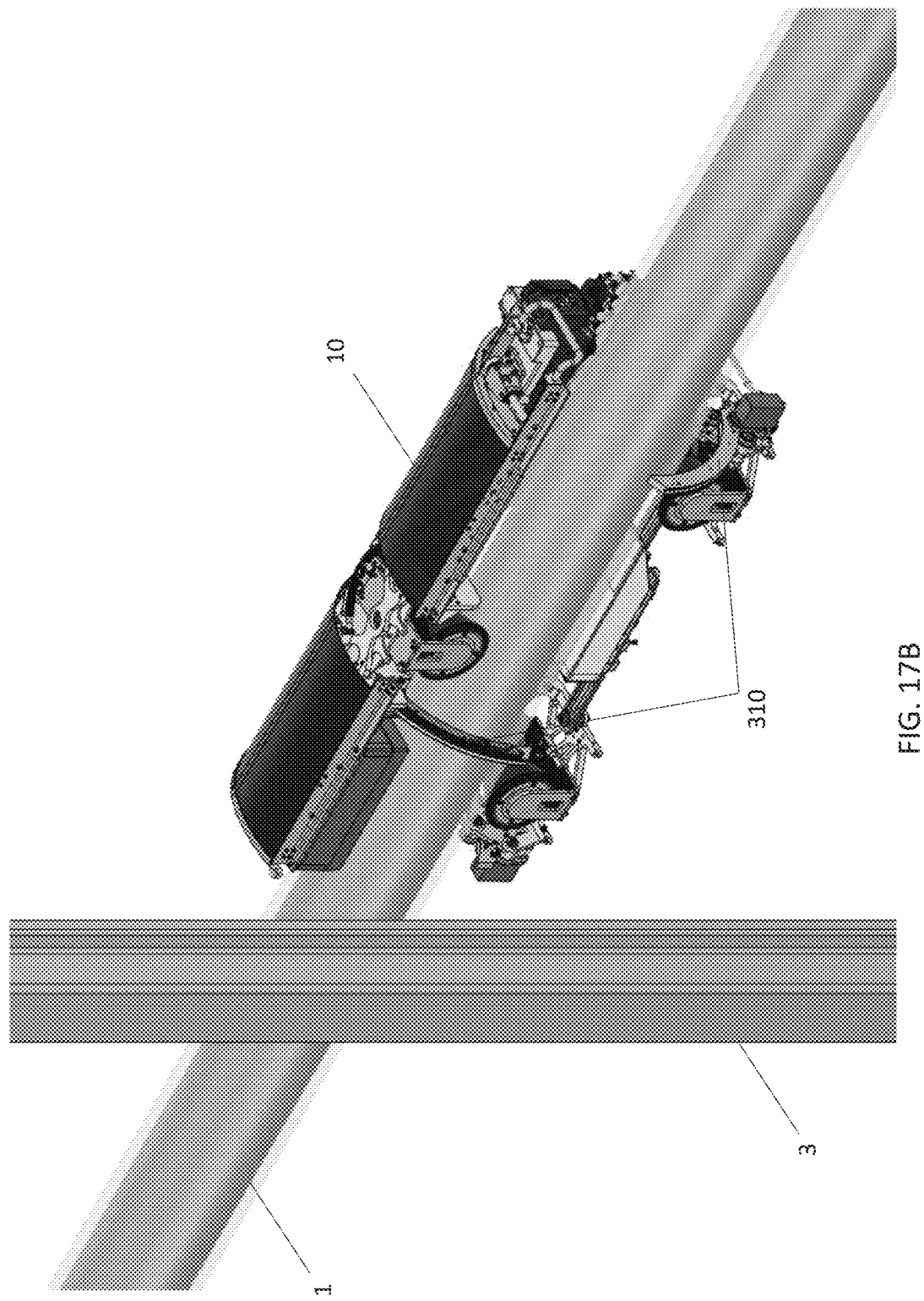
FIG. 17B is an enlarged view of FIG. 16B, according to embodiments of the present disclosure.
Figure 17C:
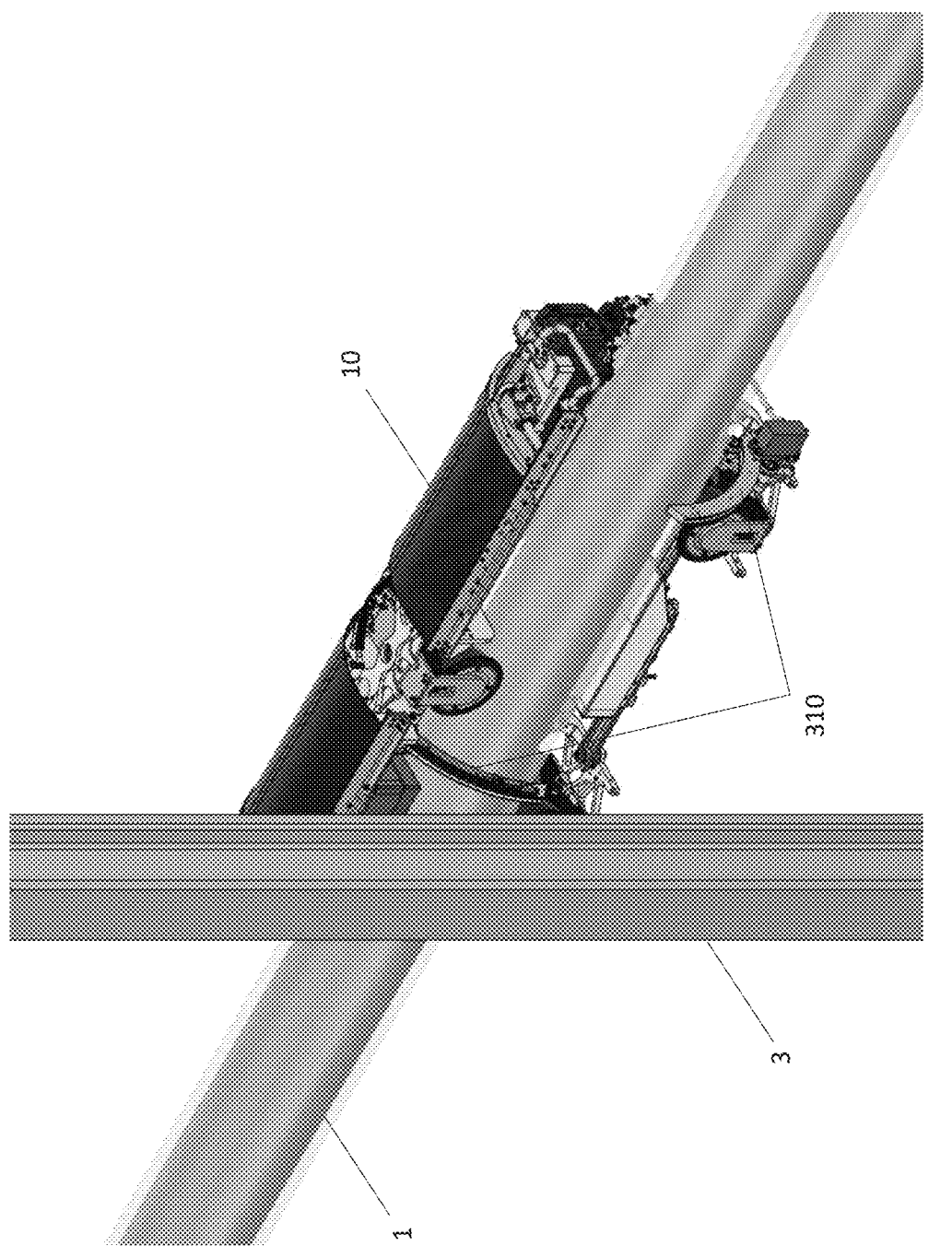
FIG. 17C is an enlarged view of FIG. 16C, according to embodiments of the present disclosure.
Figure 17D:
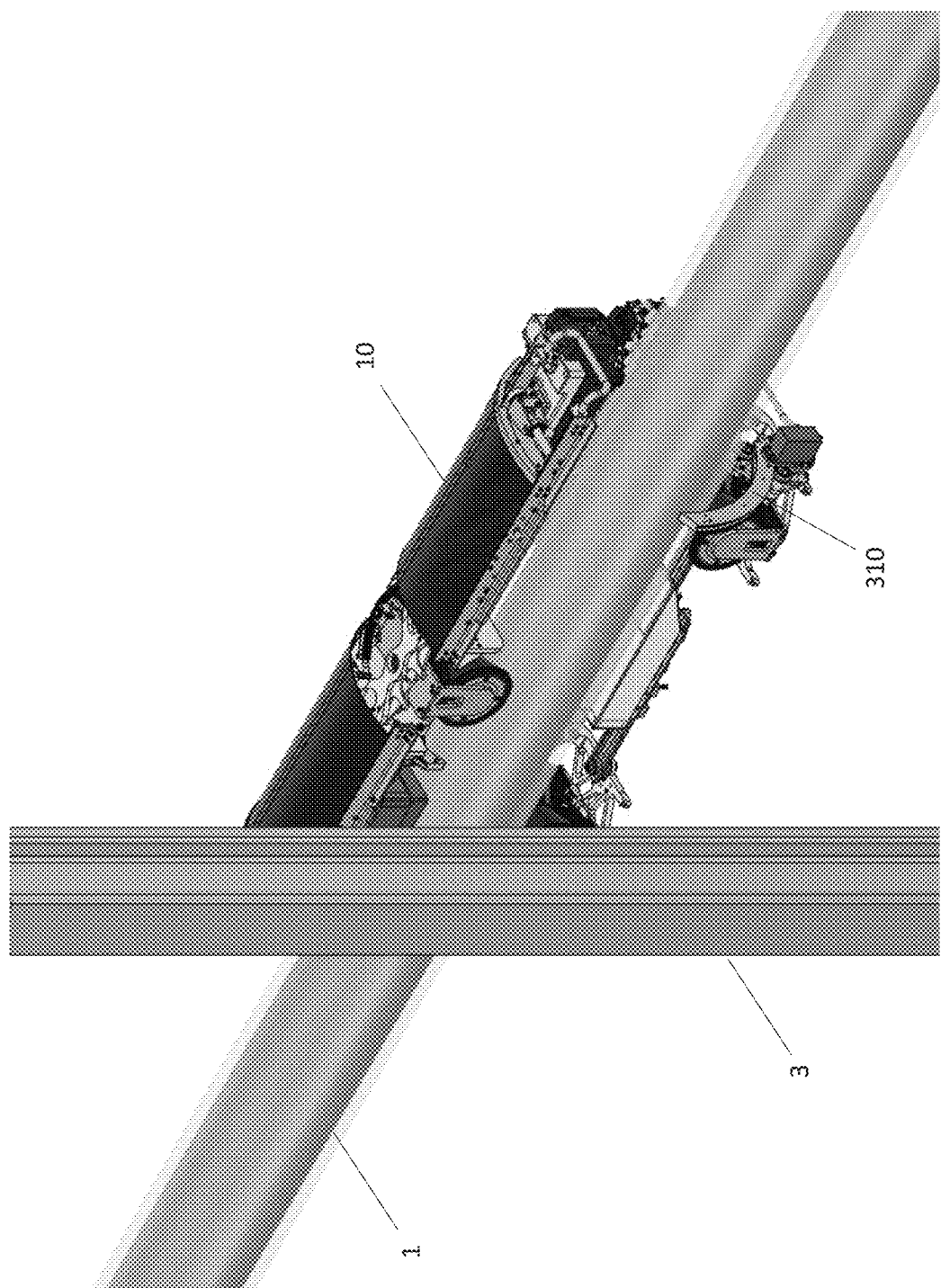
FIG. 17D is an enlarged view of FIG. 16D, according to embodiments of the present disclosure.
Figure 17F:
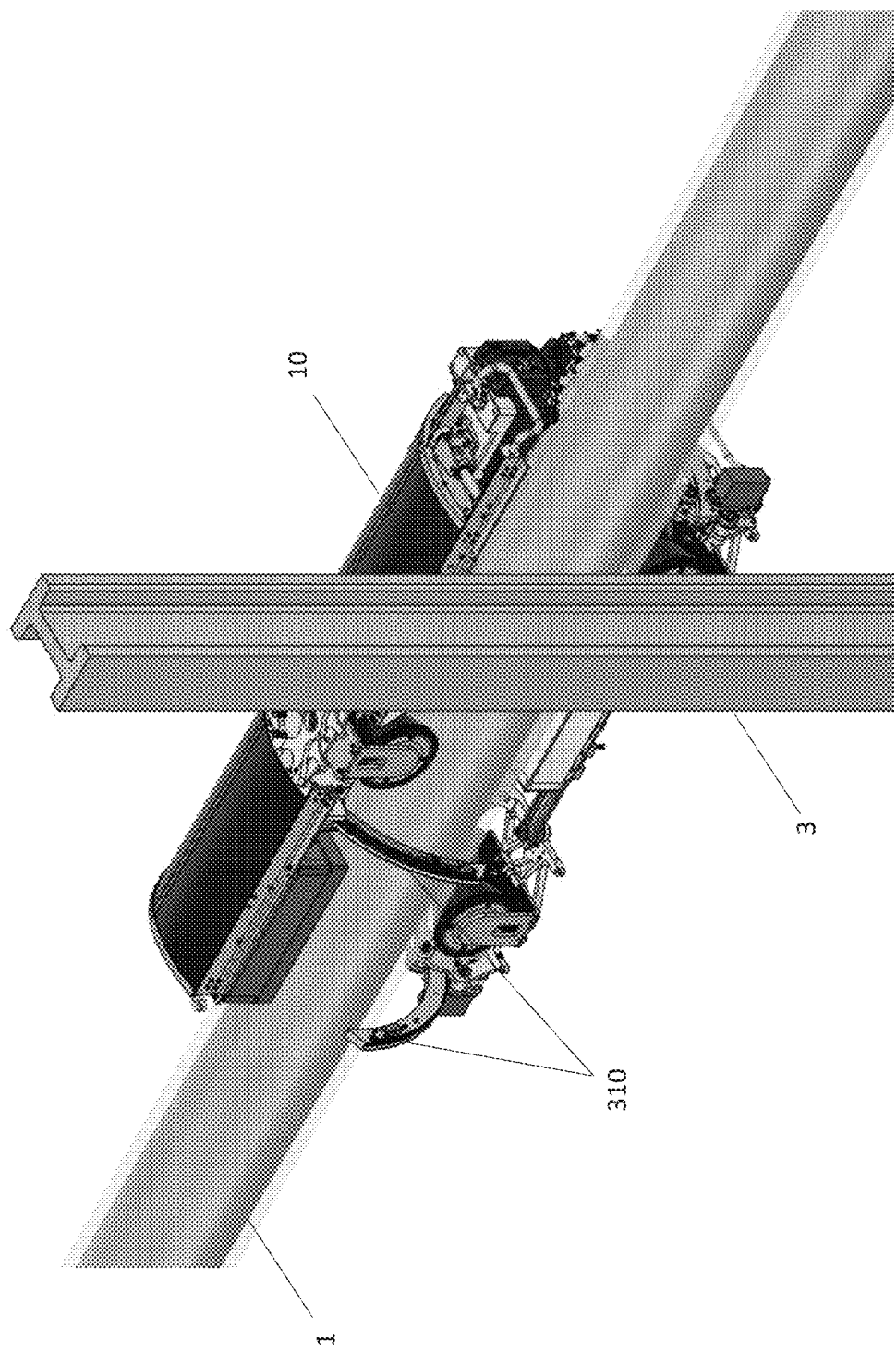
FIG. 17F is an enlarged view of FIG. 16F, according to embodiments of the present disclosure.
Figure 17G:
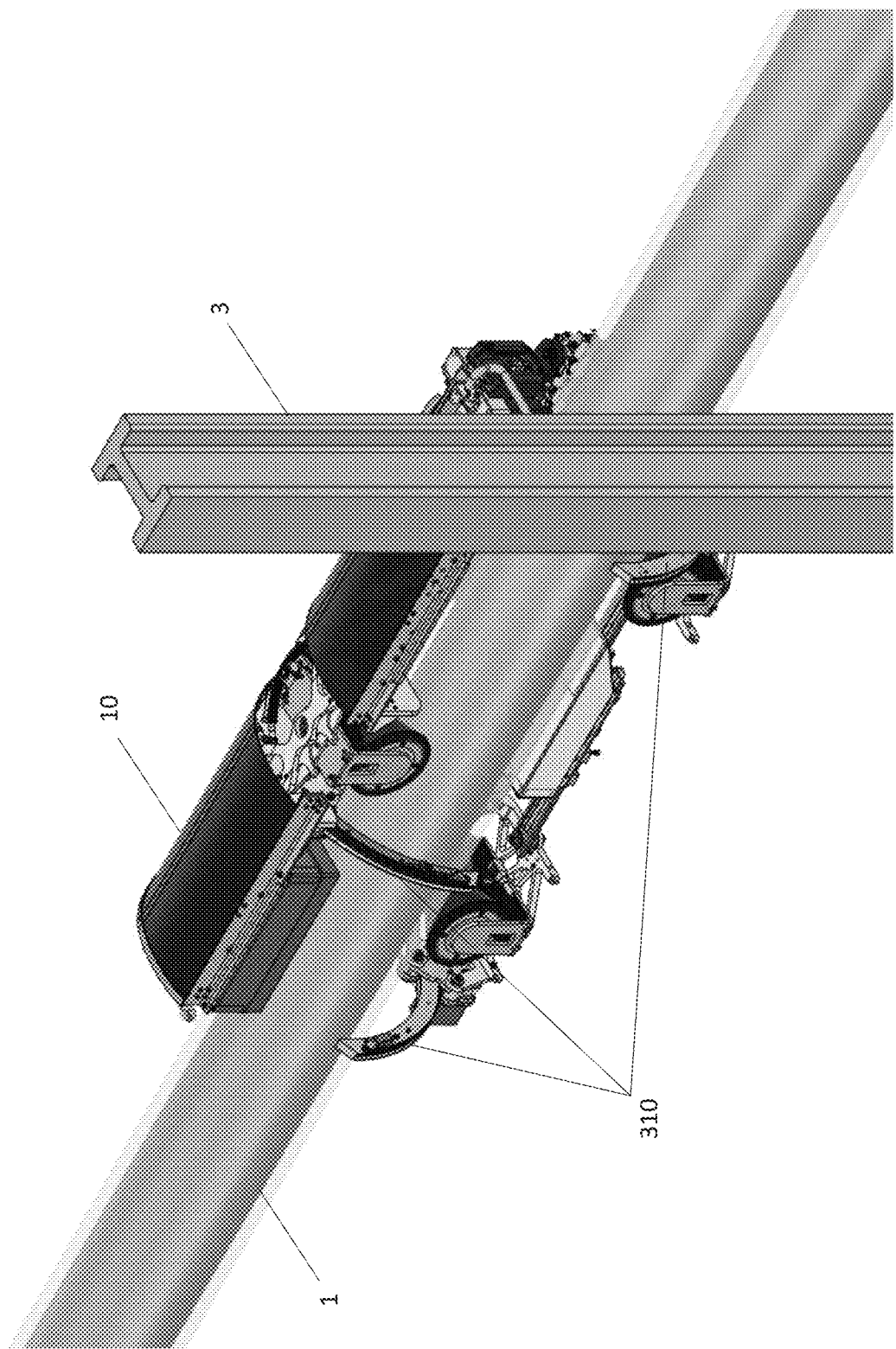
FIG. 17G is an enlarged view of FIG. 16G, according to embodiments of the present disclosure.
Figure 17H:
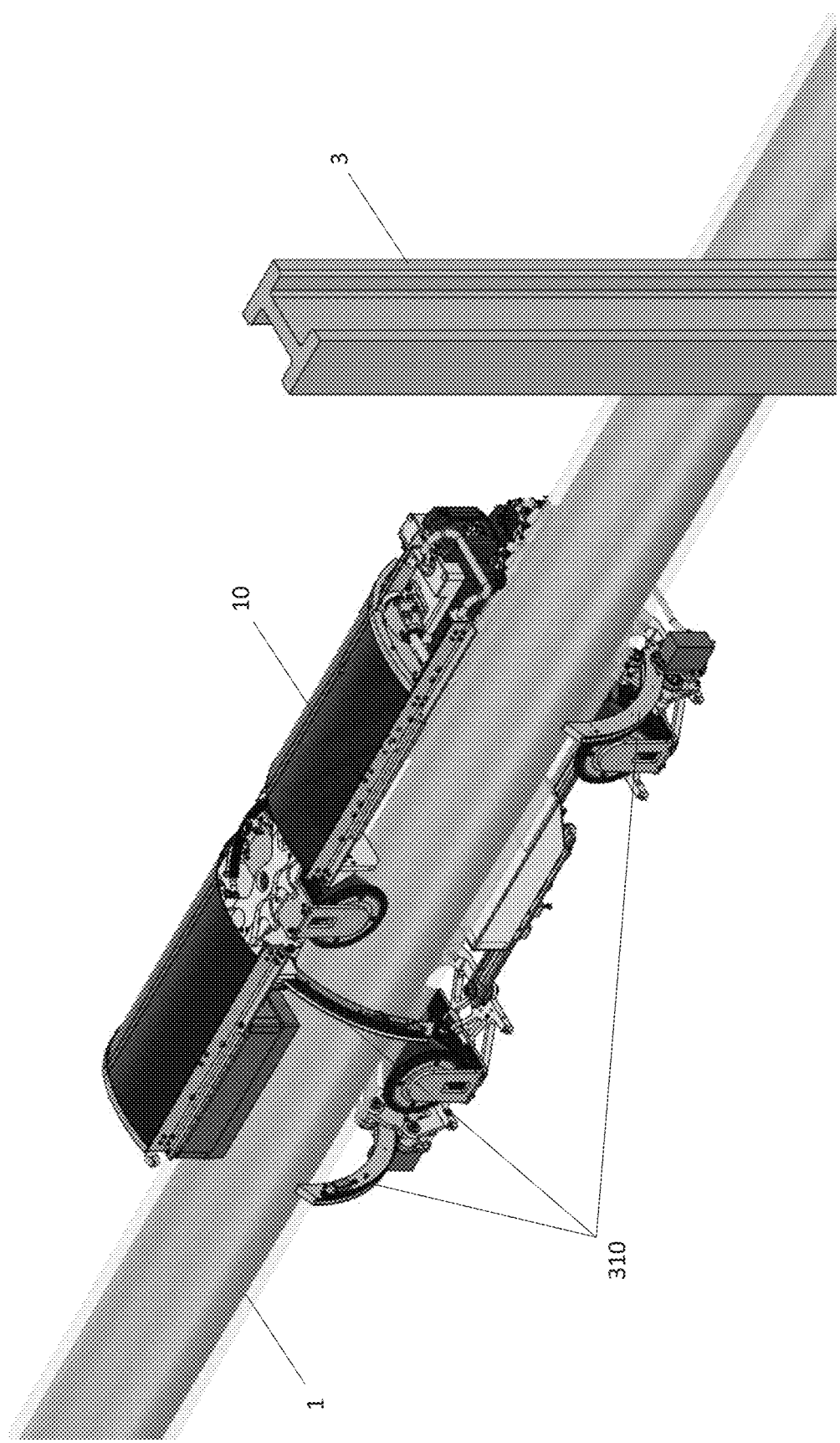
FIG. 17H is an enlarged view of FIG. 16H, according to embodiments of the present disclosure.

Curved arm(s) 310, in various embodiments, may further include a belt 312 or other component configured to engage with motor 330 for extending and retracting curved arm(s) 310. For example, in the embodiment shown, belt 312 may be coupled to and run along a side of curved arm 310 and be positioned such that an output 332 (e.g., timing pulley) of motor 330 contacts and otherwise engages belt 312. As configured, rotation (or other suitable motion) of output 332 relative to belt 312 may advance or retract belt 312 depending on the direction of rotation/motion of output 332. Belt 312, in some embodiments, may include a stop 314 at one or both ends configured to interfere with guide 320 (or any other suitable component of mechanism 300) when fully extended and/or fully retracted so as to prevent arm 310 from being advanced or retracted too far. Additionally or alternatively, one or more of stops 314 may be affixed to arm 310 for the same purpose. For example, in the embodiment shown, a first stop 314 may be affixed to a distal end of belt 312 and configured to engage guide 320 when arm 310 is fully retracted, and a second stop 314 may be affixed to a proximal end of arm 314 and configured to engage guide 320 (and in particular, guide bearing 324) when arm 310 is fully extended. As shown in FIG. 13A and FIG. 13B, in such an embodiment, arm 310 may have a concave profile in which corresponding guide bearings 324 are situated, and stop 314 includes an end plate blocking the proximal end of arm 310 such that guide bearings 324 interfere with further extension of arm 310. Of course, the particular stop 314 configurations described herein are not intended to be limiting, and one having ordinary skill in the art will recognize other stop 314 configurations suitable for providing the presently described functionality.

Guide(s) 320

Mechanism 300, in various embodiments, may include one or more guide 320 configured to support and direct the extension and retraction of curved arm(s) 310. In various embodiments, guide 320 may generally include a guide plate 322 and two or more guide bearings 324, as further described below.

Guide plate 322, in various embodiments, may be fixedly coupled with robot 10 and positioned such that guide bearings 324 engage arm 310. Likewise, motor 330 may be mounted on guide plate 322 such that its output 332 engages belt 312 of arm 310. Guide bearings 324, in various embodiments, may spin freely and thereby allow arm 310 to pass therealong. Alternatively, in some embodiments (not shown), belt 312 is not present and guide bearings 324 are powered to both guide and advance/retract arm 310. As another alternative (not shown), belt 312 and pulley 332 could be replaced with a gear rack on curved arm 310 and a pinion on the motor 330. Accordingly, it should be recognized that the particular embodiments described herein for guiding and powering the extension/retraction of curved arm 310 are intended to be non-limiting, and that one having ordinary skill in the art will recognize other suitable configurations for providing the same functionality within the scope of the present disclosure.

Guide bearings 324, in various embodiments, may be positioned on opposing sides of arm 310. For example, in the embodiment shown, three guide bearings 324 are provided in a substantially triangular arrangement, with two guide bearings 324 situated on one side of arm 310 and one guide bearing 324 situated on the opposing side of arm 310. As configured, curved arm 310 may run between the three guide bearings 324, with the path followed by arm 310 defined by the particular arrangement of guide bearings 324. To prevent the curved arm 310 from sliding out sideways (perpendicular to its plane of motion) the curved arm 310 may have a concave (v-shaped) cross-section where it makes contact with one or more of guide bearings 324. In an embodiment, the corresponding guide bearing(s) 324 may have a complementary convex shape that mates with the concave surface and provides lateral support. In another embodiment (not shown), mechanism 300 may include only two guide bearings 324 per arm 310. Like above, the two guide bearings 324 may be positioned on opposing sides of arm 310 and act to guide arm 310 along a path about pipe 1 as arm 310 is extended and retracted. Of course, one benefit of having three or more guide bearings 324 is that such a configuration may provide more support for loads placed on arm 310.

As later described in more detail, in some embodiments such as those shown in FIG. 11, FIGS. 16A-16H, and FIGS. 17A-17H, robot 10 may be equipped with a plurality of mechanisms 100 situated at different longitudinal positions long pipe 1. For example, in the embodiment shown, robot 10 has three such fail-safe assemblies 100 that are spaced out along the axial length of the robot 10, with each mechanism 300 mounted to robot 10 such that the mounting plate 322 is rigidly attached to one of the wheel assemblies.

In an alternative embodiment, guide 320 could consist of a guide plate 322 and one or more bushings (a.k.a. slide bearings) that have a low friction surface that matches the curvature of the curved arm 310. The bushing(s) would allow the same curved motion of arm 310 while also supporting the necessary force(s) to prevent robot 10 from coming off the pipe 1.

Operation of Mechanism 300

FIGS. 16A-16H show a series of images to demonstrate the order in which each mechanism 300 can be selectably extended and retracted to pass a tangential obstacle 3, while maintaining maximum ability to prevent the robot 10 from coming off the pipe 1. Larger versions of each of FIGS. 16A-16H are shown in FIGS. 17A-17H.

In FIG. 16A and FIG. 16B, robot 10 is approaching an obstacle 3, shown here as an I-beam supporting pipe 1. As shown, all arms 310 are in an extended state to catch robot 10 should it slip off of pipe 1.

In FIG. 16C, robot 10 has reached obstacle 3. The first (leading) arm 310 is in a retracted state and the second (middle) and third (trailing) arms 310 are still extended. As configured, the front of robot 10 can pass obstacle 3 unobstructed while the second and third arms 310 are still in position to catch robot 10 should it slip off of pipe 1.

In FIG. 16D, robot 10 continues to traverse obstacle 3. The first (leading) arm 310 has been extended again (not shown; view is blocked by obstacle 3), the second (middle) arm 310 is now retracted, and the third (trailing) arm 310 is still extended. As configured, the middle of robot 10 can pass obstacle 3 unobstructed while the first and third arms 310 are still in position to catch robot 10 should it slip off of pipe 1.

In FIG. 16E and FIG. 16F, robot 10 continues to further traverse obstacle 3. The first (leading) arm 310 remains extended, the second (middle) arm 310 is extended, and the third (trailing) arm 310 is (i) extended in FIG. 16E the rear end of robot 10 approaches obstacle 3, and (ii) now retracted in FIG. 16F when the rear of robot 10 reaches obstacle 3. As configured, the rear of robot 10 can pass obstacle 3 unobstructed while the first and second arms 310 are still in position to catch robot 10 should it slip off of pipe 1.

In FIG. 16G and FIG. 16H, robot 10 has fully traversed obstacle 3 and is moving away. As shown, all arms 310 are in an extended state to catch robot 10 should it slip off of pipe 1.

Figure 18B:
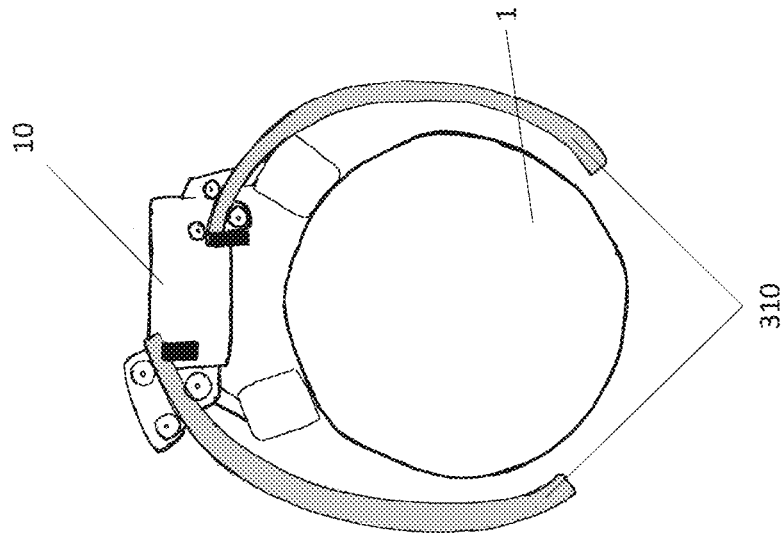
FIG. 18B is a front view of a robot with arms mounted in the same lateral plane, according to embodiments of the present disclosure.
Figure 18A:
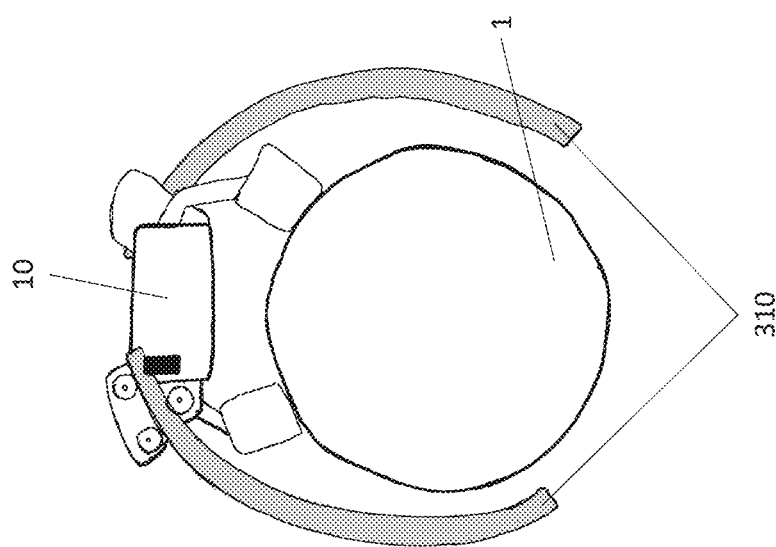
FIG. 18A is a front view of a robot with arms mounted at different axial positions, according to embodiments of the present disclosure.
Figure 19:
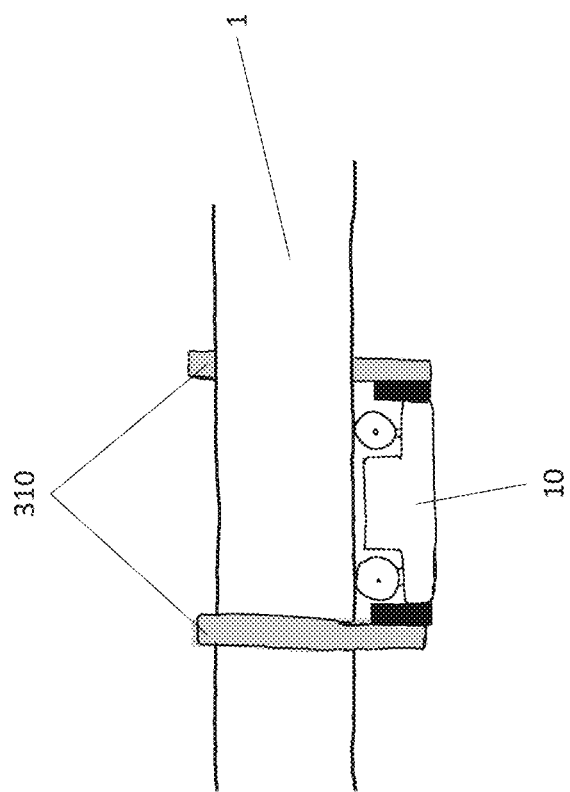
FIG. 19 is a side view of robot driving along a pipe using magnetic wheels, according to embodiments of the present disclosure.

It should be recognized; however, that mechanism 300 is not limited to use with the robotic apparatus shown in the accompanying figures. As previously noted, embodiments of mechanism 300 may be used with any robot 10 that (i) that largely surrounds pipe 1, but has an open portion 12 wide enough for pipe 1 to pass through, or (ii) is largely situated on only one side of pipe 1 (e.g., on top of a horizontally-oriented pipe 1). For example, FIG. 18A and FIG. 18B show mechanisms 100 installed on a robot 10 that drives on top of pipe 1. In this embodiment robot 10 uses two arms 310 to reach around the pipe 1 and prevent the robot from falling off if it should slip. Two different variations are shown where the arms 310 are mounted either at different axial positions along the length of the pipe 1 (FIG. 18A) or in the same lateral plane (FIG. 18B). Notice that when the curved arms 310 are mounted in the same lateral plane their radii of curvature are slightly different so that they can move in concentric arcs without interfering with each other. Another example is shown in FIG. 19, which illustrates a robot 10 driving along the bottom of pipe 1 using magnetic wheels or other means to adhere to the pipe 1. In this embodiment the curved arms 310 extend around the pipe 1 towards the top and would prevent the robot 10 from falling if the magnetic wheels or method of adhesion failed. The robot 10 shown in FIG. 19 is just an example and, like the embodiments of FIG. 18A and FIG. 18B, it could employ one or more curved arms 310 mounted in the same plane or in different planes along the length of pipe 1, respectively.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A fail-safe mechanism configured to prevent a robot from falling off of a pipe while allowing the robot to traverse obstacles extending perpendicular from or tangential to the pipe, the fail-safe mechanism comprising:
   a curved arm;
   a guide configured to support and direct the curved arm as it is extended and retracted along a path substantially concentric with the pipe; and
   a motor for selectably powering motion of the curved arm between (i) an extended state in which the curved arm surrounds all or a portion of the circumference of the pipe not surrounded by the robot and (ii) a retracted state in which the curved arm exposes a circumferential gap about the pipe between a distal end of the curved arm and the robot, the circumferential gap being wide enough to allow the obstacle to pass therethrough as the robot traverses the pipe past the obstacle.

2. The fail-safe mechanism of claim 1, wherein a shape and dimensions of the curved arm complement those of the pipe.

3. The fail-safe mechanism of claim 2, wherein the pipe is cylindrical and wherein the curved arm is arced and has a radius of curvature similar to that of the pipe.

4. The fail-safe mechanism of claim 1, wherein an outer profile of the fail-safe mechanism about the pipe does not exceed that of any component of the robot.

5. The fail-safe mechanism of claim 1, wherein, in the extended state, the dimensions of the circumferential gap are smaller than a diameter of the pipe such that the pipe cannot pass through the circumferential gap.

6. The fail-safe mechanism of claim 1, wherein the guide comprises a guide plate and two or more guide bearings.

7. The fail-safe mechanism of claim 6, wherein the guide plate is fixedly coupled to the robot and positioned such that the two or more guide bearings engage the curved arm.

8. The fail-safe mechanism of claim 7, wherein the motor drives rotation of at least one of the two or more guide bearings in selectably powering motion of the curved arm.

9. The fail-safe mechanism of claim 1, wherein the curved arm further comprises a gear rack and wherein the motor further comprises a pinion, the pinion engaging the gear rack in selectably powering motion of the curved arm.

10. A robot for traversing a length of a pipe, the robot comprising:
an architecture that only partially surrounds a circumference of the pipe; and
one or more fail-safe mechanisms, each fail-safe mechanism comprising a curved arm configured to be selectably extended and retracted to (i) enclose at least a portion of the circumference of the pipe not surrounded by the robot to prevent the robot from falling off the pipe, and (ii) expose at least a portion of the circumference of the pipe not surrounded by the robot wide enough to allow an obstacle to pass therethrough as the robot traverses the pipe past the obstacle.

11. The robot of claim 10, wherein the architecture has an open portion wide enough for the pipe to pass through.

12. The robot of claim 10, wherein the architecture is such that the robot is situated on only one side of the pipe when the robot is attached to the pipe and the one or more fail-safe mechanisms are retracted.

13. The robot of claim 10, comprising two or more fail-safe mechanisms, and wherein at least two of the two or more fail-safe mechanisms are positioned in the same lateral plane as one another.

14. The robot of claim 10, comprising two or more fail-safe mechanisms, and wherein at least two of the two or more fail-safe mechanisms are positioned at different longitudinal positions along a length of the robot.

15. The robot of claim 10, wherein a shape and dimensions of the curved arm complement those of the pipe.

16. The fail-safe mechanism of claim 15, wherein the pipe is cylindrical and wherein the curved arm is arced and has a radius of curvature similar to that of the pipe.

17. The fail-safe mechanism of claim 10, wherein an outer profile of the fail-safe mechanism about the pipe does not exceed that of any component of the robot.

18. The robot of claim 10, wherein the curved arm has a shape and dimensions configured to cause one or more wheels of the robot to remain engaged with a surface of the pipe following a slip of the robot off of the pipe.

19. The fail-safe mechanism of claim 10, wherein, when the curved arm is extended, any portion of the circumference of the pipe not surrounded by the robot is smaller than a diameter of the pipe such that the pipe cannot pass therethrough.

20. The fail-safe mechanism of claim 10, wherein, when the curved arm is retracted, the exposed portion of the circumference of the pipe not surrounded by the robot is larger than a corresponding dimension of the obstacle such that the obstacle can pass therethrough as the robot traverses the pipe past the obstacle.

\* \* \* \* \*